United States Patent [19]

Hochreiter et al.

[11] Patent Number: 5,802,400
[45] Date of Patent: *Sep. 1, 1998

[54] APPARATUS FOR LOADING AND UNLOADING PHOTOGRAPHIC FILM INTO OR FROM A CAMERA

[75] Inventors: Eric Peschan Hochreiter, Bergen; Bradley S. Bush; Stephen Michael Granby, both of Hilton; Dennis Roland Zander, Penfield, all of N.Y.

[73] Assignee: Eastman Kodak Company, Rochester, N.Y.

[*] Notice: The term of this patent shall not extend beyond the expiration date of Pat. No. 5,689,745.

[21] Appl. No.: 569,464

[22] Filed: Dec. 8, 1995

[51] Int. Cl.$^6$ .............................. G03B 17/02; G03B 1/00
[52] U.S. Cl. .................. 396/6; 396/388; 396/429; 396/538
[58] Field of Search ..................... 354/212, 213, 354/214, 215, 216, 203, 313, 288; 396/6, 388, 411, 415, 429, 535, 536, 538

[56] References Cited

U.S. PATENT DOCUMENTS

| | | |
|---|---|---|
| 3,555,286 | 1/1971 | Cote .................................. 250/222 |
| 3,722,999 | 3/1973 | Cunha et al. ........................ 355/45 |
| 4,059,211 | 11/1977 | Brizzolara . |
| 4,370,041 | 1/1983 | Katsuyama ........................ 354/92 |
| 4,780,734 | 10/1988 | Ogawa et al. .................... 354/173.1 |
| 4,972,649 | 11/1990 | Mochida et al. .................. 354/212 |
| 5,060,877 | 10/1991 | Bullivant ........................... 242/55 |
| 5,075,563 | 12/1991 | Green ................................ 250/571 |
| 5,148,198 | 9/1992 | Shiba ................................. 354/319 |
| 5,200,608 | 4/1993 | Kitajima ............................ 250/221 |
| 5,202,713 | 4/1993 | Nakai et al. ...................... 354/212 |

*Primary Examiner*—Eddie C. Lee
*Attorney, Agent, or Firm*—Charles E. Snee, III; Gordon M. Stewart

[57] ABSTRACT

Apparatus is disclosed for loading and unloading a discrete film strip into or from a film guide track (566) extending between an unexposed film chamber (562) and an exposed film chamber (564) within a camera (426), the camera being of a type including an external housing (428, 478) having a movable closure (484) giving access to the film guide track and the film having opposing longitudinal edges. The apparatus may include a frame (320, 352); a device (324-334, 348-356) supported by the frame for defining a first pair of opposed guide slots (336, 338) for receiving the longitudinal edges as the film is driven into the camera; and a device (370, 372, 378) supported by the frame for guiding the film from or to the first guide slots into or from the film guide track.

18 Claims, 44 Drawing Sheets

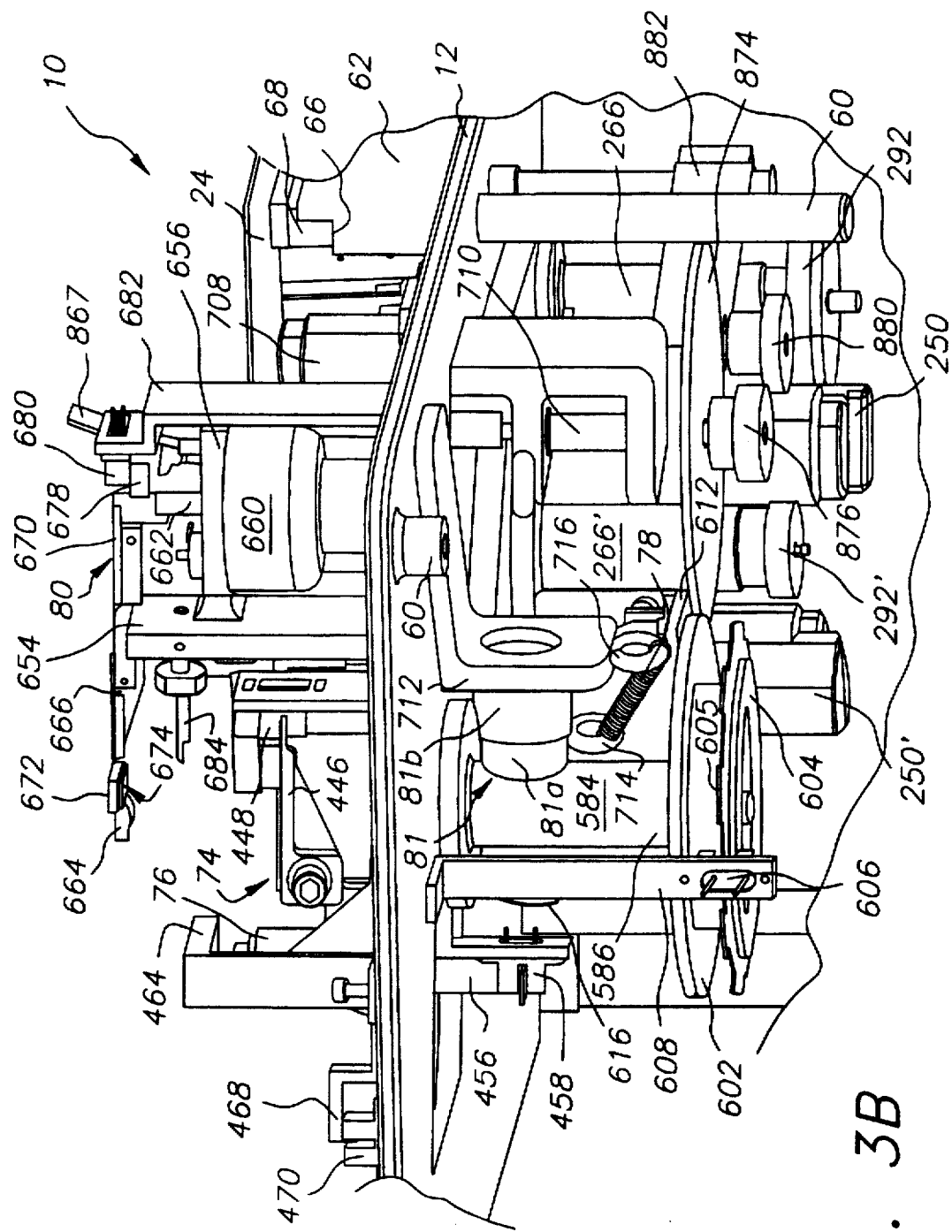

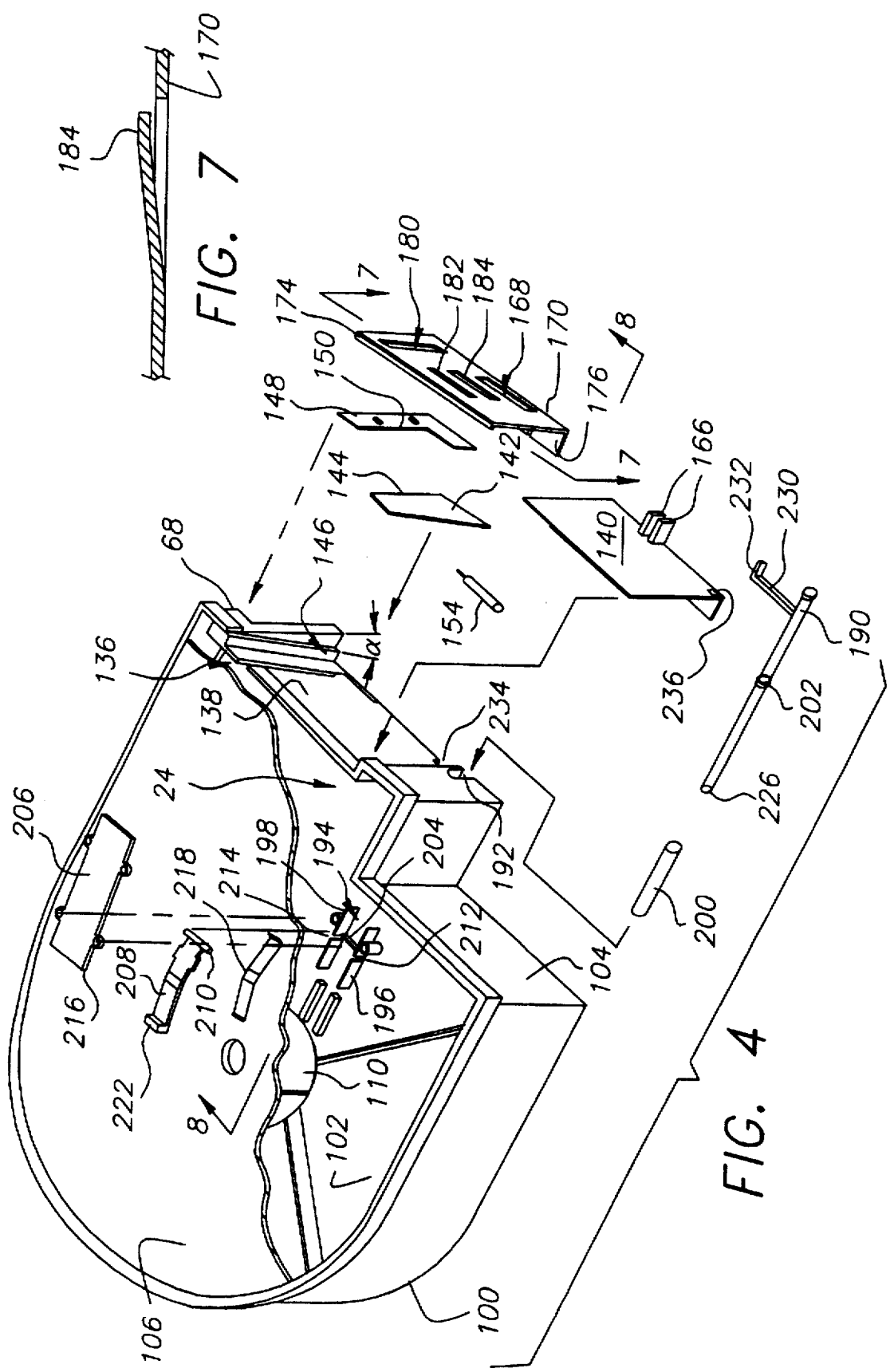

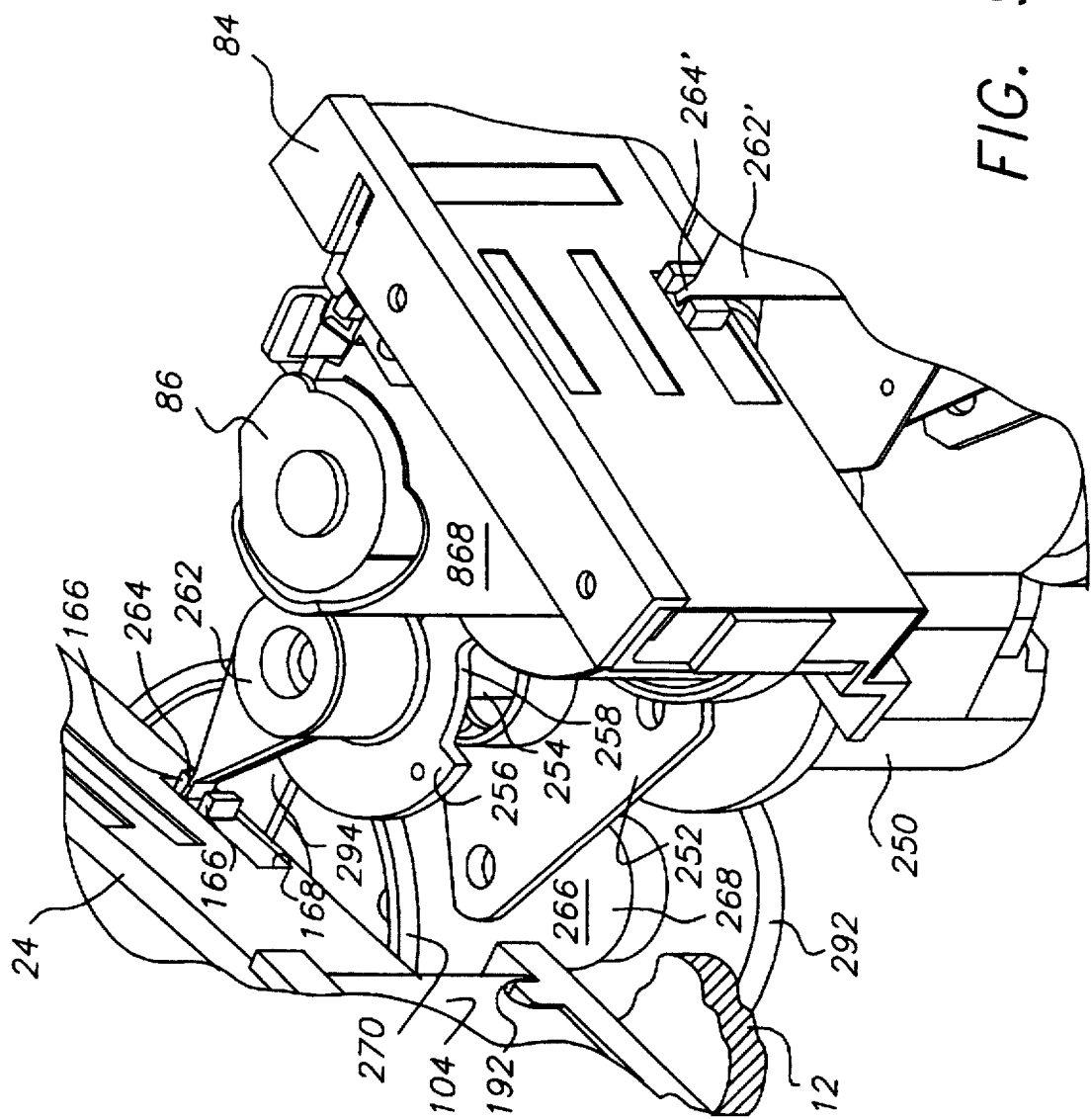

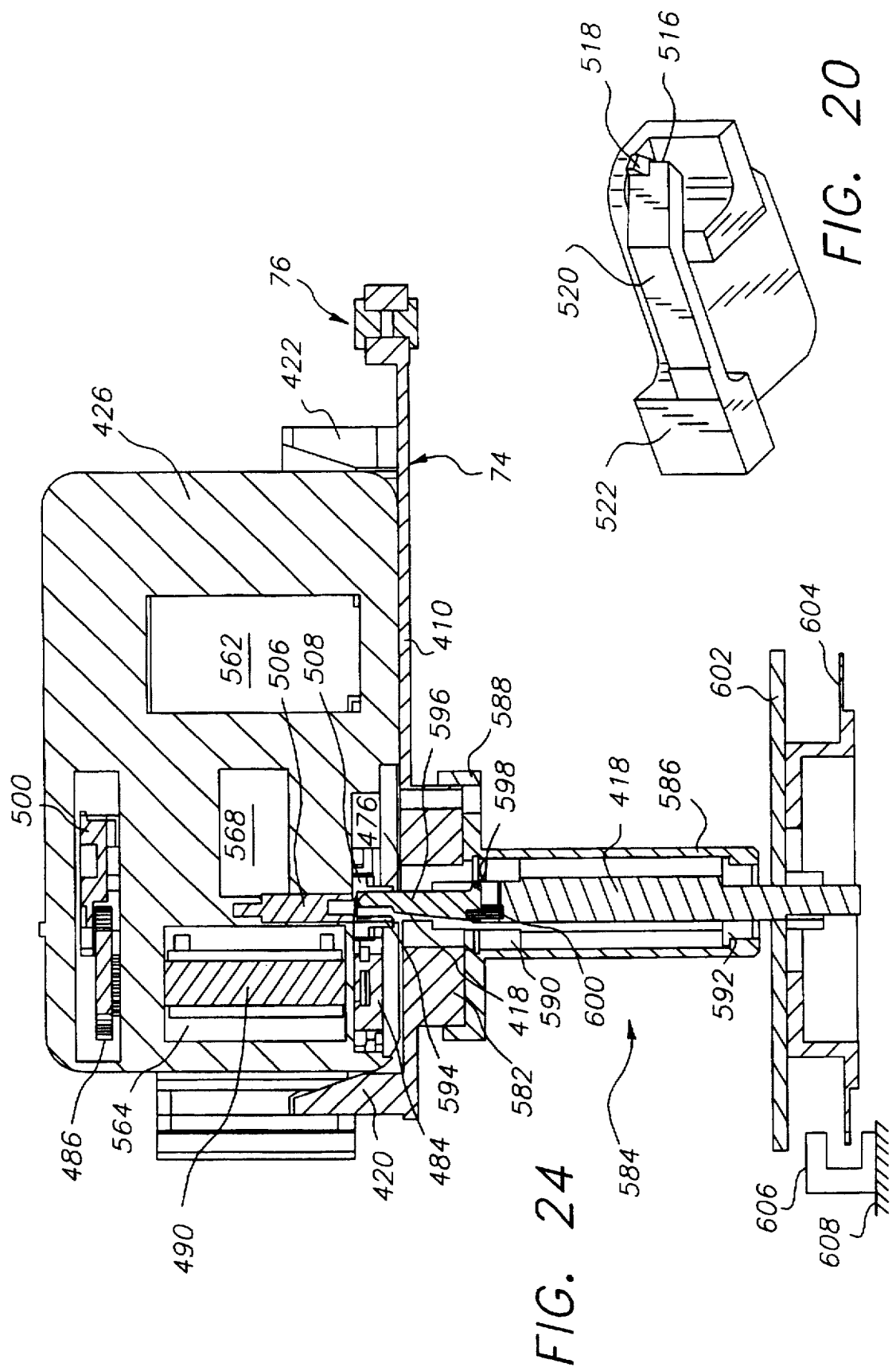

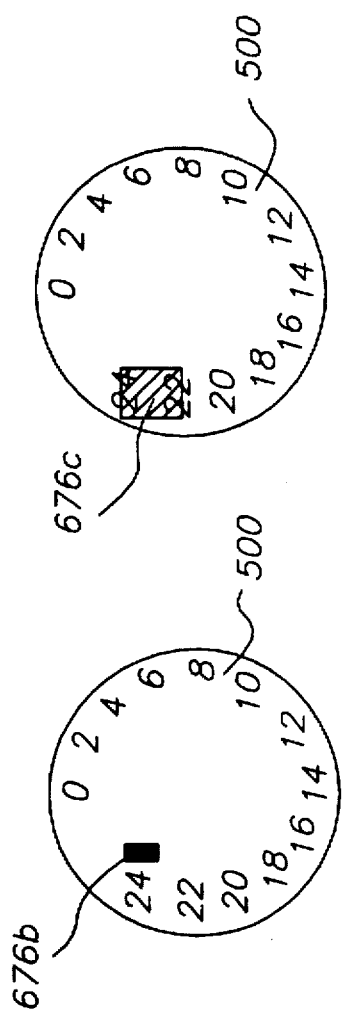
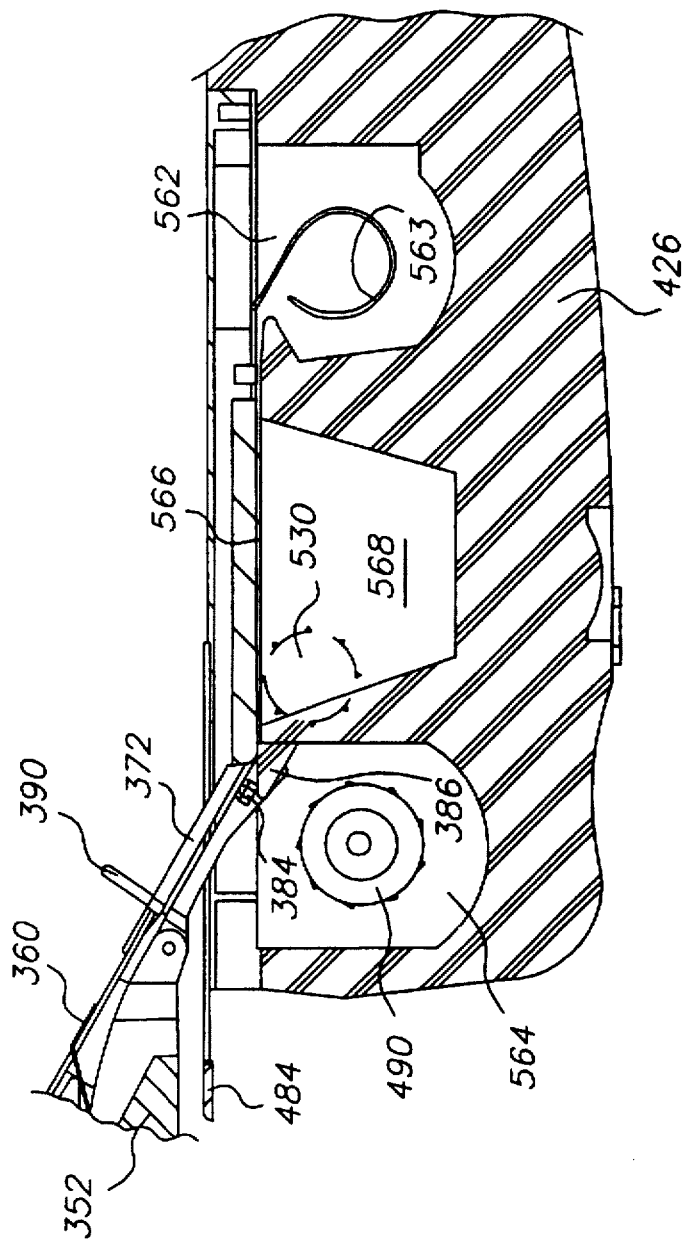

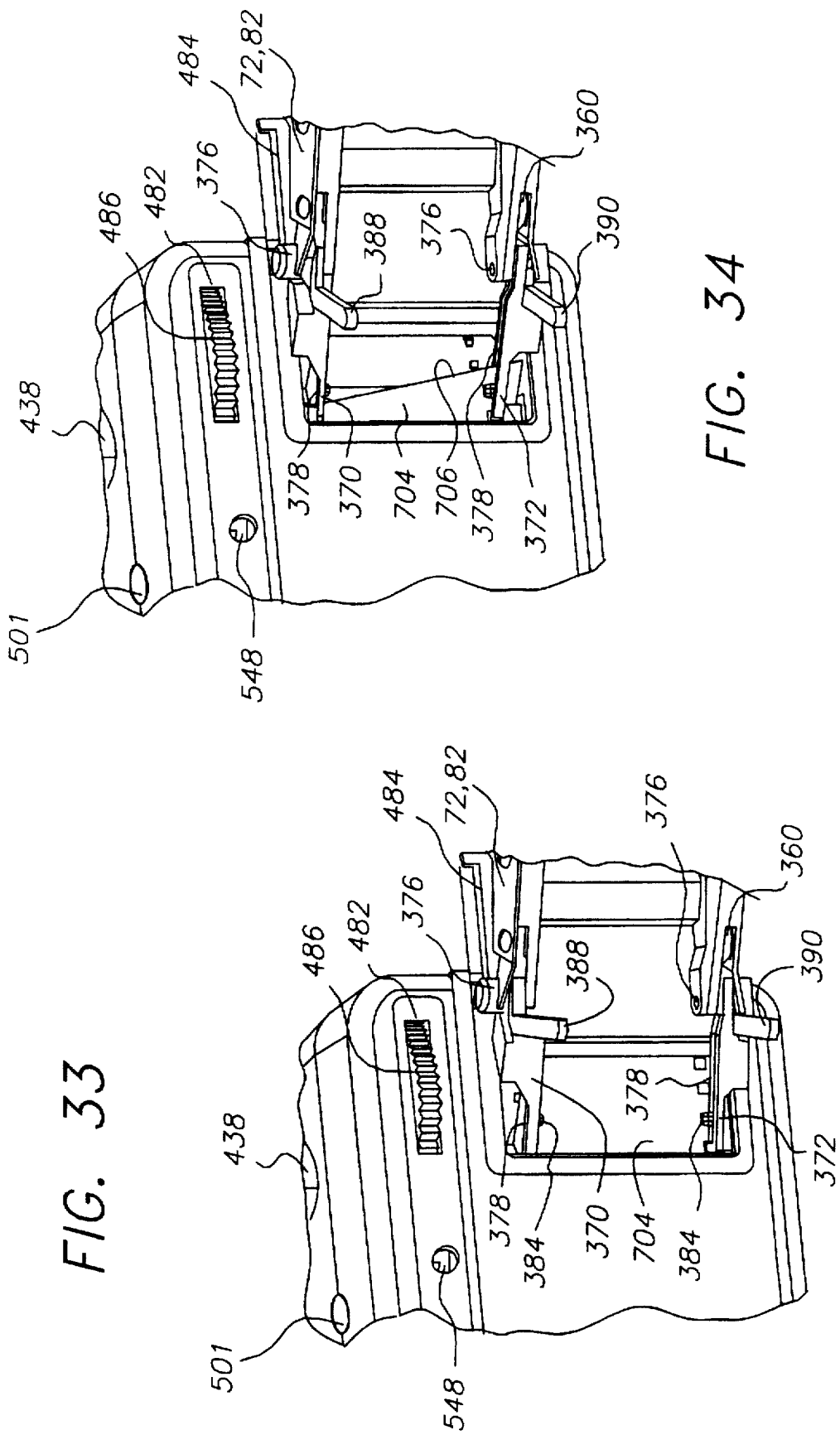

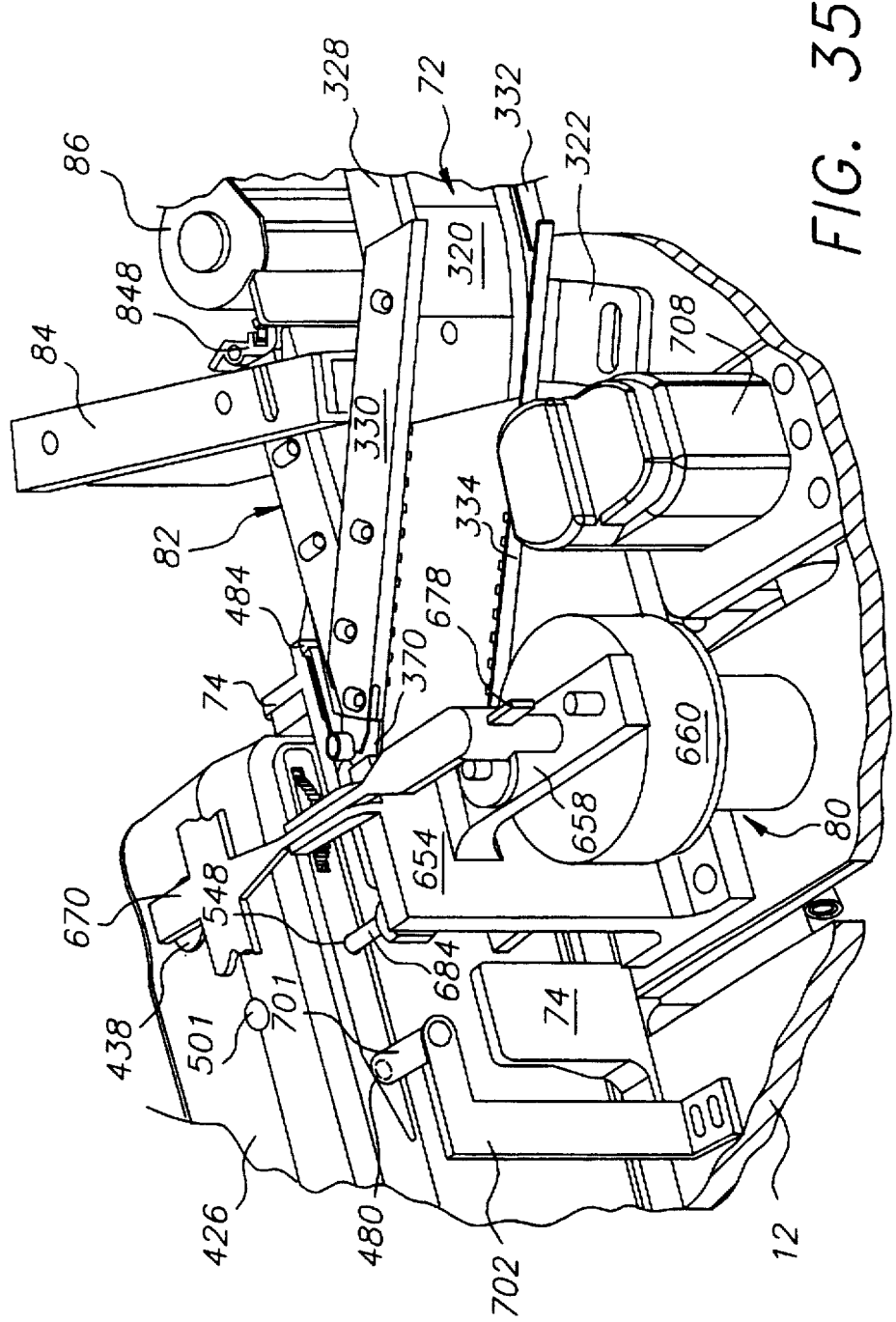

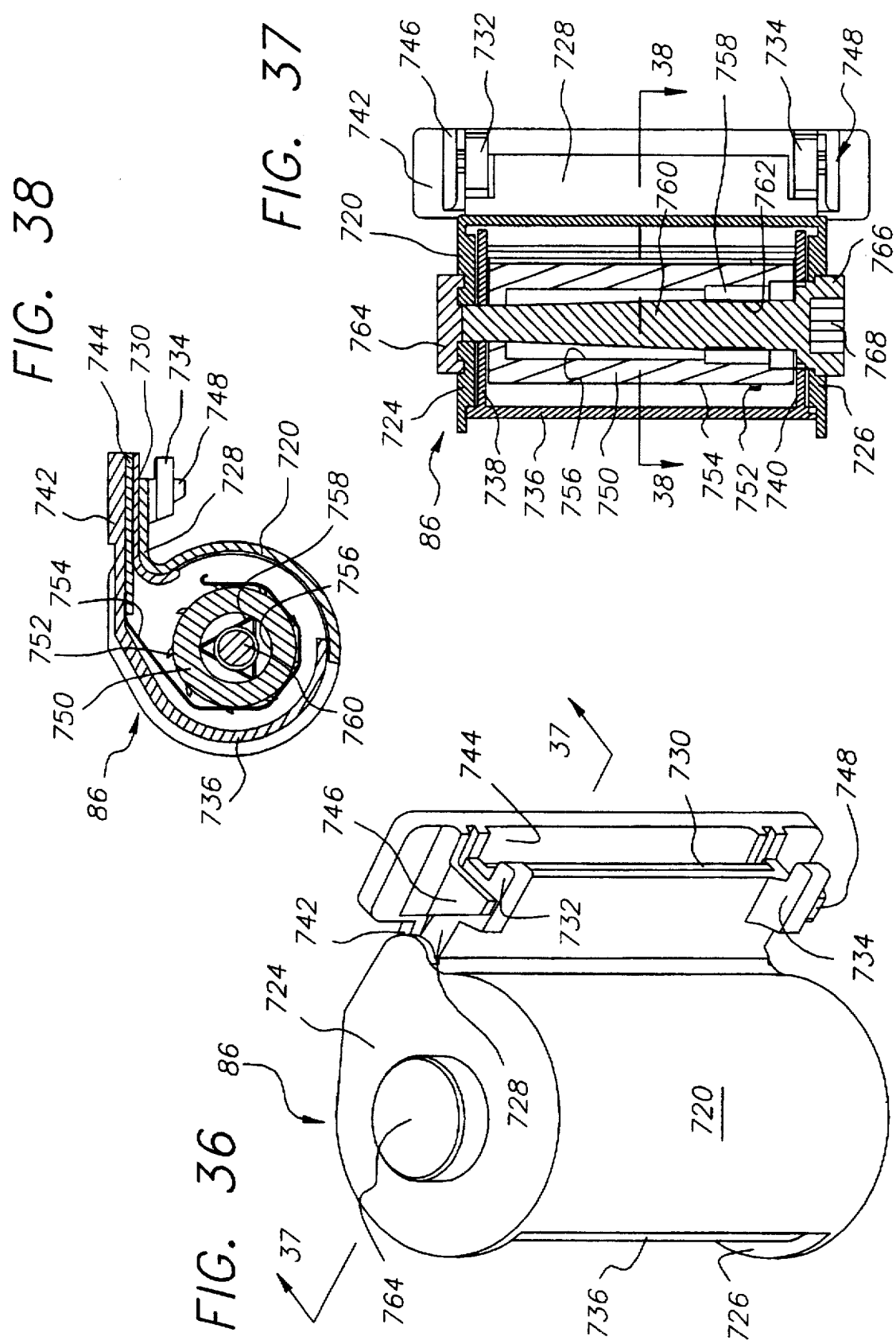

APPARATUS FOR LOADING AND UNLOADING PHOTOGRAPHIC FILM INTO OR FROM A CAMERA

CROSS REFERENCE TO RELATED APPLICATIONS

This application is related to the following commonly assigned applications:

(1) Ser. No. 08/370,592 filed 9 Jan. 1995 by Dennis R. Zander for FILM LOADING/UNLOADING DESIGN FOR PHOTOGRAPHIC CAMERA, now U.S. Pat. No. 5,555,054;

(2) Ser. No. 08/391,757 filed 21 Feb. 1995 by Dennis R. Zander for FILM ROLL ACCUMULATING DEVICE, now U.S. Pat. No. 5,544,833;

(3) Ser. No. 60/001515 filed 18 Jul. 1995 by Jeffrey C. Robertson for LIGHT TIGHT CHAMBER WITH CLOSURE AND SENSOR FOR POSITION OF CLOSURE AND CASSETTE IN CHAMBER;

(4) Ser. No. 60/002,644 filed 22 Aug. 1995 by Jeffrey C. Robertson for EXTERNALLY DRIVEABLE CASSETTE FOR LIGHT SENSITIVE WEB MATERIAL, INCLUDING KNIFE FOR CUTTING MATERIAL;

(5) Ser. No. 60/002,645 filed 22 Aug. 1995 by Jeffrey C. Robertson for EXTERNALLY DRIVEABLE CASSETTE FOR LIGHT SENSITIVE WEB MATERIAL, INCLUDING KNIFE FOR CUTTING MATERIAL AND METHOD OF OPERATION;

(6) Ser. No. 60/002,646 filed 22 Aug. 1995 by Jeffrey C. Robertson, Bradley S. Bush and Eric P. Hochreiter for EXTERNALLY DRIVEABLE CASSETTE FOR LIGHT SENSITIVE WEB MATERIAL, INCLUDING KNIFE FOR CUTTING MATERIAL AND METHOD OF OPERATION;

(7) Ser. No. 60/002,647 filed 22 Aug. 1995 by Jeffrey C. Robertson for EXTERNALLY DRIVEABLE CASSETTE FOR LIGHT-SENSITIVE WEB MATERIAL, INCLUDING KNIFE FOR CUTTING MATERIAL AND LATCHING CASSETTE DRIVE AFTER CUTTING;

(8) Ser. No. 60/002,854 filed 28 Aug. 1995 by Dennis R. Zander, Eric P. Hochreiter and William A. Bergstresser for METHOD AND APPARATUS FOR PRECISELY POSITIONING A CAMERA OR CAMERA FRAME;

(9) Ser. No. 08/569,634 filed concurrently herewith by Dennis R. Zander, William A. Bergstresser, Bradley S. Bush, Eric P. Hochreiter, Jeffrey C. Robertson and Paul Teremy for APPARATUS AND METHOD FOR LOADING AND UNLOADING A CAMERA WITH A DISCRETE FILM STRIP (Docket 71956CES), now U.S. Pat. No. 5,689,745;

(10) Ser. No. 08/569,054 filed concurrently herewith by William A. Bergstresser, Bradley S. Bush, Eric P. Hochreiter and Dennis R. Zander for APPARATUS FOR ACTUATING AND TESTING A CAMERA (Docket 73223CES), now U.S. Pat. No. 5,649,258;

(11) Ser. No. 08/659,957 filed concurrently herewith by Dennis R. Zander, Paul Teremy and Eric P. Hochreiter for APPARATUS AND METHOD FOR LOADING A CAMERA (Docket 73225CES), now U.S. Pat. No. 5,630,178;

(12) Ser. No. 08/569,557 filed concurrently herewith by Dennis R. Zander and Paul Teremy for PHOTOGRAPHIC CAMERA WITH COUNTERWHEEL HAVING OFFSET MARK (Docket 73227CES), now abandoned;

(13) Ser. No. 08/569,543 filed concurrently herewith by Dennis R. Zander, Paul Teremy, William A. Bergstresser, Eric P. Hochreiter and Scott H. Schwallie for APPARATUS AND METHOD FOR LOADING AND PARTIALLY UNLOADING A CAMERA WITH A DISCRETE FILM STRIP (Docket 72025CES), now U.S. Pat. No. 5,721,960;

(14) Ser. No. 08/569,558 filed concurrently herewith by Dennis R. Zander for PHOTOGRAPHIC CAMERA INCLUDING FEATURES FOR POSITIONING AN EXTERNAL FILM LOADING AND UNLOADING DEVICE (Docket 73228CES), now U.S. Pat. No. 5,675,835;

(15) Ser. No. 08/569,387 filed concurrently herewith by Dennis R. Zander for PHOTOGRAPHIC CAMERA WITH EXTERNALLY ACCESSIBLE DRIVE COUPLING HAVING RELEASABLE ANTI-BACKUP FEATURE (Docket 73229CES), now U.S. Pat. No. 5,628,032;

(16) Ser. No. 08/569,633 filed concurrently herewith by William A. Bergstresser, Eric P. Hochreiter, Paul Teremy and Dennis R. Zander for APPARATUS AND METHOD FOR OPENING AND CLOSING A PHOTOGRAPHIC CAMERA (Docket 73231CES), now U.S. Pat. No. 5,655,155.

TECHNICAL FIELD

The invention concerns apparatus for loading photographic film into a camera or unloading film from a camera. More particularly, the invention concerns apparatus for loading a discrete film strip into or unloading a discrete film strip from an assembled camera, the discrete strip not requiring a separate light shielding cartridge or other light shielding wrapper within the camera.

BACKGROUND OF THE INVENTION

Conventional photographic cameras are designed to accept unexposed film which has been enclosed in a light shielding cartridge or other light shielding wrapper, to facilitate loading and unloading the camera without exposing the film. Many consumers find such cartridges or wrapped film to be difficult to load into or unload from a camera. The costs of such a cartridge or other wrapper and associated commercial packaging are significant components of the cost to the ultimate consumer. In addition, this known practice requires a film manufacturer to maintain an inventory of cartridges or rolls of film with various preselected lengths of film.

In recent years, so-called single use or disposable cameras have become popular, such as those disclosed in commonly assigned U.S. Pat. Nos. 4,890,130 and 5,235,366. While such cameras do not require the consumer to load or unload the film, the costs to the manufacturer continue to be high for disassembling such cameras to remove a factory-installed film cartridge and recover reusable parts. And, an inventory of cameras with various lengths of film still must be maintained.

Commonly assigned U.S. patent application Ser. No. 08/370,592 discloses a unique type of camera which can be loaded with a discrete length of unexposed film of a length selected by the consumer and subsequently unloaded of a discrete length of exposed film. Since such cameras do not use a cartridge or pre-wound spool of film to facilitate loading and unloading, there is a general problem of aligning the film strip with the camera and the internal guide track of the camera. For example, a film strip often has a natural transverse curl which must be controlled for the film to be loaded, transported within the camera, and unloaded without scratching or other damage. Also, difficulty can arise when loading or unloading such a camera in that the leading edge of the film strip going into or coming from the camera may tend to snag on camera features.

When such a camera is to be unloaded or reloaded, there is a need to know if there is a film strip in the camera and, if so, where the film strip is located. For example, if all of the available frames have been exposed, the film strip would be in an exposed film chamber within the camera, except for a trailer portion still engaged with the film drive sprocket. If none of the frames has been exposed, the film strip would be in an unexposed film chamber within the camera, except for a leader portion still engaged with the film drive sprocket. If a portion of the frames has been exposed, some of the film strip would be in the exposed film chamber; some would be in the unexposed film chamber, and some would extend between the chambers. When unloading a film strip, it is necessary to be able to detect the presence of the film at an exit opening from the camera. Then, when driving the strip back toward the unexposed film chamber, it is necessary to be able to detect when the end of the leader portion has just reached the film drive sprocket, so that movement of the film strip may be stopped while the leader portion is still engaged wit the drive sprocket.

Thus, a need has arisen for an external film loading and unloading device to guide a film strip into and from a camera, the device including features for detecting the presence and location of the film strip within the camera.

SUMMARY OF THE INVENTION

The primary objective of this invention is to provide an improved apparatus for guiding a discrete film strip into or from a guide track within a camera.

A further objective of the invention is to provide such an apparatus which includes features for detecting the presence and location of a film strip already within a camera.

Still another objective of the invention is to provide such an apparatus which can guide film into or receive film from only a single access opening in the housing of a camera.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

A photographic film loading and unloading apparatus according to the invention is particularly suited for guiding a discrete film strip into or from a film guide track extending between an unexposed film chamber and an exposed film chamber within a camera, the camera being of a type including an external housing having a movable closure giving access to the film guide track and the film having opposing longitudinal edges. The apparatus may include a frame; means supported by the frame for defining a first pair of opposed guide slots for receiving the longitudinal edges as the film is driven into the camera; and means supported by the frame for guiding the film from or to the first guide slots into or from the film guide track.

The opposed guide slots may have flared inlets to receive the film. The means for guiding may include a pair of ramps for the longitudinal edges. The ramps may be pivoted to move into the camera when the movable closure is open. The apparatus also may include means for biasing the ramps to move into the camera when the movable closure opens. The ramps may include further guide slots for receiving the longitudinal edges from the opposed guide slots. Each of the ramps may include a sensor flag, and the apparatus may include a pair of sensors mounted adjacent the ramps to be actuated by the flags when the ramps move into a position for guiding the film into the film guide track.

The apparatus also may include means defining a second pair of opposed guide slots for receiving the longitudinal edges as the film is driven from the camera. The means for guiding again may include a pair of ramps for guiding the longitudinal edges into or from the camera. Each of the ramps may include a guide slot for receiving a film edge from one of the first pair of opposed guide slots as the film is driven into the camera and thereafter for receiving the film edges as the film is driven from the camera into the second pair of opposed guide slots. A resilient member may be included for diverting the film from the guide slots of the ramps to the second pair of opposed guide slots. The resilient member may be configured to block the first pair of opposed guide slots until pushed aside by the film as the film is driven into the camera. The frame may have a first coefficient of thermal expansion substantially equal to a second coefficient of thermal expansion of the film.

The apparatus provides various advantages. Only a single access opening is needed though the housing of the camera for loading and unloading a discrete film strip. Any tendency of a film strip to curl is controlled by guiding the edges of the strip during movement. Guiding the edges of the film strip also minimizes scratching of the image areas of the film. Movable ramps with sensor flags not only permit detection of the presence and location of film within a camera, but also provide a well-guided path for film strips entering or leaving the guide track of the camera. The apparatus may be used both to load or unload film.

BRIEF DESCRIPTION OF THE DRAWINGS

The foregoing and other objectives, features and advantages of the invention will be apparent from the following more particular description of the preferred embodiments of the invention, as illustrated in the accompanying drawings.

FIG. 3B shows a fragmentary perspective view of the apparatus of FIG. 3A, looking from the right end of FIG. 3A and from below the level of the mechanism support plate.

FIG. 4 shows a perspective, partially broken away and partially exploded view of the cassette for unexposed film.

FIG. 7 shows a view along line 7—7 of FIG. 4.

FIG. 9 shows an enlarged, fragmentary perspective front view of features for actuating the film cutter of the cassette and for operating the cassette, and of the cutter and cartridge for exposed film.

FIG. 20 shows an enlarged, perspective view of the anti-backup pawl of FIGS. 18 and 19.

FIGS. 21B and 21C show alternative embodiments of the counterwheel of FIG. 21.

FIG. 23A shows a view along line 23—23 of FIG. 22, revealing how the guide track cooperates with the camera.

FIG. 24 shows a view along line 24—24 of FIG. 15, revealing features of the camera drive assembly.

FIG. 33 shows a fragmentary back perspective view of the camera and guide track, just after opening the camera door, with the film guide ramps contacting the film within the camera.

FIG. 34 shows the features of FIG. 33, just after the film has been wound back toward the unexposed film chamber and the film guide ramps have moved further into position within the camera.

FIG. 35 shows a fragmentary back perspective view of the nest and camera, the camera actuating and testing station, the film guide tracks, the exposed film cutter and the transfer cartridge, with the camera door open and a strip of film entering the camera.

FIG. 36 shows a perspective view of the transfer cartridge.

FIG. 37 shows a sectional view along line 37—37 of FIG. 36.

FIG. 38 shows a sectional view along line 38—38 of FIG. 37.

DESCRIPTION OF THE PREFERRED EMBODIMENTS

Figure 1:
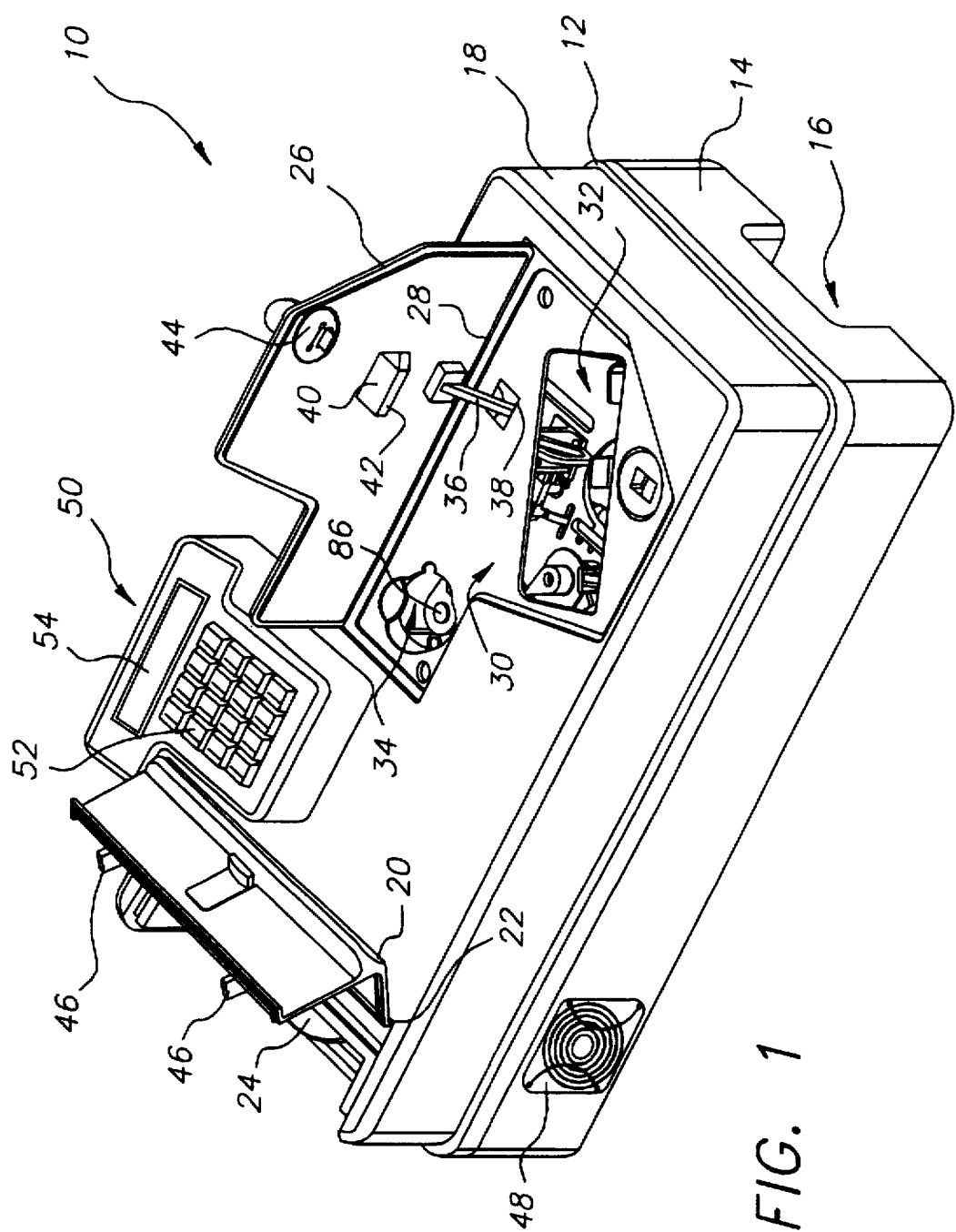
FIG. 1 shows a perspective view of a camera loading and unloading apparatus according to the invention.

The following is a detailed description of the preferred embodiments of the invention, reference being made to the drawings in which the same reference numerals identify the same elements of structure in each of the several Figures.

Overall Arrangement and Operation

FIGS. 1 to 3A show front perspective views of the overall apparatus 10. As used in this description, "front" views are taken essentially from the perspective of FIGS. 1 to 3A; whereas, "back" views are taken essentially from the opposite perspective. A central mechanism support plate or frame 12 is positioned between a lower housing 14 provided with hand holds 16 and an upper housing 18. For light tightness, the housings should be made from a suitable opaque material such as metal or molded plastic. A peripheral groove 19 is provided in an upper surface of support plate 12 and a similar groove, not illustrated, is provided in an under surface of the support plate. These grooves respectively receive a mating land on a lower edge of upper housing 18 and a mating land on an upper edge of lower housing 14, to provide a light-tight interior. Though the illustrated embodiment includes a housing suitable for a type of counter top apparatus, those skilled in the art will appreciate that the internal apparatus of the invention also could be incorporated into any light tight environment, such as a larger, vending machine format or a darkened room, all without departing from the scope of the invention.

Figure 2:
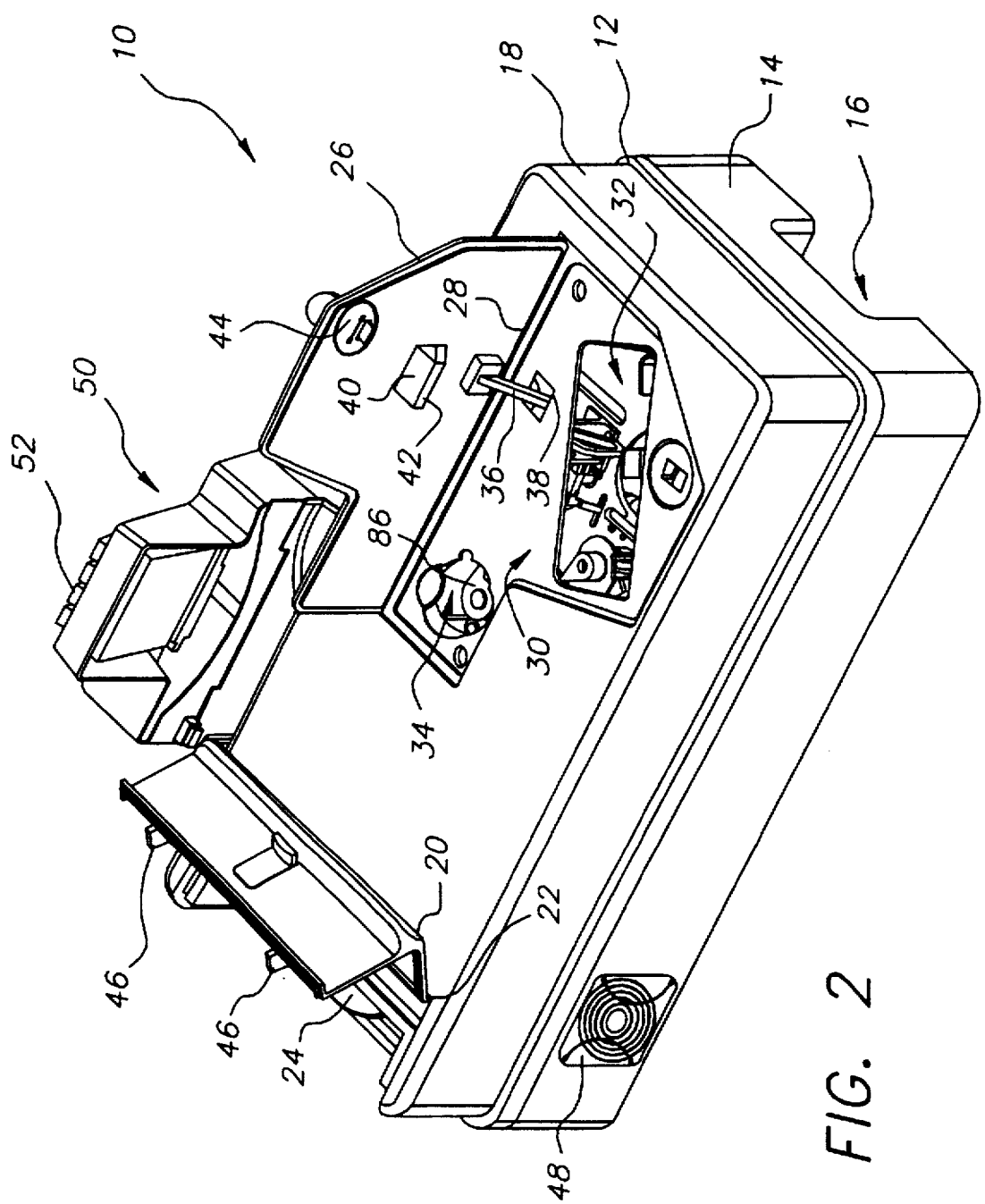
FIG. 2 shows the apparatus of FIG. 1, with the control console pivoted back to permit removal of the upper housing.

At the left end of the upper housing, as viewed in FIGS. 1 and 2, a movable closure, such as an L-shaped end door 20, is mounted by a hinge 22, to provide access to a compartment for a cassette 24 for unexposed photographic film.

Although a closed cassette is preferred for a source of unexposed film, those skilled in the art will appreciate that a discrete roll of film also could be used in accordance with the invention, though loading of the apparatus would then need to be accomplished in a darkened environment, where the film could not be exposed by ambient radiation. At the right end of the upper housing, a top door 26 is mounted by a hinge 28, to provide access to an irregularly shaped recess 30 in a top wall of upper housing 18. Suitable gaskets or land and groove seals, not illustrated, should be provided around end door 20 and top door 26 to ensure light tightness when the doors are closed. A catch 44 on top door 26 and catches 46 on end door 20 are provided to hold the doors shut when the apparatus is in use.

Through a bottom wall of recess 30 is provided an essentially rectangular opening 32 for insertion and removal of a camera to be loaded or unloaded. Also through the bottom wall of recess 30 is provided an oblong opening 34 for insertion and removal of a transfer cartridge for exposed film. Rigidly affixed to an under side of top door 26 is a downwardly depending actuating lever 36 which extends through an opening 38 in the bottom wall of recess 30 to coact with a camera nest to be described subsequently. Attached to an underside of door 26 is a retainer bracket 40 which supports a resilient pad 42 in position to engage a front surface of a camera positioned within the apparatus when the door is closed. Pad 42 thus is compressed and holds the camera down and toward the back of the apparatus. A grille 48 is provided on lower housing 14 to cover a cooling air inlet to the electronic controller of the apparatus. A pivotable control console or operator interface 50 is supported on a back edge of support plate 12 and includes a key pad 52 for entering customer and other information and a visual display 54.

Figure 3A:
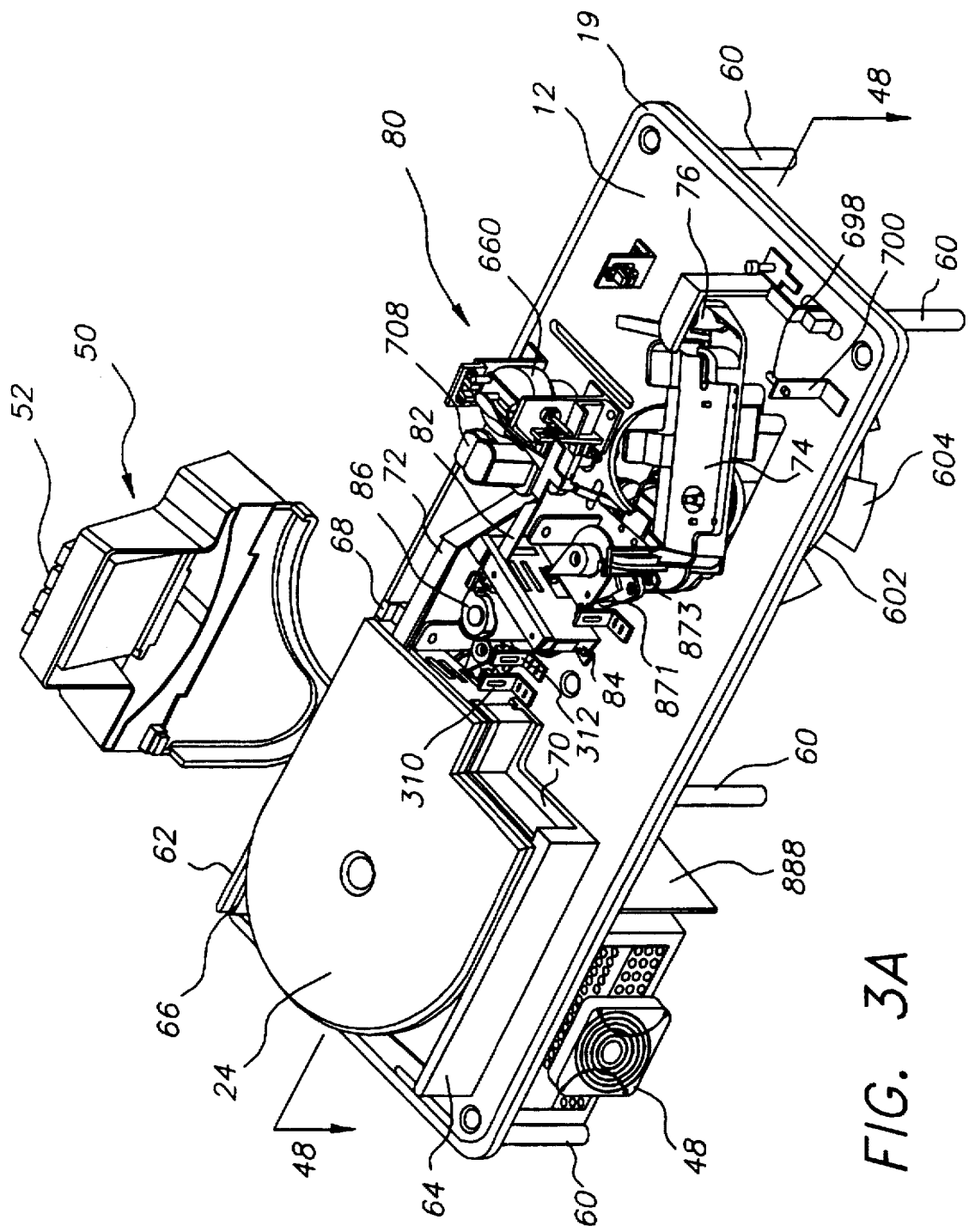
FIG. 3A shows the apparatus of FIG. 1, with the upper and lower housings removed.

As shown in FIGS. 2 and 3A, console 50 can be pivoted up and back to permit removal of the upper housing for access to the internal components of the apparatus. Support plate 12 is mounted within lower housing 14 on a plurality of downwardly extended support legs 60. On an upper surface of the support plate, a compartment for cassette 24 is defined, in part, by a rear wall 62 and a front wall 64. A ledge 66 may be provided on back wall 62 to support a guide flange 68 extended along one side of cassette 24 as seen best in FIG. 5. Ledge 66 and flange 68 thus cooperate to ensure proper orientation of the cassette. An interior stop wall 70 extends from front wall 64 toward back wall 62, to limit movement of the cassette into the apparatus.

As shown in FIG. 3A, cassette 24 is positioned to feed unexposed film into an unexposed film loading means such as a track 72 which extends essentially to the right on support plate 12. Toward the right end of the apparatus, a camera nest 74 is pivotably mounted at 76. In the position shown in FIG. 3A, nest 74 is directly below opening 32, to permit insertion or removal of a camera. As will be discussed in greater detail subsequently, a spring 78, visible in FIG. 3B, biases nest 74 to rotate clockwise from the position of FIGS. 3A and 15, toward the back of the apparatus to the position of FIGS. 3B, 25 and 35. In the latter position, an electromagnet assembly 81, visible in FIG. 3B, secures the nest to enable the camera to cooperate with film loading track 72 and with features of a camera actuating and testing station 80. Although a pivoted nest is illustrated, those skilled in the art will appreciate that nest 74 could be mounted to slide without pivoting between a position for receiving a camera and a position for actuating and testing the camera. Alternatively, actuating and testing station 80 could be mounted to move into engagement with a stationary nest, without departing from our invention. An exposed film unloading means such as a track 82 is provided to accept exposed film from the camera and guide the film through a cutter 84 to a transfer cartridge 86 where the exposed film is wound on a spool. Those skilled in the art will appreciate that transfer cartridge 86 could be omitted and unloading track 82 configured to guide the exposed film directly to a photographic processor, not illustrated.

From the foregoing description, those skilled in the art will understand the general operation of the apparatus. A cassette 24 of unexposed film is inserted into the apparatus and door 20 is closed and latched. A camera to be loaded or unloaded is inserted through opening 32 into nest 74. Assuming the camera is to be completely or partially unloaded, a transfer cartridge 86 is inserted through opening 34. Top door 26 is then closed and latched. To prevent opening of doors 20 and 26 during operations of the apparatus, solenoid actuated locks, not shown, may be used. Closure of the top door causes actuating lever 36 to pivot toward the back of the apparatus, thereby permitting spring 78 to rotate nest 74 into position before camera actuating and testing station 80, where electromagnet 81 secures the nest. Customer information and information about the status of the camera are then entered via console 50. If the camera has a flash feature and is to be loaded with film, the flash may be tested at this time. A door on the camera is opened and then:

(a) If the camera is empty, unexposed film is driven from cassette 24 and guided along loading track 72 into the camera. When a desired length of film has been loaded, a knife in the cassette cuts the film and a discrete cut strip is driven into the camera. In accordance with the invention, the discrete strip does not require any separate light shielding cartridge or paper within the camera.

(b) If the camera is full of exposed film, the exposed film is driven from the camera and guided along unloading track 82, through cutter 84 and into transfer cartridge 86. The camera then may be reloaded, if desired.

(c) If the camera contains a partially exposed length of film, the exposed portion is driven from the camera into transfer cartridge 86 and the film is cut by cutter 84. The remaining unexposed film is then driven back into the camera.

After the camera has been loaded or unloaded, as the case may be, the door on the camera is closed. Electromagnet 81 is deenergized and the solenoid locks, if provided on doors 20 and 26, are released. Top door 26 may then be opened, which causes actuating lever 36 to engage nest 74 to swing the nest back beneath opening 32 where the camera may be removed. Transfer cartridge 86 also may be removed and sent to a photographic processor.

Cassette 24

Figure 5:
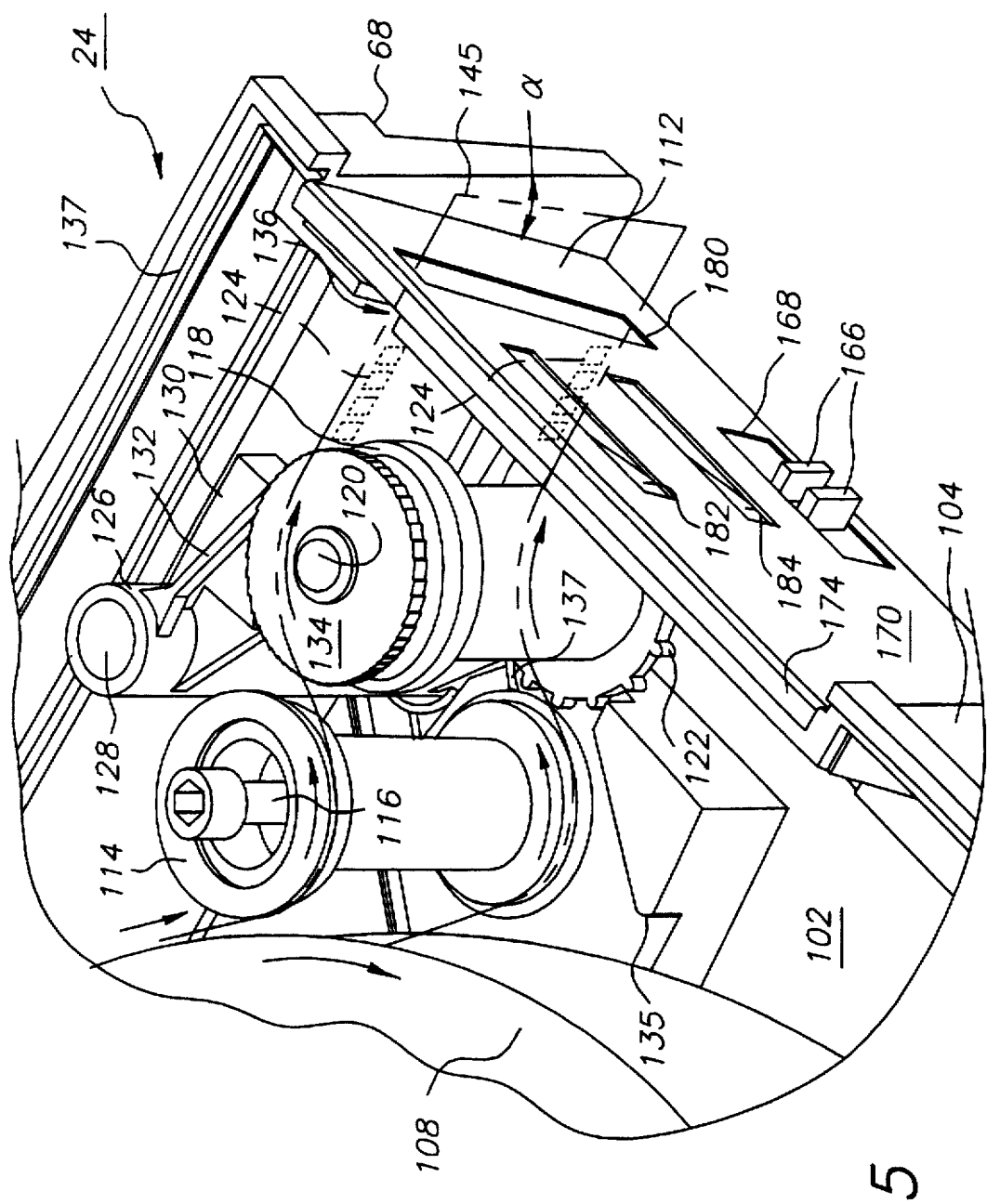
FIG. 5 shows an enlarged, fragmentary view of features for driving and guiding film from the cassette.

Referring now to FIGS. 4 to 8, those skilled in the art can understand the structure and operation of one cassette 24 suitable for use in apparatus 10. The cassette comprises a rigid, opaque body or housing 100 which may be made from any suitable material such as molded plastic, metal or the like. A bottom wall 102 is L-shaped at one end where the cassette mates with stop wall 70 and rounded at the other end where a roll of photographic film is mounted. Extended upwardly from and around bottom wall 102 is a peripheral wall 104. A removable cover 106 mates with an upper edge of wall 104 to close the cassette. Within the cassette, a roll 108 of photographic film, shown fragmentarily in FIG. 5, is wound on a central core 110 which is rotatably supported on a stub shaft 220, shown in FIG. 8. As shown in FIG. 5, a lead end 112 of the film is wrapped partially around an idler roller 114 supported for rotation on an upwardly extended shaft 116 mounted to bottom wall 102. Means are provided in the cassette for engaging the lead end to drive the web material from the cassette. The lead end wraps partially around a driven sprocket roller 118 supported for rotation with an upwardly extended drive shaft 120 whose lower end extends through an opening in bottom wall 102 for a purpose to be discussed subsequently. A plurality of teeth 122 on the sprocket roller engage edge perforations 124 along at least one edge of the film. A spring-biased keeper 126 is pivotably mounted on an upwardly extended shaft 128. A pair of contact pads 130, only one of which is visible in FIG. 5, engage the edges of the film to hold the film in engagement with the sprocket roller. An anti-backup pawl 132, formed integrally with the keeper, engages a saw toothed ratchet wheel 134 attached at an upper end of the sprocket roller, to prevent reverse rotation. Those skilled in the art will appreciate that a pair of nip rollers could be used rather than a sprocket roller, without departing from the scope of the invention. Alternatively, a toothed belt drive or a reciprocating vacuum shuttle could be used for short lengths of web. An exit slit 136 extends through peripheral wall 104 opposite sprocket roller 118. A raised lip 137 extends substantially around an upper surface of peripheral wall 104 to mate with a corresponding groove, not illustrated, on an under side of cover 106, thereby providing a seal against entry of light into the cassette.

On the exterior of housing 100 adjacent slit 136 is provided an essentially L-shaped recess 138 which extends along side wall 104 and also wraps around onto an under surface of wall 102. Recess 138 slideably receives a knife comprising a sliding knife holder 140 on which is mounted a flat knife blade 142 having a leading, angled cutting edge 144. A front surface of recess 138 in peripheral wall 104 is angled inwardly at an acute angle a between a plane of wall 104 and a plane of the recess, to enable blade 142 to provide a tapered or angled leading edge 145 on the film. Preferably, angle α is about 10°. See FIG. 5. The lead end of the film leaving the cassette must thread along film loading track 72. Angled leading edge 145 eases entry into and passage along the loading track and into the camera. Within recess 138 and adjacent exit slit 136 is provided an essentially J-shaped recess 146. A correspondingly shaped knife bed 148 is fixedly mounted in recess 146 with an edge 150 essentially aligned with an edge of exit slit 136. During cutting, knife blade 142 and edge 150 are in close sliding engagement, thereby cooperating to scissor the film as the blade moves to a closed position. As a result of the illustrated arrangement of sliding knife blade 142 and knife bed 148, a cut end of the film remains within the cassette just behind blade 142, ready to be dispensed during a later cycle of operation, there being no wasted portion of the film left extended from the cassette after cutting.

Figure 6:
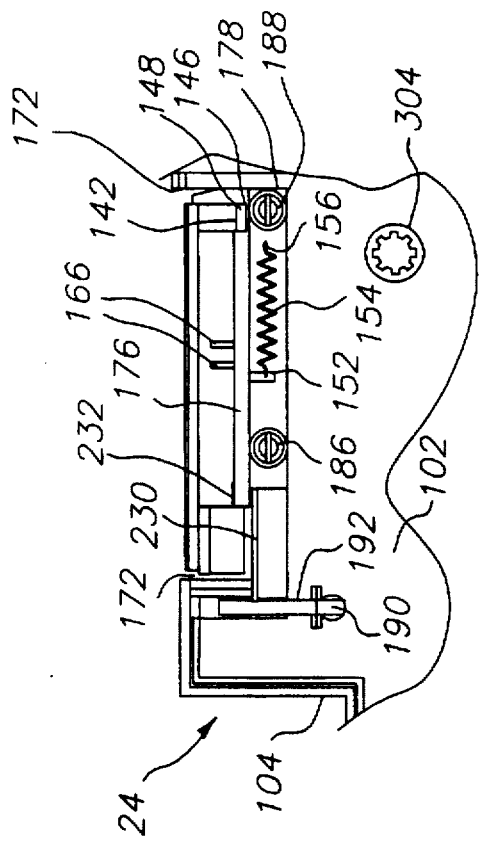
FIG. 6 shows a fragmentary view of the underside of the film cutter of the cassette.

As shown in FIG. 6, a tab 152 near an inside lower edge of knife holder 140 is attached to one end of a tension spring 154, whose opposite end is attached to an anchor 156 on an under edge of peripheral wall 104, thus urging the knife holder and blade to the right, as viewed in FIGS. 4 to 6, to close exit slit 136. On an outside surface of knife holder 140, as shown in FIGS. 4 to 6, a pair of actuator tabs 166 are formed which extend laterally through a horizontal slot 168 formed in a knife cover plate 170 which is fixedly mounted against a pair of stop surfaces 172 spaced outboard of recess 138. The stop surfaces are shown best in FIG. 6 where cover plate 170 has been omitted for ease of illustration. The cover plate comprises along an upper edge a lip 174 for engaging an upper edge of peripheral wall 104; and along a lower edge, a bottom flange 176 for engaging a recess 178 into bottom wall 102, as shown in FIG. 6. As illustrated, recess 178 is the lower wall portion of L-shaped recess 138. An exit slit 180 extends through the cover plate, in alignment with exit slit 136. To hold the assembly of holder 140 and blade 142 firmly within recess 138 and against knife bed 148, a pair of leaf springs 182, 184 are formed integrally in the cover plate, as shown in FIG. 7. Suitable fasteners 186, 188 extend through bottom flange 176 into the body of the cassette to secure the cover plate, the fasteners but not the cover plate being shown in FIG. 6.

Figure 8:
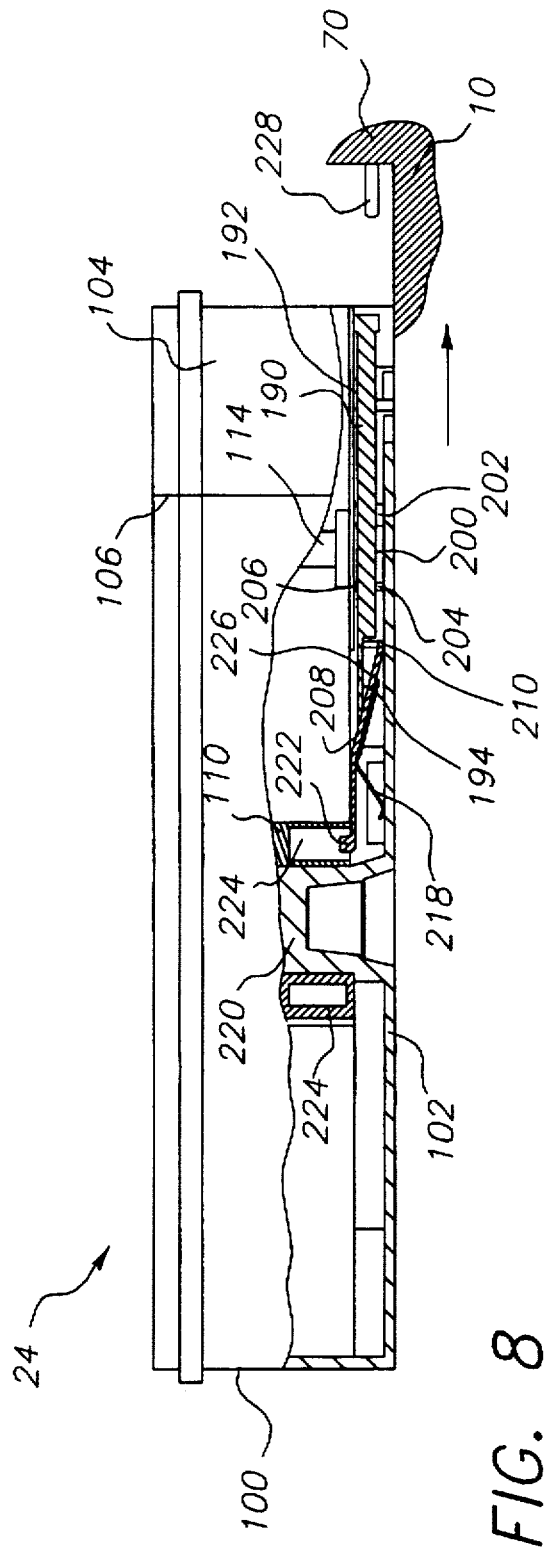
FIG. 8 shows a view along line 8—8 of FIG. 4.

As shown in FIGS. 4 and 8, means are provided for preventing rotation of core 110 or movement of knife 140, 142 from a closed position, during handling and shipment of the cassette. An actuator plunger 190 is slidably mounted in a passage 192 through peripheral wall 104. Within the cassette, a channel 194 is defined along bottom wall 102 between a pair of parallel guide walls 196, 198. A coil spring 200 is slideably received on plunger 190 and is captured between a retainer flange 202 on the plunger and a transverse stop 204 extended between walls 196, 198. A cover plate 206 is attached by suitable fasteners to close the upper side of channel 194. Plunger 190 is used to actuate an anti-backup lever 208 having at one end a pivot axle 210 whose ends are pivotably received in a pair of notches 212, 214 formed in walls 196, 198. A pair of tabs 216 on one end of cover plate 196, only one tab being visible in FIG. 4, retain axle 210 in notches 212, 214. Between lever 208 and bottom wall 102 is positioned an essentially V-shaped leaf spring 218, one end of which bears against stop 204 and the other of which bears on bottom wall 102, just outside of a stub shaft 220. Spring 218 thus forces lever 208 to pivot upwardly, as viewed in FIG. 8. At its end opposite axle 210, lever 208 includes an upwardly extended latching finger 222 which is forced by spring 218 to extend into one of a plurality of recesses 224 formed in core 110, to keep the core from rotating on the stub shaft during handling or shipment of the cassette. Plunger 190 includes a sliding cam surface 226 which engages lever 208.

When the cassette is installed in apparatus 10, as shown fragmentarily in FIG. 8, a probe 228 on stop wall 70 of the apparatus engages plunger 190 and forces the plunger to move to the left as seen in FIG. 8. This movement causes lever 208 to pivot downwardly, thereby withdrawing latching finger 222 from recess 224 and freeing the roll of film to rotate. The same movement also releases knife 140, 142. A knife release arm 230 extends laterally from plunger 190 and includes a latching finger 232 which, before engagement of the plunger by probe 228, extends through an opening 234 in recess 138 into an opening 236 in knife holder 140, to prevent movement of the knife during handling or shipment. When plunger 190 is moved to the left in the manner just described, latching finger 232 is pulled out of opening 236, thus freeing the knife for movement to cut the film.

In use of the cassette of FIGS. 4 to 8, the cassette is inserted by sliding it into apparatus 10, thereby moving plunger 190 and freeing both core 110 and knife 140, 142. Tabs 166 are then engaged by a mechanism shown in FIGS. 9 and 10 to move the knife away from the knife bed against the action of spring 154, thus opening exit slit 136. Driven sprocket roller 118 is then rotated to drive the film from the cassette. When a sufficient length has been driven from the cassette, knife 140, 142 is driven back toward knife bed 148, thereby cutting the film and blocking exit slit 136. To prevent a trailing end of the just-cut film from being captured between knife 140, 142 and knife cover plate 170, the knife may be cycled open to release the trailing end, if captured, and then closed again. The leading end of the film remains within the cassette just behind blade 142, ready to be dispensed during a later cycle of operation, there being no wasted portion of the web material left extended from the cassette after cutting.

Actuator Mechanism for Cassette 24

Figure 11:
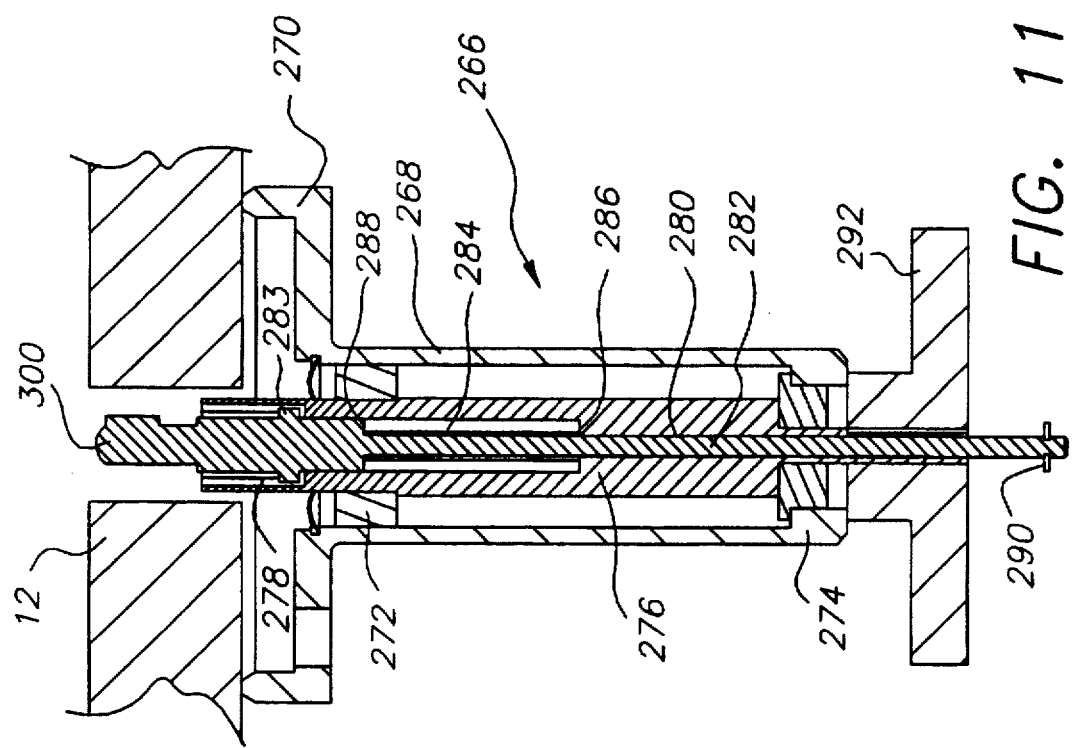
FIG. 11 shows a view along line 11—11 of FIG. 10.
Figure 10:
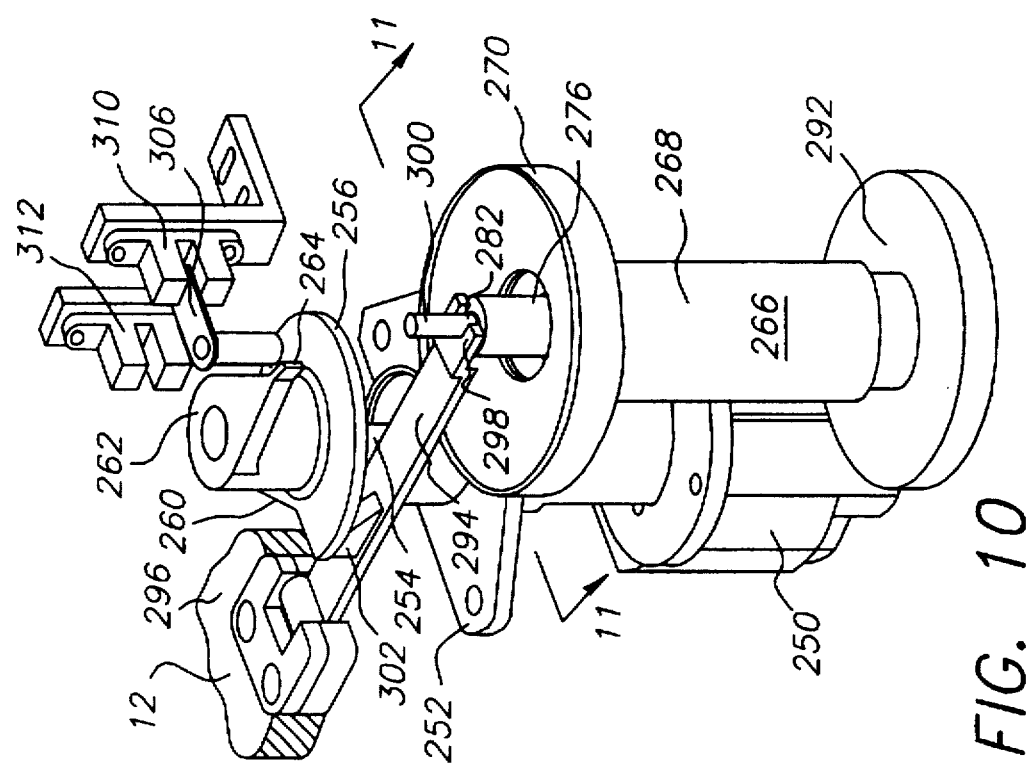
FIG. 10 shows an enlarged, fragmentary perspective rear view of the features for actuating the film cutter of the cassette and for operating the cassette.

FIGS. 9 to 11 show an actuator mechanism for the cassette. A rotary actuator 250, typically electrically operated, is supported from the under side of support plate 12 by a mounting flange 252. For ease of illustration, support plate 12 is shown fragmentarily. A drive shaft 254 of the actuator extends upwardly through an opening, not illustrated, in the support plate and rotatably supports an essentially circular cam follower plate 256. An arcuate cutout 258 is provided through plate 256 to engage rotational stop pins, not illustrated, which extend from support plate 12 to limit rotational movement of the actuator mechanism. A V-shaped notch 260 is provided through plate 256 for cooperation with a wedge cam 302 to be described subsequently. On an upper end of shaft 254, a radial actuator arm 262 is fixedly mounted, the arm having a radially extending actuating finger 264 which is positioned between actuator tabs 166, as seen in FIG. 9.

As shown in FIGS. 9 and 11, beneath the cassette, a cassette drive assembly 266 is mounted to the under side of support plate 12. Assembly 266 includes a tubular housing 268 having a radial mounting flange 270 at its upper end. Within housing 268, a pair of bearings 272, 274 rotatably support a hollow shaft 276 having a splined counter bore 278 at its upper end. A through bore 280 in shaft 276 slideably receives a driver shaft 282 having splines 283 to engage the splines of counter bore 278. A spring 284 is captured between a shoulder 286 on shaft 276 and a shoulder 288 on shaft 282, thus tending to force shaft 282 to move upward. At the bottom of shaft 282, a stop ring 290 limits upward movement. A timing pulley 292 is fixedly attached to the lower end of shaft 276; so that, rotation of shaft 276 will rotate shaft 282, due to the splined coupling 278, 283.

FIGS. 9 and 10 show the position of the parts when knife 140, 142 has closed exit slit 136. Actuator 250 rotates counter-clockwise to open the exit slit. An actuator lever 294 is pivoted at one end to a pivot block 296 recessed into support plate 12, the lever extending downward through a slot in the support plate, as shown fragmentarily in FIG. 44. At its other end, lever 294 comprises a fork 298 which receives the upper end 300 of shaft 282. Just below cam follower plate 256, lever 294 supports a wedge cam 302 which tapers toward fork 298. Thus, when actuator 250 rotates counter-clockwise, a leading edge of notch 260 will slide along cam 302, thus allowing lever 294 to pivot upward in response to expansion of spring 284 and movement of shaft 282, to permit end 300 to engage an externally accessible drive coupling 304 for sprocket roller 118, shown in FIG. 6. As shown in FIG. 10, a sensor flag 306 is mounted on follower plate 256. Thus, as the follower plate rotates during actuation of knife 140, 142, flag 306 cooperates with adjacent sensors 310, 312 mounted on support plate 12, as shown in FIGS. 3A and 10, to indicate whether exit slit 136 is open or closed. Sensors 310, 312 preferably each comprise an infrared light source and detector pair. Thus, when sensor flag 306 passes between the source and the detector, the outputs of the sensors will indicate the status of exit slit 136. Similar sensors are used throughout the apparatus to detect presence of a film strip or sensor flag, as will be understood by those skilled in the art from the remainder of this description.

Film Loading and Unloading Tracks

Figure 12:
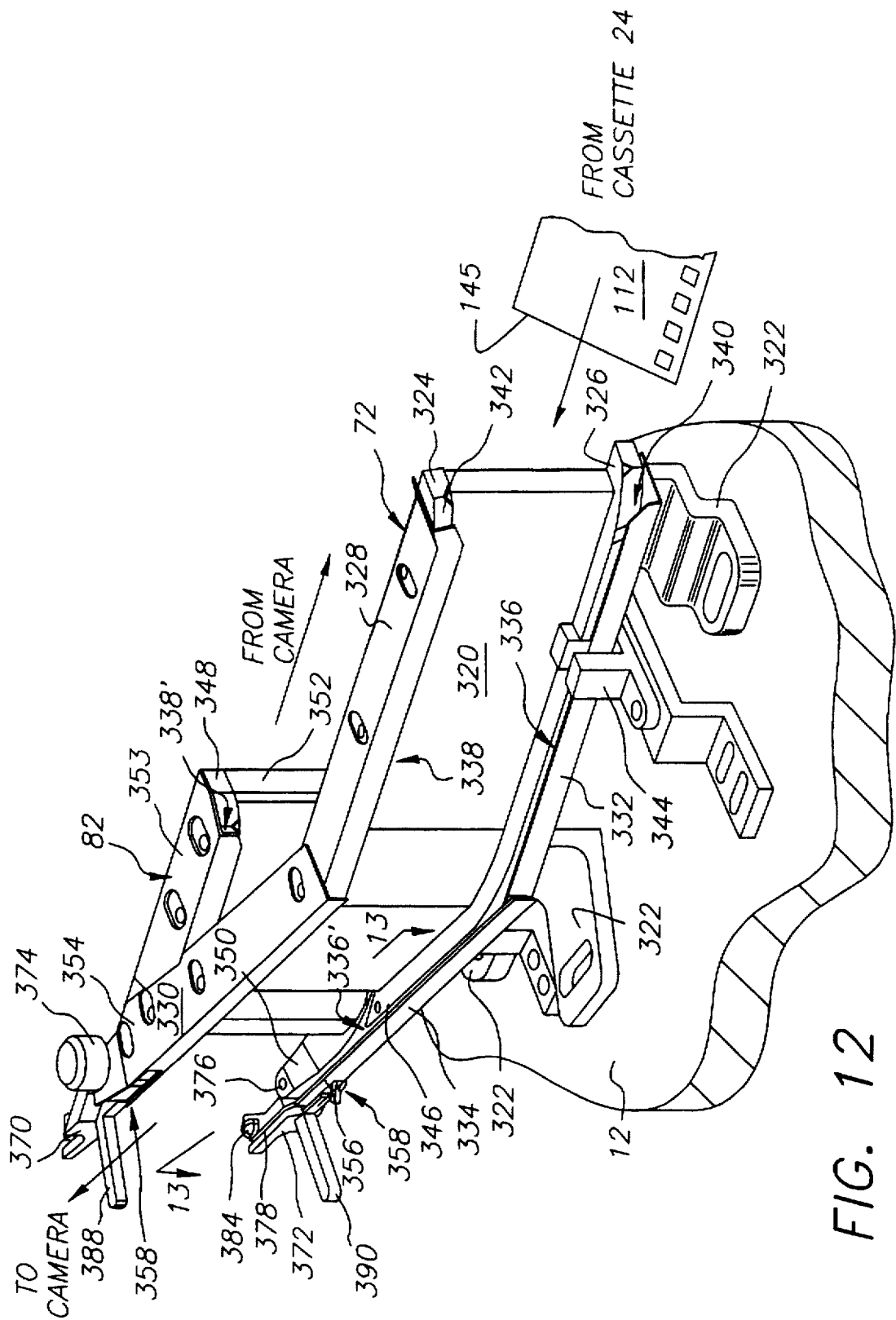
FIG. 12 shows an enlarged, perspective rear view of the film loading and unloading tracks, looking from the perspective of the cassette.
Figure 13:
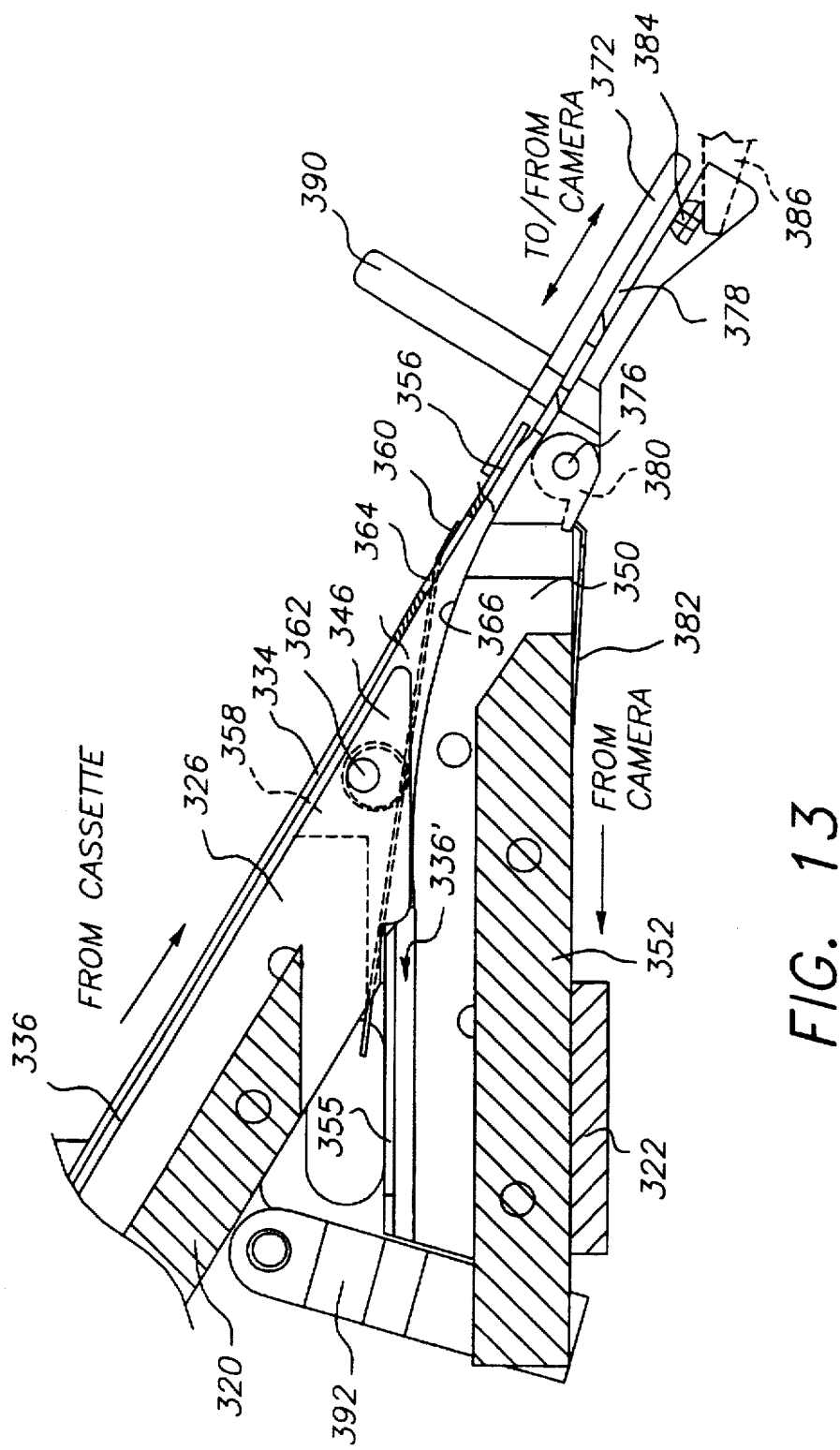
FIG. 13 shows a view along line 13—13 of FIG. 12, with details of the loading and unloading tracks.

FIGS. 12 and 13 show various features of film loading track 72 and film unloading track 82. In FIG. 12, the view is from the back of the apparatus, just down stream from exit slit 136. For a more compact arrangement, a shallow V-shaped frame member 320 is provided, extending from near exit slit 136 toward the back of the camera when the camera is in position at actuating and testing station 80. A plurality of mounting brackets 322 support frame member 320 just above support plate 12. An upper side rail block 324 and a lower side rail block 326 are attached to respective upper and lower edges of frame member 320. Upper retainer flanges 328, 330 and lower retainer flanges 332, 334 are attached to the rail blocks to define between the blocks and flanges a lower film guide slot 336 and an upper film guide slot 338. To ease movement of a film strip into the guide slots, flared inlets 340 and 342 are provided which, as seen in FIG. 3A, are positioned closely to exit slits 136, 180 to readily receive a leading end of film as it is driven from cassette 24. As shown in FIG. 12, inlets 340, 342 are flared both horizontally and vertically to ensure ease of entry of a film strip. Along guide slot 336, a sensor 344 is located to detect the presence of film within the track.

Side rail blocks 324, 326 each include a tapered downstream end 346 positioned in close proximity, respectively, to an upper side rail block 348 and lower side rail block 350 of film unloading track 82. A frame plate 352 extends between rail blocks 348, 350 and is supported by one of brackets 322. An upper retainer flange 353, shown in FIG. 12, and a similar lower retainer flange 355, shown in FIG. 13, cooperate with rail blocks 348, 350 to define guide slots 336' and 338'. Downstream ends 354, 356 of retainer flanges 330, 334 extend beyond tapered ends 346. Each tapered end 346 includes a slot 358, shown in phantom in FIG. 13, in which a film diverter spring 360 is mounted on a pin 362. When no film is moving down slots 336, 338, an end of spring 360 extends outward through a slot 364 in the adjacent retainer flange. When film is moving down the tracks from the cassette, the leading edge of the film pushes spring 360 aside, thus allowing the film to move on toward ends 354, 356.

Near tapered ends 346, a side surface 366 of each of rail blocks 348, 350 curves gently into essential parallelism with retainer flanges 330, 334, as shown in FIG. 13. At the ends of rail blocks 348, 350, a pair of film guide ramps 370, 372 are mounted on pivot pins 374, 376. Each guide ramp includes a central film guide slot 378 which, in the position of FIG. 13, essentially forms a continuation of one of slots 336, 338. On the opposite side of pivot 376 from guide slot 378, each guide ramp includes a radial arm 380, shown in phantom in FIG. 13. A pair of leaf springs 382, secured at one end to frame plate 352, bear upon respective arms 380 to bias each guide ramp to rotate clockwise as viewed in FIG. 13. Thus, when a camera is positioned at camera actuating and testing station 80 and an access door on the camera is opened, guide ramps 370, 372 will be pivoted under the action of springs 382 until a pair of transverse stops 384 on the guide ramps encounter at least one stop ledge 386 in the camera, as shown in phantom in FIG. 13. Stop ledge 386 will be described further with regard to FIGS. 16, 22, 23A and 23B. Finally, one of a pair of sensor flags 388, 390 is attached to each guide ramp, for cooperation with a pair of sensors to be described subsequently.

When film is driven into the camera, the leading edge of the film presses diverter spring aside to allow the film to move into guide slots 378. When film is driven from the camera, springs 360 divert the film into guide slots 336', 338' leading to cutter 84 for exposed film. Since photographic film being driven from the camera will tend to curl in a direction to move into guide slots 336', 338', use of diverter spring 360 is optional. As the film passes from guide slots 336', 338', a sensor 392 monitors its passage.

In the foregoing description, film loading track 72 and unloading track 82 have been shown and described as open tracks which must be enclosed within some sort of light-tight environment to prevent fogging of the film as it moves between cassette 24 and the camera and between the camera and cutter 84/cartridge 86. However, those skilled in the art will appreciate that, without departing from the scope of our invention, the loading and unloading tracks themselves could be made completely light tight and provided with light seals or gaskets at their ends engaging cassette 24, the camera and cutter 84.

The apparatus of the invention should be capable of operation over a considerable range of ambient temperature, for example, from about 20° to about 40° C. Over such a range, thermal expansion of the width of a film strip could lead to undesirable scraping or dragging of the edges of the film as the edges move through guide slots 336, 338. Conventional photographic film bases of the types suitable for use in accordance with the invention will have a coefficient of thermal expansion of about $8 \times 10^{-5}$ in/in°/C. Thus, by making frame member 320 and frame plate 352 from materials having substantially equal coefficients of thermal expansion, any potential for interference at high temperatures can be minimized. Conventional styrene plastic having a coefficient of thermal expansion in the range of 6 to $8 \times 10^{-5}$ in/in/°C., would be preferred for member 320 and plate 352.

Cooperating Features of Nest 74 and Camera 426

Figure 14:
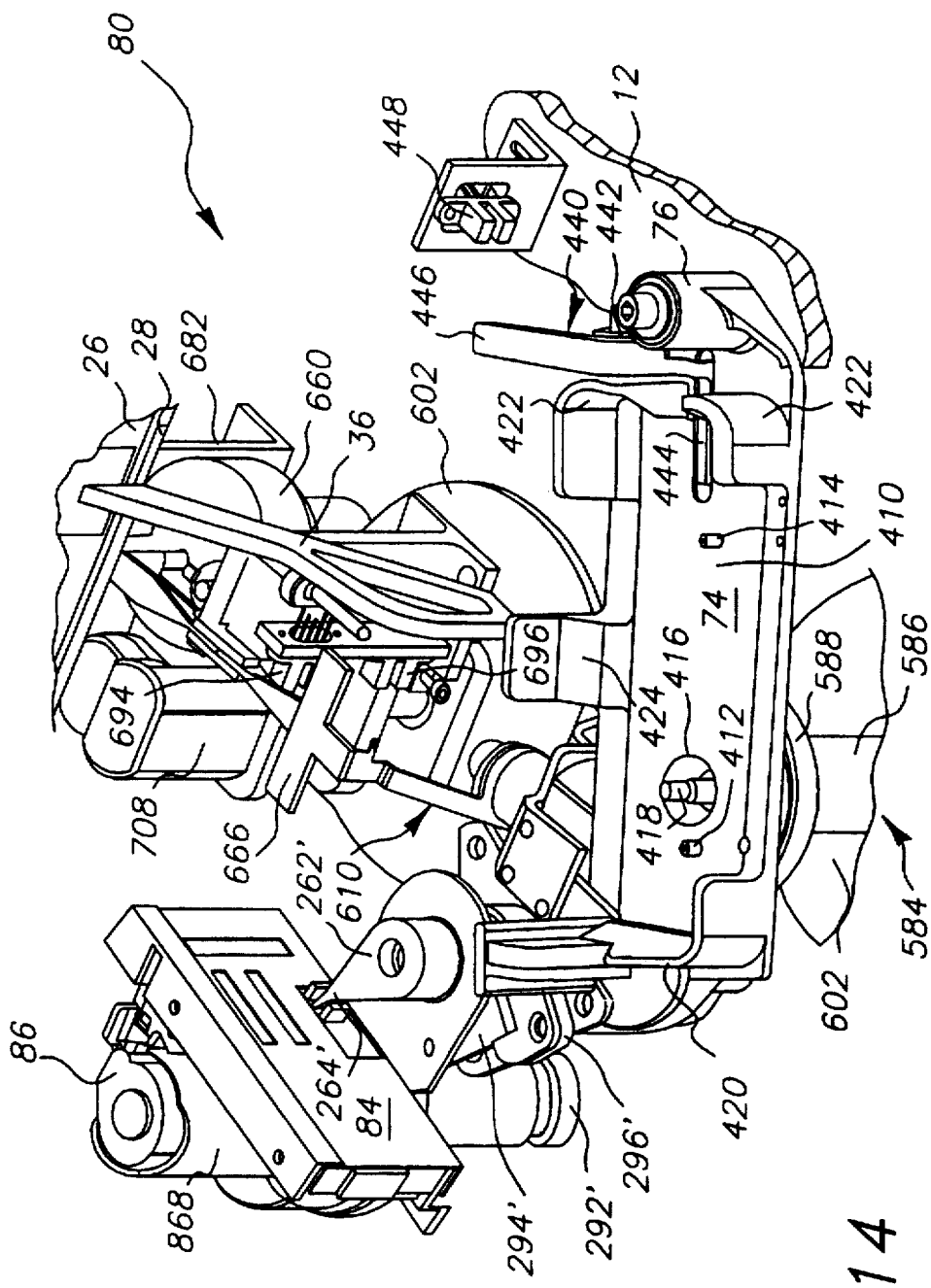
FIG. 14 shows an enlarged, perspective front view of the camera nest, the camera actuating and testing station, and the exposed film cutter and cartridge.
Figure 15:
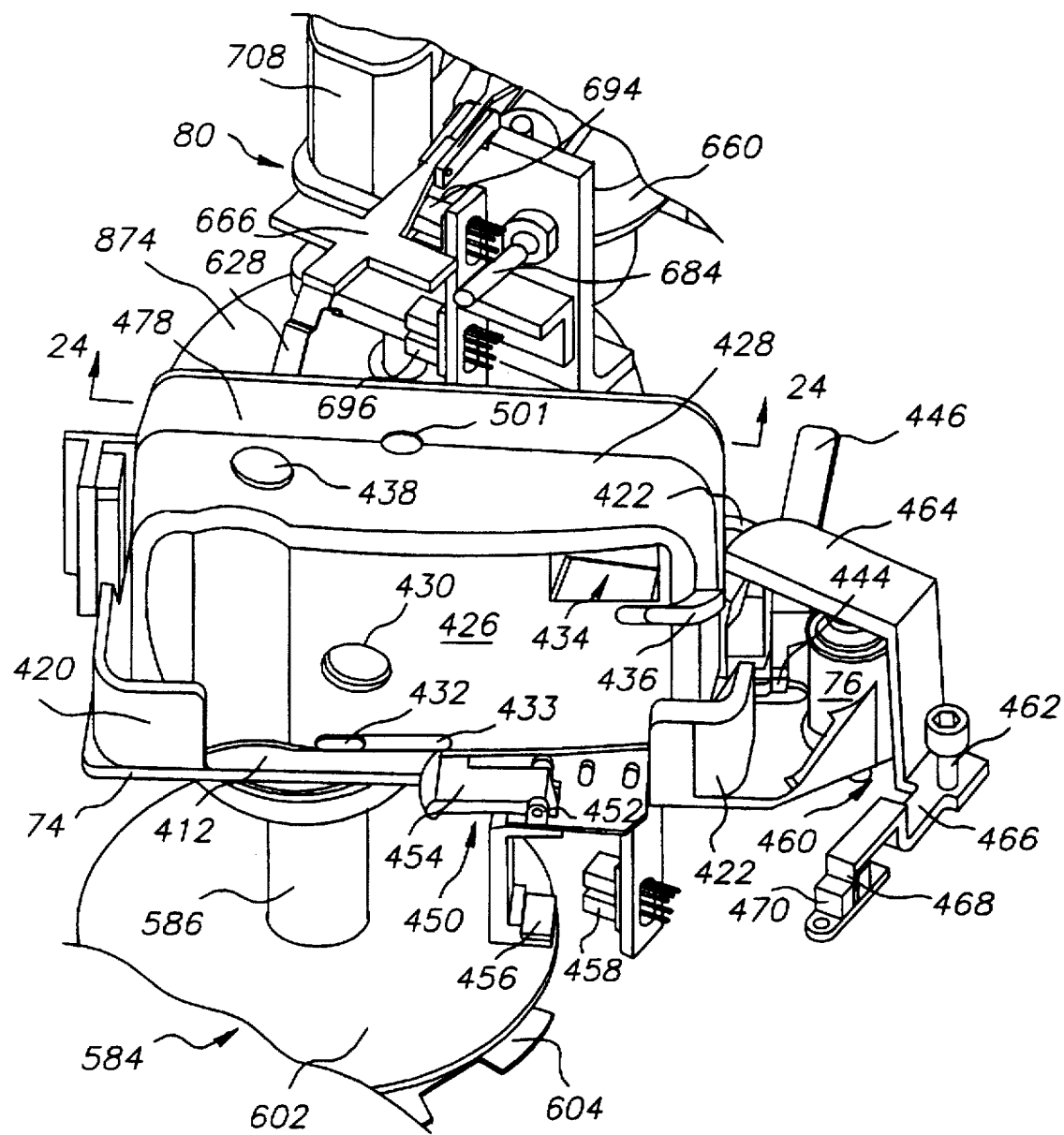
FIG. 15 shows the camera nest with a camera installed, prior to movement of the nest to the camera testing and actuating station.

As shown in FIG. 14, camera nest 74 comprises an essentially rectangular base plate 410 on which positioning pins 412, 414 are mounted for engagement with features in the bottom of a camera. An aperture through the base plate allows passage of a camera drive spindle 418 which engages a drive coupling on the bottom of a camera. Flared end walls 420, 422 and a flared back support 424 ensure that when a camera 426 is lowered into the nest as shown in FIG. 15, the camera will settle closely onto pins 412, 414 and spindle 418. Because nest 74 is biased to rotate clockwise about pivot 76, back support 424 engages a lower end of actuating lever 36. Thus, when top door 26 is closed, spring 78 will cause the nest to swing into place before actuating and testing station 80, where electromagnet 81 will hold the nest in position.

Camera 426 is an example of many types of manually operated cameras which can be used in accordance with the invention. Those skilled in the art will appreciate, however, that features of nest 74 and its associated sensors soon to be described would require adjustment for other camera styles, including motorized cameras, without departing from the scope of the invention. An assembled photographic camera suitable for use in accordance with the invention would include an external housing having at least one movable closure which, in an open position of the at least one closure, would enable a discrete strip of film to be loaded from an exterior of the camera into the camera and a discrete strip of film to be unloaded from the camera to the exterior. Within such a camera, a guide track would extend between an unexposed film chamber and an exposed chamber. Means would be provided for moving a film strip back and forth between the unexposed and exposed film chambers. Those skilled in the art will appreciate that this means for moving could be a conventional toothed sprocket, a pinch roller drive, driven spools in the film chambers, or a combination of such known features for moving film. In the following description of camera 426, specific examples are given of various camera features; however, the apparatus and method of the invention are not limited to use of such a particular camera.

As shown in FIG. 15, the camera includes a front housing 428 having a lens opening 430. In the familiar manner, a lens cover actuator 432 extends through a slot 433 to enable the user to move the lens cover between a closed position, as illustrated, and an open position. In cameras with a flash feature, a flash opening 434 is provided along with a flash activation switch 436 which is moved out to the position of FIG. 15 to activate the flash. On top of the camera, a shutter trigger button 438 is provided in the familiar manner.

Referring to FIGS. 14 and 15, additional features of the apparatus can be understood. A "camera present" treadle assembly 440 is mounted on a pivot 442 at one end of nest 74. Assembly 440 includes a transversely extended treadle foot 444 which is depressed when the camera is placed in the nest. Movement of treadle foot 444 causes a sensor flag 446 to move to a position to actuate a sensor 448 when nest 74 is swung into position at actuating and testing station 80. At the front of the nest, a "lens cover open" treadle assembly 450 is mounted on a pivot 452. A transversely extended arm 454, normally spring-biased upward, extends from the pivot in position to be engaged by lens cover actuator 432 if the lens cover is open. Movement of arm 454 causes a downwardly extended, L-shaped sensor flag 456 to move to a position to actuate a sensor 458 suspended from the nest. Near the pivot end of the nest, a "flash activated" lever assembly 460 is mounted on a pivot 462 on support plate 12. Assembly 460 includes a transversely extended arm 464 in position to be engaged by flash actuator switch button 436 as the nest is swung into position at station 80. Movement of arm 464 causes a transversely extended arm 466 to move to a position where a sensor flag 468 can actuate a sensor 470 mounted on support plate 12.

Figure 16:
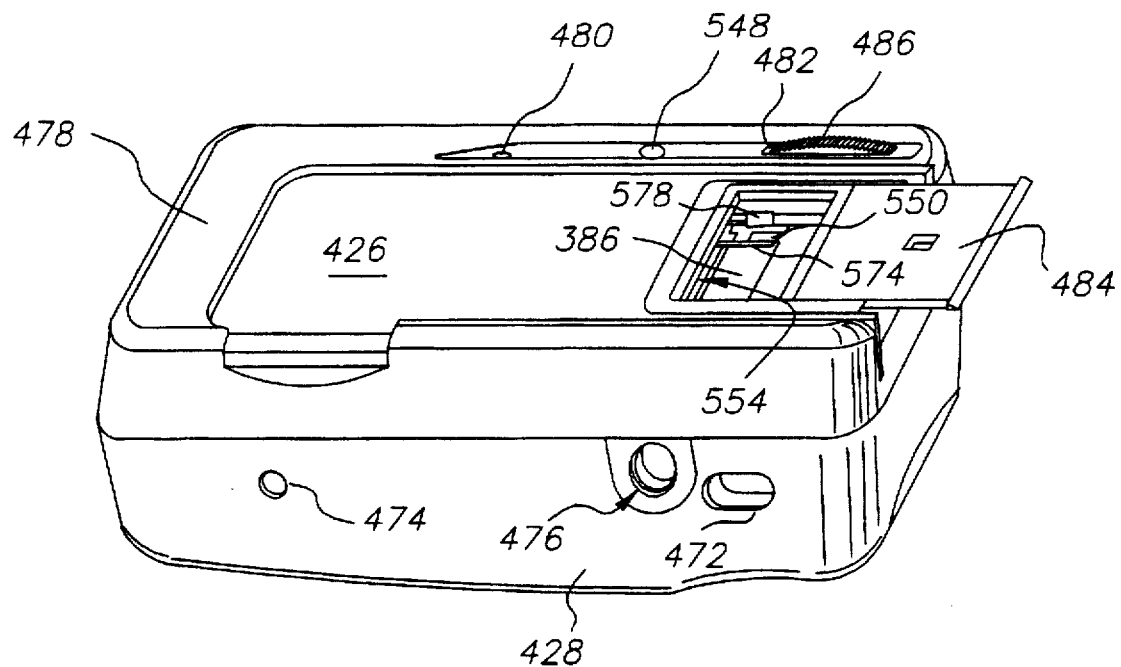
FIG. 16 shows a perspective view of the back and bottom surfaces of the camera.

As shown in FIG. 16, the bottom of the camera includes an aperture 472 which permits pin 412 to engage the internal frame of the camera, not illustrated, and an aperture 474 which permits pin 414 to engage the internal frame. An externally accessible drive shaft coupling 476 is recessed into the bottom of the camera for cooperation with spindle 418. A back housing 478 includes an opening 480 through which a "flash ready" light may be observed and a slot 482 for a thumbwheel 486. A movable closure, such as a sliding door 484, is provided to permit film to be loaded into or unloaded from the camera.

Figure 17:
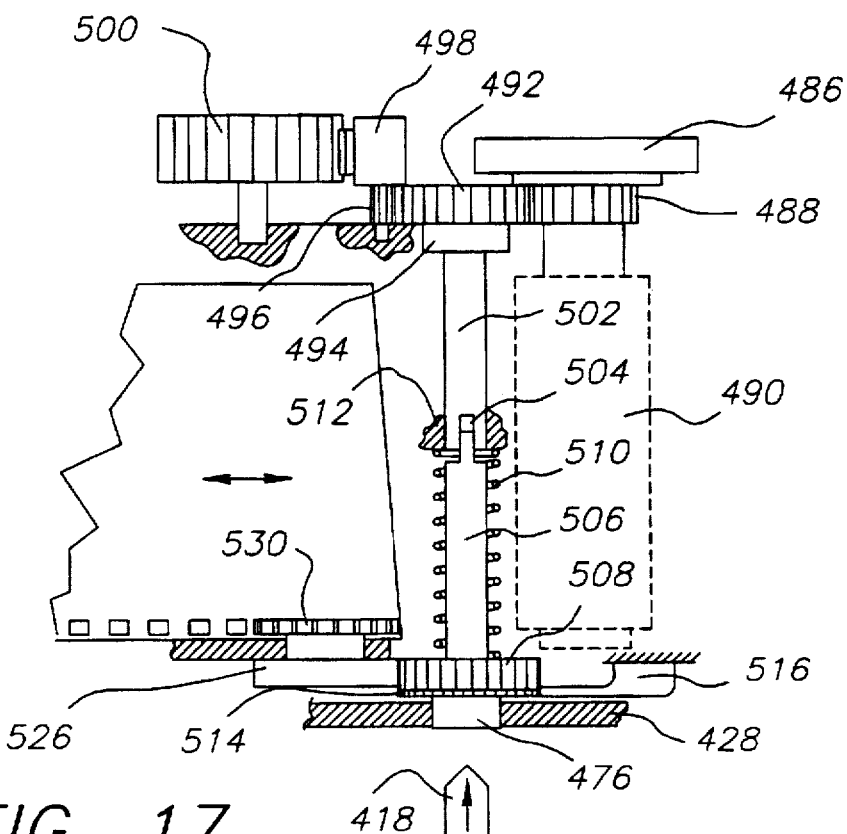
FIG. 17 shows a schematic view of film advancing gearing within the camera.
Figure 18:
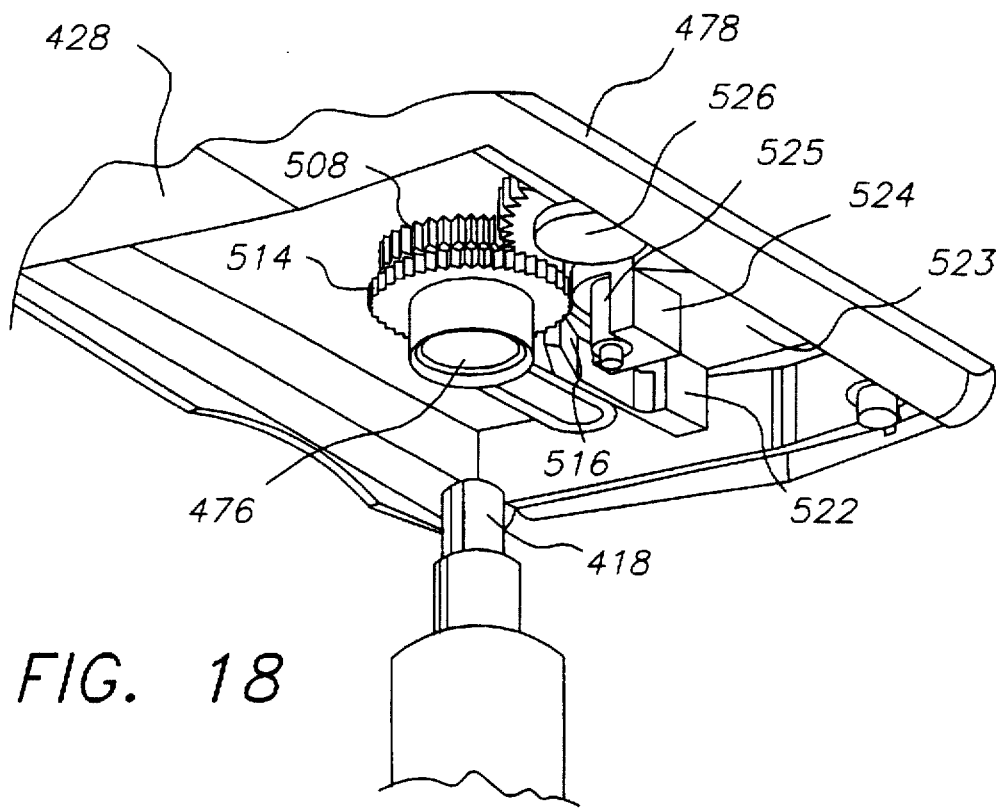
FIG. 18 shows an enlarged, partially broken away view of the externally accessible drive coupling, prior to engagement by the drive spindle.
Figure 19:
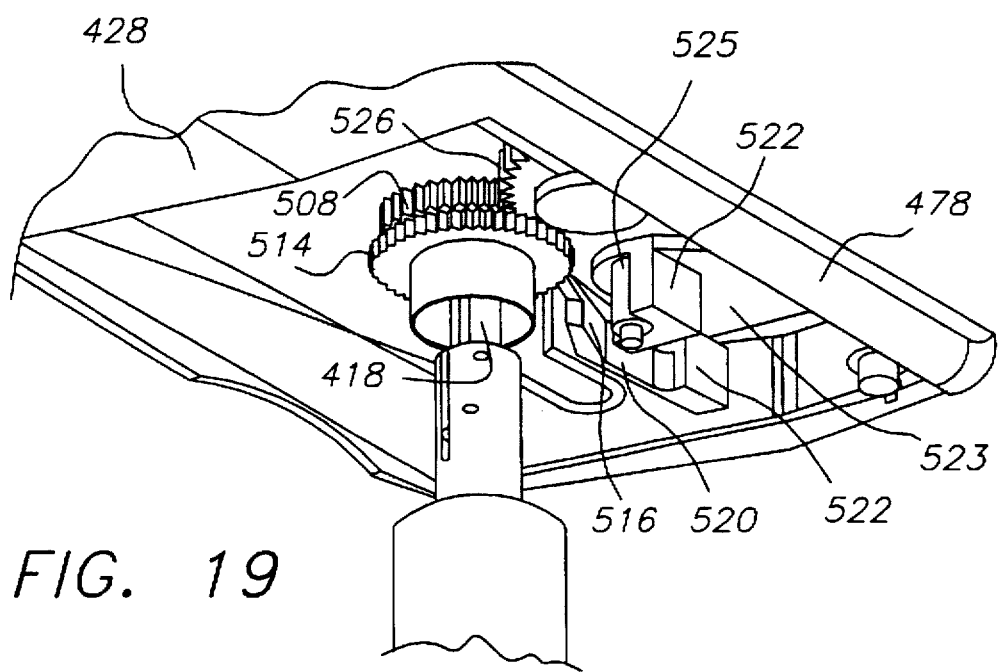
FIG. 19 shows the features of FIG. 18, after engagement with the drive spindle.

FIG. 17 shows schematically a gear train for advancing film into or out of the camera. Thumbwheel 486 is connected for rotation with a gear 488 and a conventional film takeup spool 490, all mounted for rotation on bearings within the camera, not illustrated. Gear 488 meshes with a gear 492 which is connected for rotation with a shutter reset cam 494, in a conventional manner. A smaller gear 496 meshes with gear 492 and is connected for rotation of a counterwheel advancing pawl 498 which meshes with a counterwheel 500. A window 501, visible in FIG. 15, is provided through the camera housing in the conventional manner, to enable a user to see the numbers on the counterwheel. The gear ratios are chosen so that one revolution of gear 496 will move counterwheel 500 sufficiently to indicate passage of a single frame of film. A shaft 502 supporting gear 492 extends downward in the camera and, via an axially extensible joint 504, is connected for rotation with a shaft 506. On the lower end of shaft 506 is mounted a sprocket drive gear 508. A spring 510 is captured between a stop 512 in the internal frame of the camera and gear 508; so that, drive gear 508 is normally biased toward a first position near the bottom of the camera. As shown in FIGS. 17 to 19, an anti-backup gear 514 is formed coaxially with drive gear 508 and normally is engaged with an anti-backup pawl 516 to prevent reverse rotation. See FIG. 18. A gear 526 is meshed with drive gear 508 and mounted coaxially on a shaft with a film drive sprocket 530 which engages the perforations in the film. Preferably, gears 508, 526 and 530 are geared one to one.

When the camera is lowered into nest 74, spindle 418 engages coupling 476 and pushes the coupling upward from the first position of FIG. 18 into the camera to a second position of FIG. 19. This upward movement causes gear 514 to move out of engagement with pawl 516 and into engagement with an angled cam surface 518 shown in FIG. 20. Pawl 516 and cam surface 518 are mounted at a free end of a flexible cantilevered arm 520 extended from a base 522 attached to the internal frame of the camera. As shown in FIGS. 18 and 20, base 522 is molded integrally with a frame plate 523 having at one end a right angle stiffener wall 524. An unillustrated bore extends through frame plate 523 next to wall 524 to enable the frame plate to be installed over a mounting pin 525 extended downward from the internal frame of the camera. When gear 514 moves upward and engages cam surface 518, arm 520 flexes and pawl 516 swings out of engagement with gear 514. Gear 508 has an axial length sufficient to enable driven gear 526 to remain meshed as gear 508 moves up and down. Continued contact between gear 514 and cam surface 518 holds the pawl out of engagement with gear 514. When gear 514 moves downward when the camera is removed from the nest, it slides down along cam surface 518, thus allowing arm 520 to return to its original position and permitting pawl 516 to reengage gear 514. Because gear 514, as illustrated, is somewhat larger in diameter than gear 508, cam surface 518 moves radially inward above gear 514 when pawl 516 is engaged with gear 514.

Figure 21A:
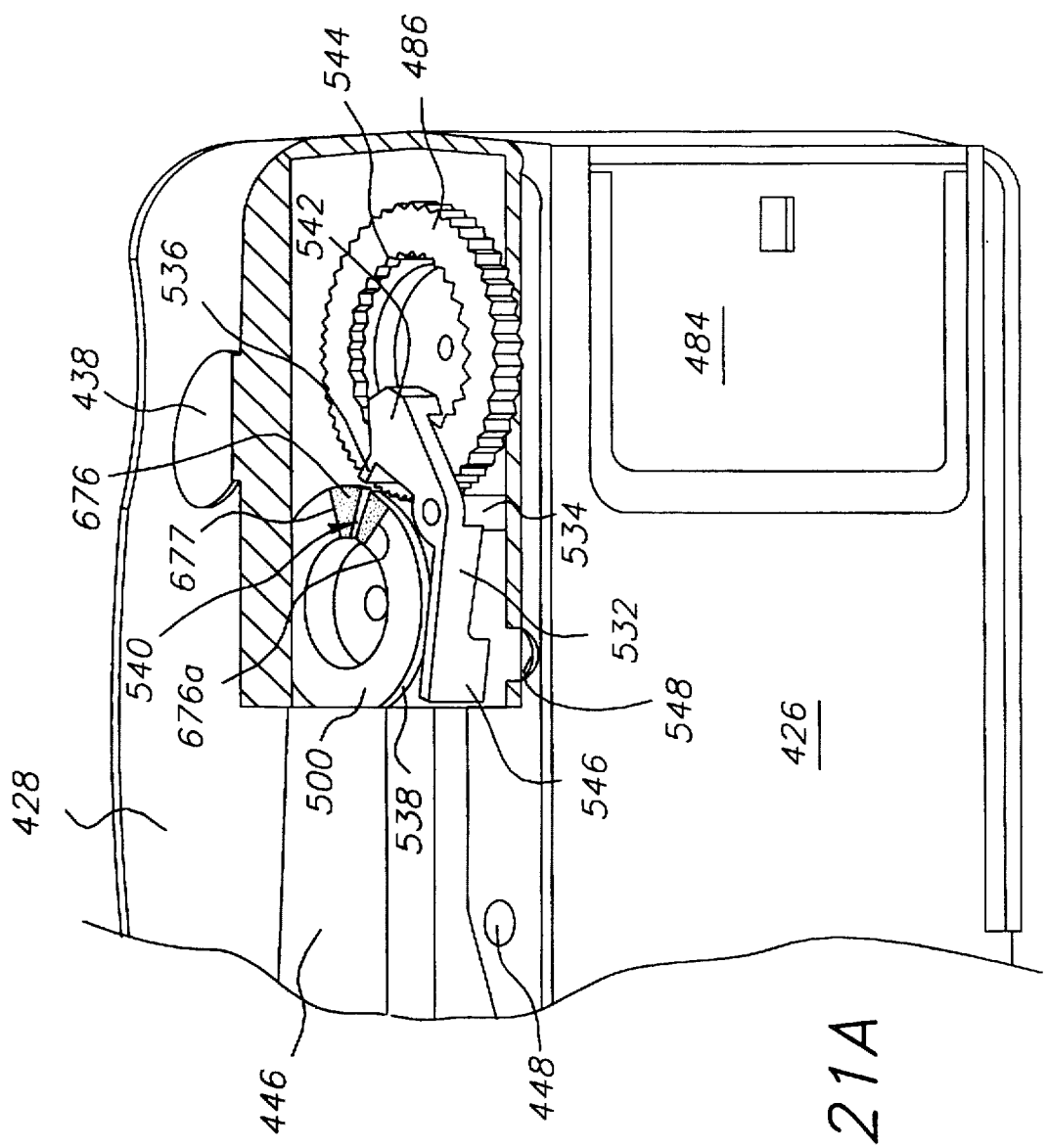
FIG. 21A shows a fragmentary, partially broken away perspective back view of the camera, indicating features of the thumbwheel, zero locking pawl and counterwheel.

FIGS. 21A, B, C and 22 show features of the frame counting and zero locking mechanisms. A zero locking pawl 532 is mounted on a pivot 534 near thumbwheel 486 and is spring-biased to rotate counter-clockwise. Pawl 532 includes a tangentially extended stop finger 536 which usually slides against a cylindrical surface 538 of the counterwheel. However, when the last frame of film has been exposed, finger 536 moves into a radial slot 540 formed in an upper surface of the counterwheel, thus preventing further rotation of the counterwheel. Simultaneously, a locking tooth 542 on pawl 532, hidden from view in FIGS. 21A and 22, engages an inwardly facing saw toothed ratchet 544 provided in the upper surface of thumbwheel 486, to prevent its further rotation. However, to enable the camera to load and unload film in accordance with the invention, means are provided for releasing the zero locking pawl. A release lever 546 extends radially from pivot 534 just inside an access hole 548 through back housing 478. Thus, when the camera is positioned at camera actuating and testing station 80, a probe 684 shown in FIG. 31 will enter hole 548 and push on release lever 546. This causes the zero locking pawl to rotate clockwise and to disengage finger 536 from slot 540 and tooth 542 from ratchet 544. Thus, the gear train of FIG. 17 can be rotated freely in either direction.

Figure 22:
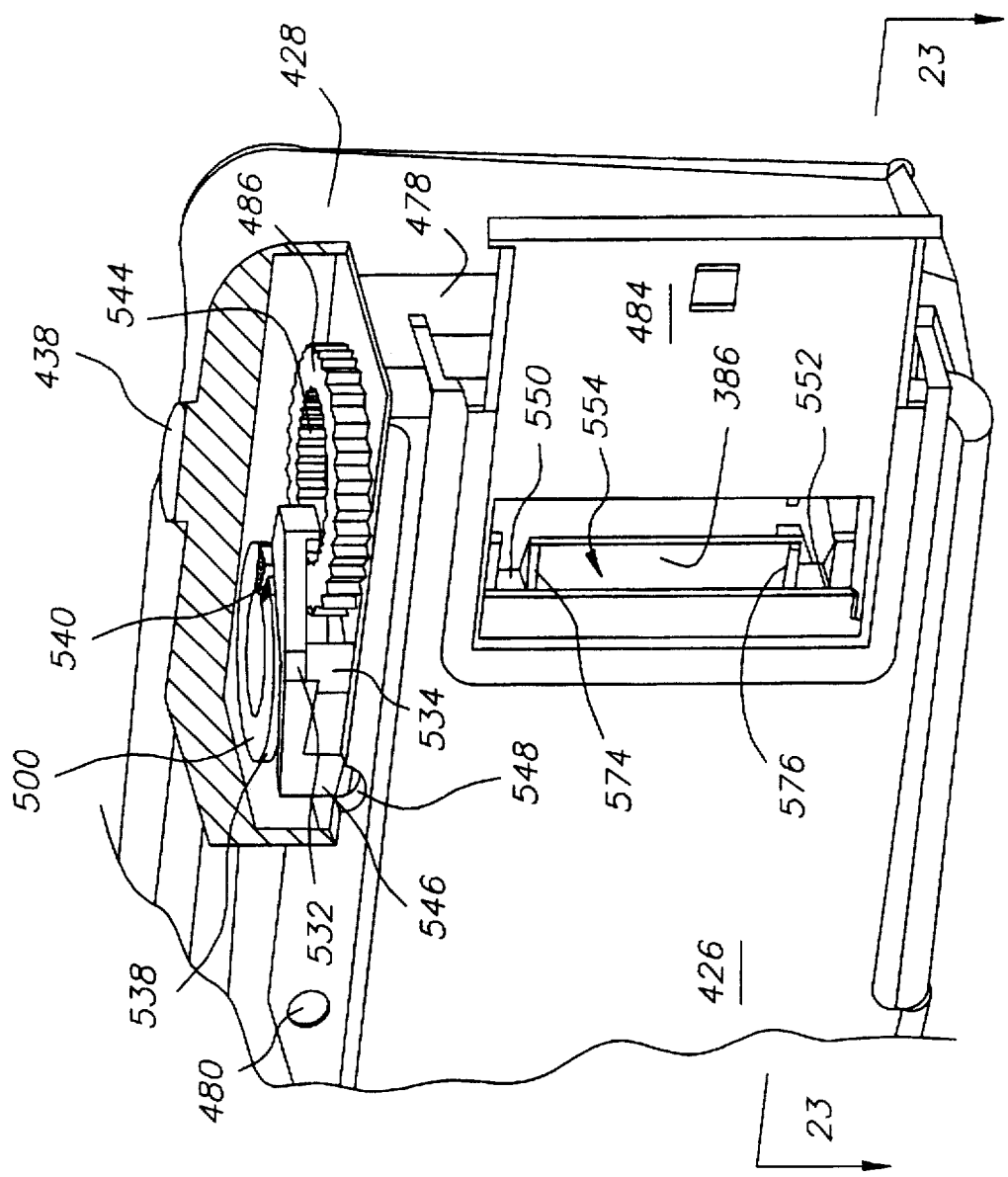
FIG. 22 shows the features of FIG. 21 and also the opened back door of the camera, revealing internal features which cooperate with the structure of FIGS. 12 and 13.

FIG. 22 also shows how sliding door 484 moves to one side to reveal ledge 386, shown in FIG. 13, and a pair of notches 550, 552 formed at the ends of the ledges to receive the ends of guide ramps 370, 372. Also visible in FIG. 22 is an entrance 554 into a film track 566 within the camera. Ledge 386 and notches 550, 552 thus comprise a means at entrance 554 for positioning an external film loading or unloading device for guiding film into or receiving film from guide track 566. FIG. 23A illustrates schematically additional internal details of a camera suitable for use in the apparatus of the invention. In the familiar manner, camera 426 includes an unexposed film chamber 562, an exposed film chamber 564, with film guide track 566 running between chambers 562, 564 to present unexposed film to an exposure chamber 568. Within unexposed film chamber 562, a flexible film scroller 563 may be provided to guide the film strip into a scroll within the chamber. Such a scroller may be of the type shown in U.S. Pat. No. 3,288,388, the contents of which are incorporated by reference into this description.

Figure 23B:
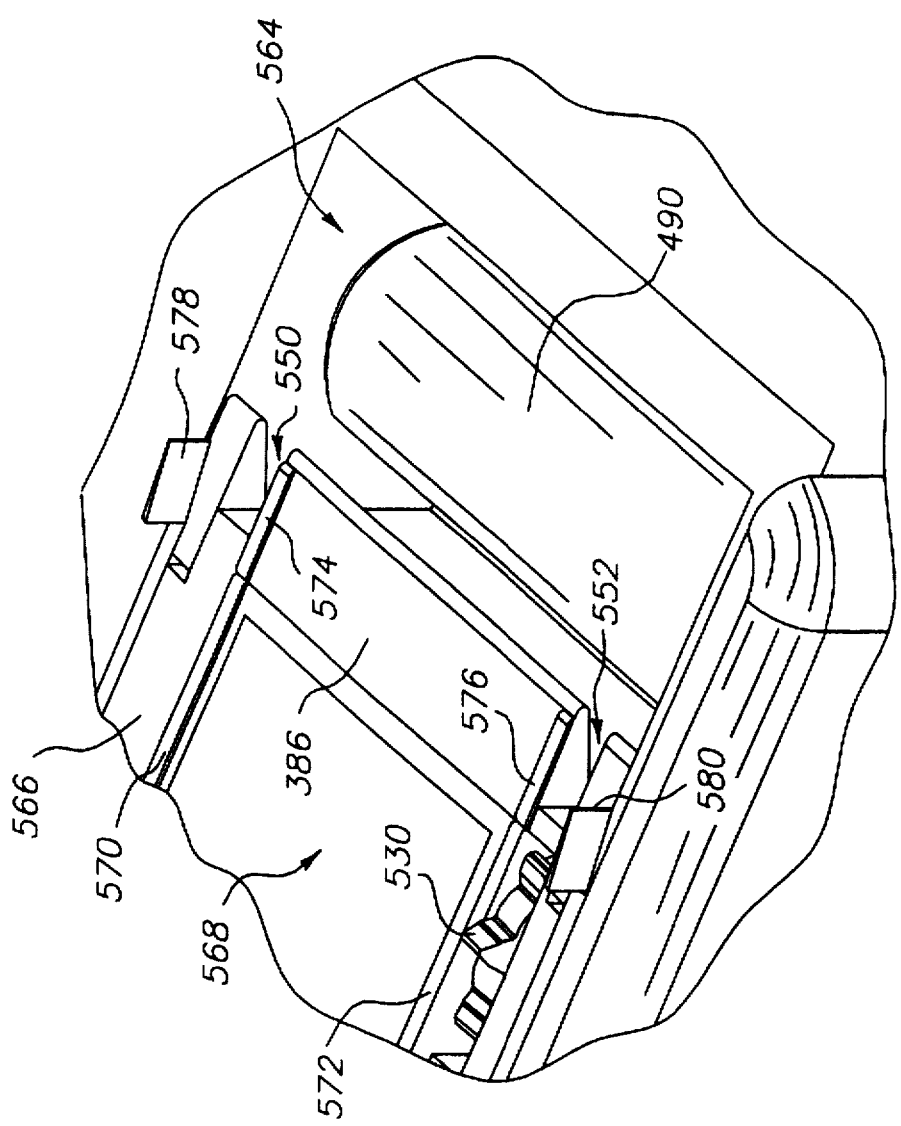
FIG. 23B shows a fragmentary perspective view from the back of the camera, with the back of the camera housing removed to reveal details of the film guide track and stop ledge.

Further details of ledge 386 are illustrated in FIGS. 16, 22 and 23B. As best seen in FIG. 23B, in which the camera back has been removed, ledge 386 preferably is coplanar with guide track 566. In the conventional manner, guide track 566 includes a pair of parallel side rails 570, 572 on which the film is supported just outside of the image area. Similarly, ledge 386 preferably includes a pair of parallel side rails 574, 576 which are located just inboard of notches 550, 552 and form respective extensions of side rails 570, 572. Just outboard of the notches, a pair of guide wedges 578, 580 preferably are provided to engage the longitudinal edges of a film strip to guide and center the strip as it moves through entrance 554 into guide track 566. Between side rails 574, 576, ledge 386 is recessed to avoid contact with the image area of the film. Thus, those skilled in the art will appreciate that the ledge need not be continuous across the width of entrance 554 and that the portion of the ledge between side rails 574, 576 may be omitted without departing from our invention.

Turning now to FIG. 24, features of the camera drive assembly can be understood. Nest 74 includes a downwardly extended boss 582 on which a drive assembly 584 is mounted. Assembly 584 includes a tubular housing 586 having at its upper end an integral mounting flange 588. Within housing 586, a pair of bearings 590, 592 rotatably support camera drive spindle 418, the upper end of which engages an internally splined bore 594 within drive coupling 476. To ensure positive engagement between spindle 418 and coupling 476, a torque transmission pawl 596 is pivoted at 598 within a slot formed in the spindle. A spring 600 biases pawl 596 to rotate outwardly. When a camera is lowered into the nest, pawl 596 will retract into the spindle unless it happens to align initially with groove within coupling 476. Then, when spindle 418 is rotated, pawl 596 will spring outward into the first available groove to provide the necessary positive engagement.

As shown in FIGS. 3B and 24, at the lower end of spindle 418 is mounted a driven gear 602 whose operation will be discussed subsequently. Beneath gear 602 is mounted an encoder disk 604 having a plurality of radially extended sensor flags 605 which cooperate with a sensor 606 suspended beneath support plate 12 on a bracket 608. The number of sensor flags 605 corresponds to the number of teeth on film drive sprocket 530. For example, if the film strip has eight perforations per frame and the drive sprocket has eight teeth, a single rotation of gear 602 will cause eight sensor flags 605 to pass sensor 606, which provides a corresponding output to the controller of the apparatus. A single sensor flag could be used to indicate completion of a rotation; however, a plurality of sensor flags enables the apparatus to advance a partial frame.

In the foregoing description, the camera drive assembly is particularly adapted for use with manually operated cameras. Those skilled in the art will appreciate, however, that our invention is readily adaptable for use with motorized cameras. For example, rather than including the assembly of parts 582 to 604, a motorized camera and nest 74 could be provided electrical interconnections, not illustrated, to enable the controller of the apparatus of operate the motor of the camera to drive film back and forth between chambers 562, 564 during loading and unloading of the camera.

Camera Door Opening Mechanism

Referring now to FIGS. 25 to 30, those skilled in the art will understand the structure and function of a door opening mechanism 610 for sliding open door 484. An L-shaped frame member 612 includes a horizontal mounting flange 614 which is attached to the under side of support plate 12. An electrical rotary actuator 616 is mounted to frame member 612 below flange 614 and includes an output shaft, not illustrated, which extends horizontally through the frame member. A cylindrical spacer 618 is mounted for rotation with the output shaft and supports a depending sensor flag 620 having an arcuate portion 622 positioned to actuate a pair of sensors 624, 626 mounted on the frame member. Outboard of spacer 618 is mounted a door opening arm 628 which also rotates with the shaft of actuator 616. A linear actuator and a pivoted arm, not illustrated, also could be used within the scope of our invention.

Figure 25:
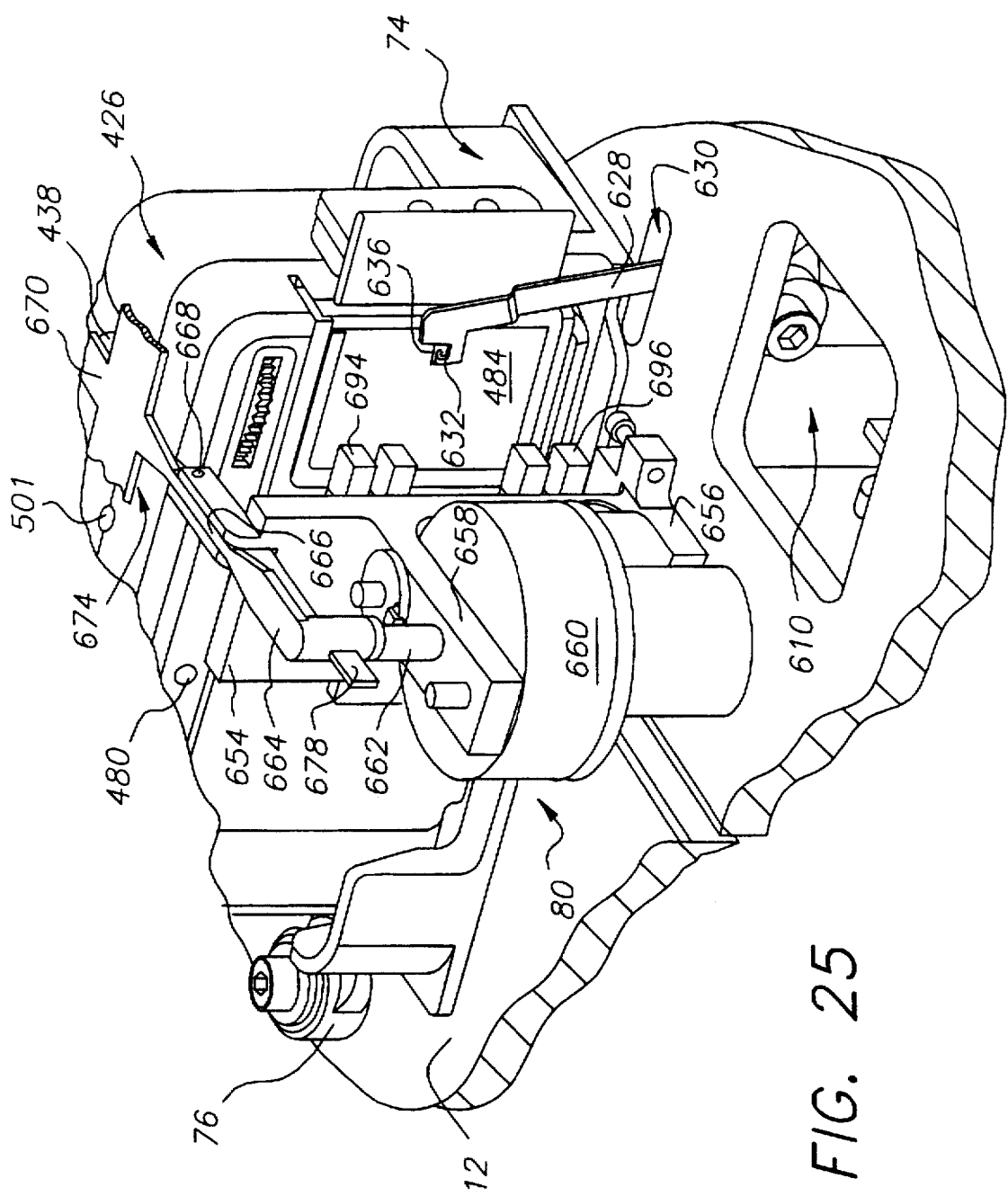
FIG. 25 shows fragmentary, partially broken away perspective back view of the camera, the camera actuating and testing station and the camera door opening mechanism.
Figure 27:
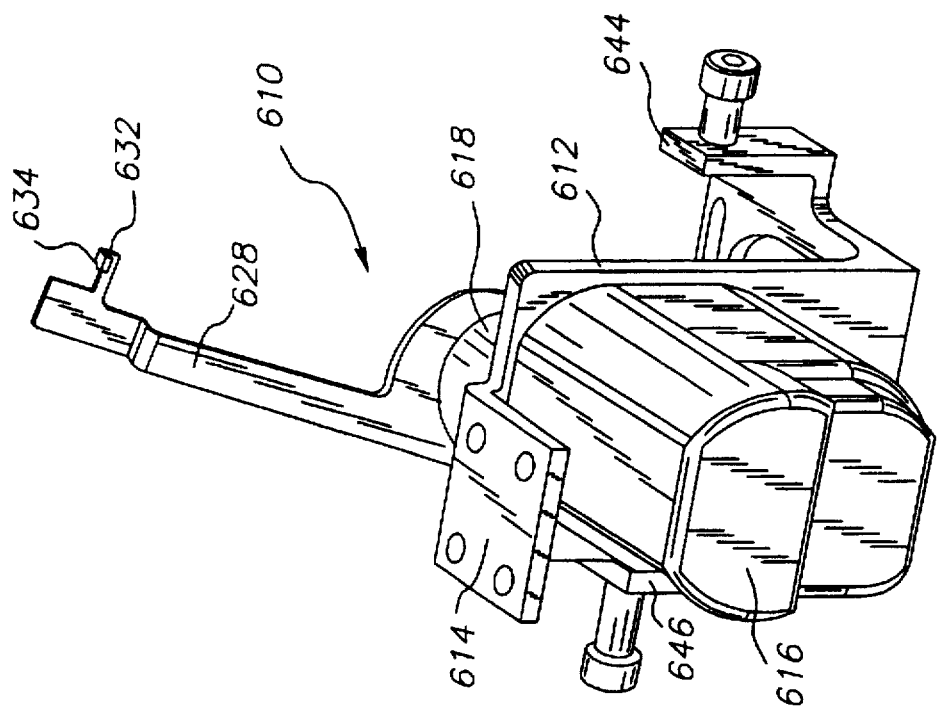
FIG. 27 shows a perspective front view of the camera door opening mechanism.
Figure 28:
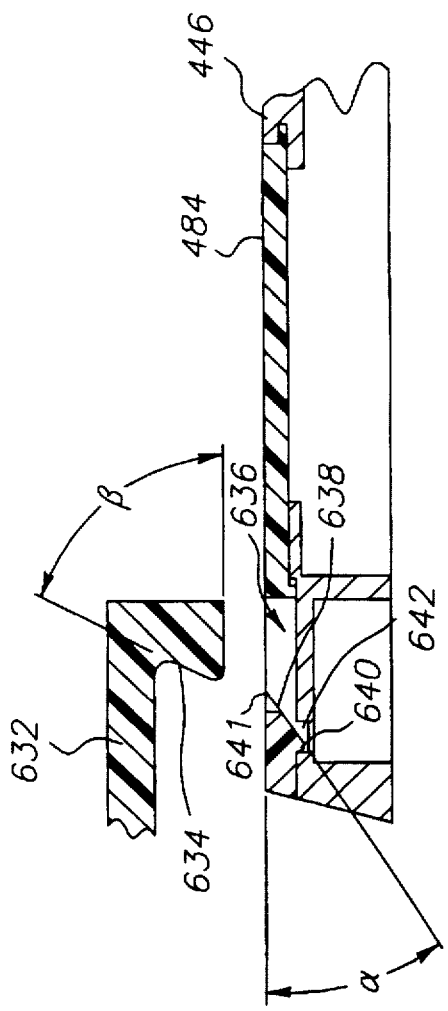
FIG. 28 shows a fragmentary sectional view of the camera door and the door opening mechanism, just prior to engagement.
Figure 29:
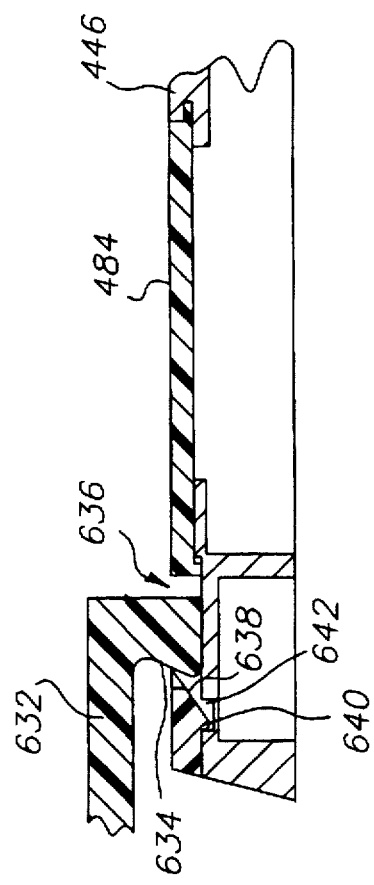
FIG. 29 shows the features of FIG. 28, just after engagement.
Figure 30:
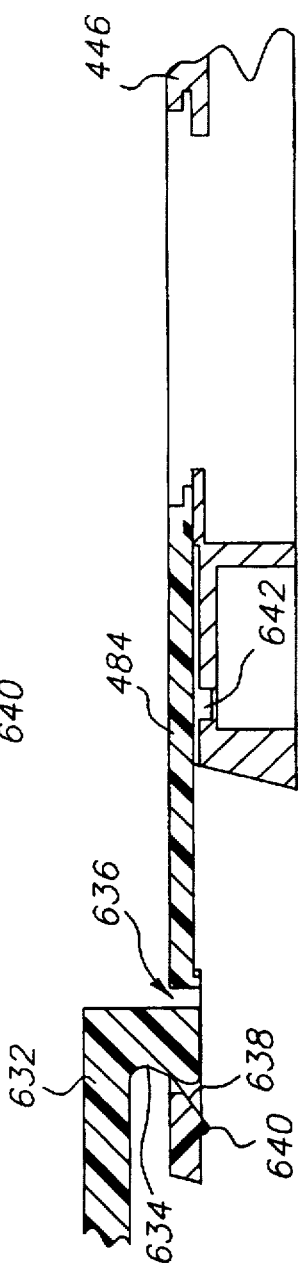
FIG. 30 shows the features of FIG. 28, just after opening the door.

As seen in FIG. 25, a slot 630 extends through support plate 12 to permit a door engaging hook 632 on arm 628 to come into engagement with sliding door 484, when the nest is swung into position at actuating and testing station 80. Hook 632 includes an angled ramp portion 634 having an acute ramp angle β which preferably is greater than 30°, most preferably about 60°, as seen in FIG. 28. A thrust washer 635, flat washer 637 and bolt 639 secure arm 628 to the end of the output shaft. Due to the presence of thrust washer 635, arm 628 is permitted to flex or rock slightly on the output shaft when hook 632 engages a sliding door.

When a camera is swung into the position shown in FIG. 25, hook 632 enters into a slot 636 formed near an outboard side edge of door 484 and arm 628 rocks slightly toward the back of the apparatus against thrust washer 635, to provide a secure engagement. Within slot 636, an angled side wall 638 is positioned to coact with ramp portion 634 in a manner soon to be explained. Side wall 638 is set at an acute angle γ, which preferably is less than angle β, to ensure that an outside edge 641 of side wall 638 first contacts ramp portion 634. As seen in FIG. 28, door 484 includes on an inner surface a catch protrusion 640 which forms an extension of angled side wall 638 and, when the door is closed, extends into an aperture 642 formed in the housing of the camera. Door 484 should be flexible enough to allow catch 640 to slide along the camera housing and snap into aperture 642 when the door is installed initially; however, catch 642 should be substantial enough to prevent the user from opening the door by pushing sideways.

Figure 26:
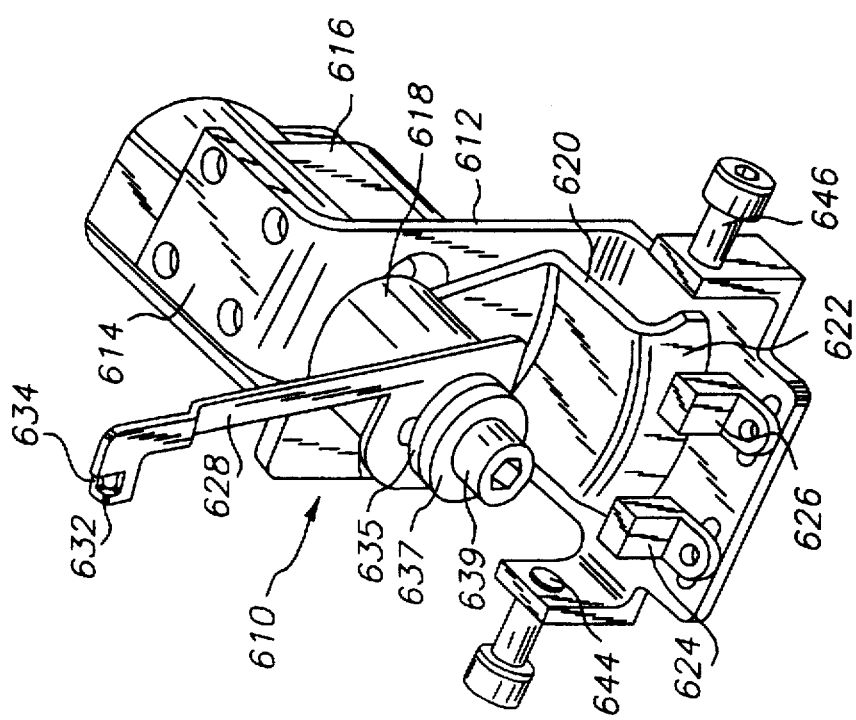
FIG. 26 shows a perspective back view of the camera door opening mechanism.

In operation of mechanism 610, arm 628 initially is rotated counter-clockwise, as viewed in FIG. 26, until a stop 646 and sensor 626 are engaged by arcuate portion 622. Then arm 628 is rotated clockwise until both sensors 624, 626 are engaged. To open the door, arm 628 is rotated further clockwise until arcuate portion 622 moves out of engagement with sensor 626 but remains in engagement with sensor 624. This movement brings ramp portion 634 into contact with edge 641 of angled side wall 638. The camming action of ramp portion 634 during rotation of arm 628 causes door 484 to flex outwardly enough to allow catch protrusion 640 to pull out of aperture 642 and the door to slide to the position of FIG. 30. To close the door, arm 628 is rotated counter-clockwise until stop 646 again is engaged and the catch protrusion once again snaps into the aperture.

Camera Actuating and Testing Station 80

Figures 31, 32:
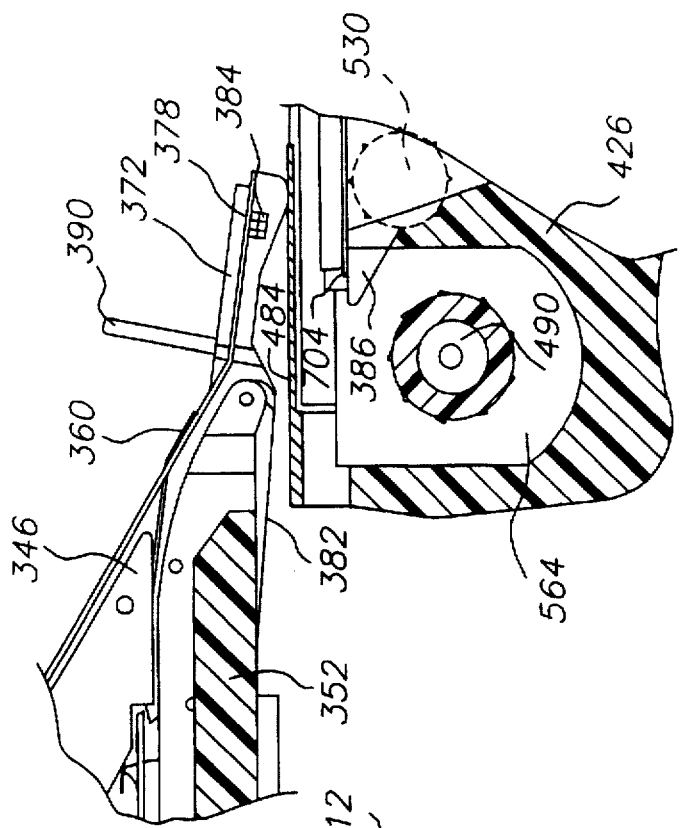
FIG. 31 shows a front perspective view of the camera actuating and testing station.
FIG. 32 shows a sectional view of the camera and guide track, just before opening the camera door.
Figure 39:
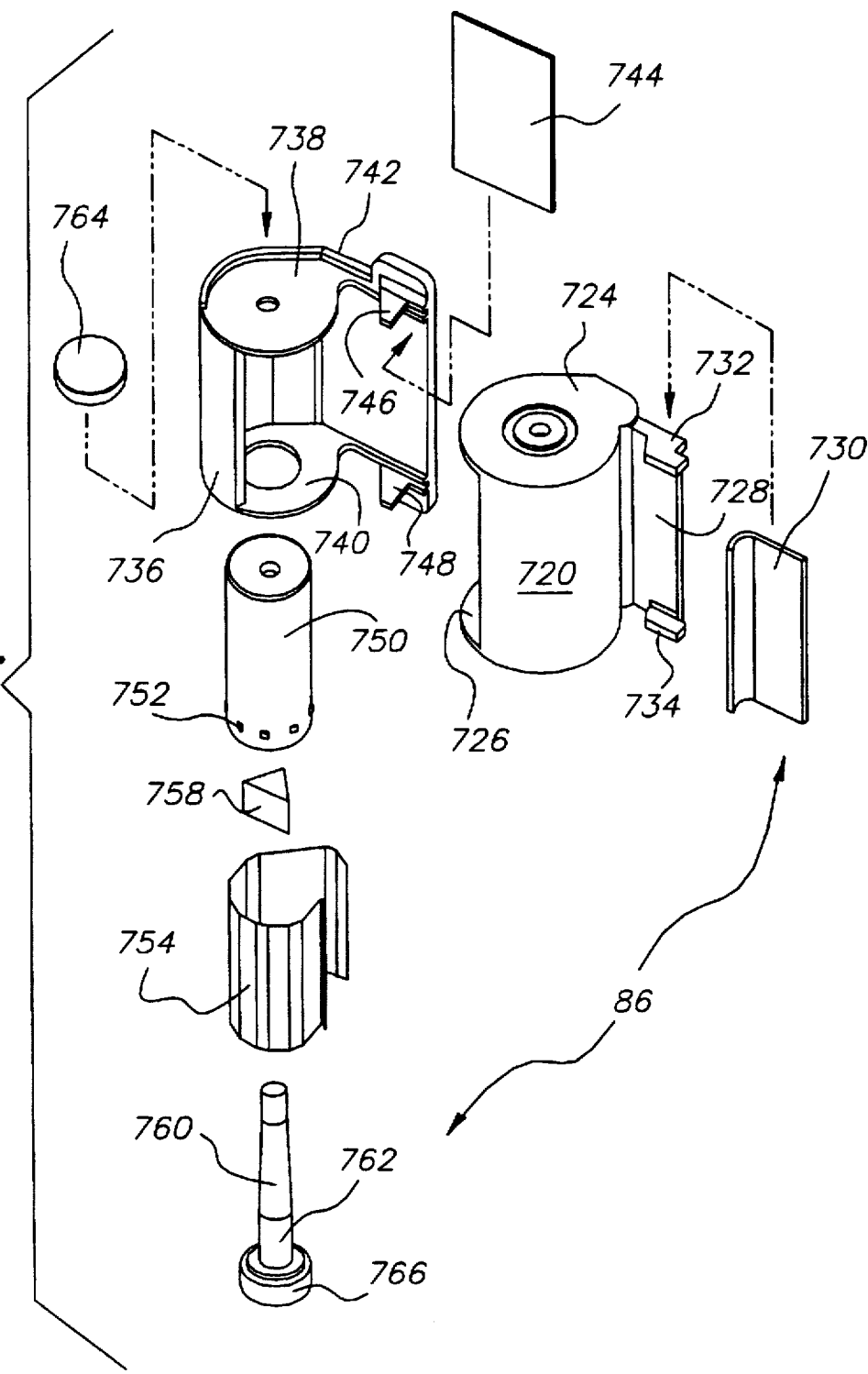
FIG. 39 shows an exploded, perspective view of the transfer cartridge.

As shown in FIGS. 25 and 31, station 80 includes an upwardly extended frame member 654 having a lower mounting flange 656 secured to the upper surface of support plate 12. Frame 654 includes a backwardly extended support flange 658 on the under side of which is mounted an electrical linear actuator 660. An actuator shaft 662 extends upwardly through flange 658 to engage an actuation end 664 of a camera trigger actuating lever 666 pivoted at 668 to the upper end of frame member 654. On the opposite side of pivot 668, lever 666 includes an engagement end 670 which, when a camera is in the position of FIG. 25, is positioned to engage and actuate shutter trigger button 438.

As shown in FIG. 31, behind engagement end 670, a cross bar 672 is provided to support a sensor 674 having an emitter and receiver pair. A suitable sensor is Model P3062-01 made by Hamamatus Corporation of Japan. Such sensors are provided in a single package and typically include an infrared light emitting diode, a photodiode, an amplifier, a Schmitt trigger, an output transistor and a focusing lens. Such a sensor can detect changes in the average reflectance of a surface, as would occur when a surface changes from a dark to a light color, or vice versa. Such a sensor also can detect the presence of a dark-colored mark on a light-colored counterwheel having dark-colored numbers, as in FIG. 21A; or a light-colored mark on a counterwheel having light colored numbers on a dark background, not illustrated.

Thus, as shown in FIGS. 25 and 35, sensor 674 is positioned opposite and sufficiently close to window 501 to enable the sensor to detect the presence of an optically detectable feature on counterwheel 500. As shown in FIG. 21A, such a feature may be a darkened sector 676 on a light-colored counterwheel 500, sector 676 being between the first and last frame numbers and having a leading edge 676a. Sector 676 can be provided in any suitable manner, but must have a reflectance which contrasts with the remainder of the surface of the counterwheel. Alternatively, the feature may be a black or darkened mark 676b of contrasting reflectance at any place on a light-colored counterwheel which passes beneath window 501, as shown in FIG. 21B. Or, the feature may be a mark 676c of an infrared absorbing material at any place on a light-colored counterwheel which passes beneath window 501 as shown in FIG. 21C. Such infrared absorbing materials are conventional and familiar to those skilled in the art and will allow visible light to pass but will absorb infrared. The contrasting reflectance of features 676, 676b or 676c should be such that sensor 674, shown in FIG. 31, can optoelectronically distinguish the mark from a frame number on the counterwheel. A frame number may fill approximately 10% of the field of view at window 501; whereas, mark 676, 676b or 676c preferably should fill approximately 40 to 60% of the field.

As will be discussed in more detail subsequently, feature 676, 676b or 676c can be offset from a first frame indicator on the counterwheel so that presence of the feature beneath window 501 will indicate that all of the film has been exposed. Or, the feature may be offset from a first frame indicator on the counterwheel so that presence of the feature beneath window 501 will indicate that counterwheel 500 has been offset, before loading of fresh film into the camera, to account for the number of frames between cassette 24 and the camera and the length of a leader trailer portion on the film strip.

For example, when sector 676 is positioned between the first and last frame numbers as shown in FIG. 21A, to account for a length of film between cassette 24 and the camera after actuation of knife 140, 142 and a length of a leader portion, sector 676 may have an arcuate extent corresponding to a number of frames of film equal to the sum of such lengths. Either edge of the darkened sector is distinguishable from the typically white color of the remaining surface of the counterwheel, due to a low reflectivity of the darkened sector.

Although the detectable feature most conveniently is located on the counterwheel in the manner just described, those skilled in the art will appreciate that without departing from the invention the feature alternatively could be located on a separate wheel, not illustrated, which would be geared to rotate synchronously with counterwheel 500. In such a case, a separate window, not illustrated, would be provided in the camera housing for viewing the feature. Or, the detectable feature could be provided on a peripheral, vertical edge surface of the counterwheel and viewed, for example, through opening 548 by providing probe 684 with a suitable sensor.

Referring again to FIG. 31, near actuation end 664 a sensor flag 678 is positioned to actuate a sensor 680 supported on an upwardly extended mounting bracket 682. Thus, when actuator 660 is energized, shaft 662 pushes upward on end 664 which causes end 670 to press downward on trigger button 438 to operate the shutter mechanism of the camera. At the same time, flag 678 actuates sensor 680 to confirm that the shutter has been operated.

On a front surface of frame member 654 is mounted a probe 684 having a semicylindrical tip 686 and a stop surface 688. When a camera is swung into the position of FIG. 25, tip 686 passes through access hole 548 and engages release lever 546 to release zero locking pawl 532. Stop surface 688 engages a stop in the camera casing or frame, not illustrated, to limit tilting of the camera within the nest and to prevent over insertion of the probe.

Also mounted on the front surface of frame member 654 is a bracket 690 having a vertical member 692 on which are mounted a pair of sensors 694, 696 which are positioned to cooperate with sensor flags 388, 390, respectively, on film guide ramps 370, 372. Thus, when the ramps have moved into the camera to a position for film loading or unloading, sensors 694, 696 will signal that event.

As shown in FIG. 3A, a flash sensor 698 is positioned above support plate 12 on a bracket 700, to detect operation of the flash feature of the camera. And, as shown in FIG. 35, a sensor 701 is positioned on a bracket 702 above support plate 12 and opposite opening 480, to detect illumination of the flash ready light of the camera. To prevent light from the ready light from fogging film entering the camera, sensor 701 preferably should be provided with a resilient gasket, not illustrated, to engage the camera around opening 480 and prevent leakage of light.

Film Loading and Unloading Operations

FIG. 32 shows the configuration of the film loading and unloading tracks and a camera, when the camera has been swung into station 80. Until door 484 has been opened in the manner previously described, guide ramps 370, 372 will be pivoted toward the back of the apparatus due to contact with the door. When the door has been opened, the guide ramps will be swung by springs 382 through the open door toward notches 550, 552, which are shown in FIG. 22. If, as shown in FIG. 33, a film strip 704 in the camera is blocking access to notches 550, 552, then the guide ramps will come to rest on the film strip and sensor flags 388, 390 will not actuate sensors 694, 696. In this event, the controller of the apparatus, to be discussed later, will cause camera drive assembly 584 to be actuated to drive the film strip back toward unexposed film chamber 562. An angled lead edge 706 of the film strip, shown in FIG. 34, eventually will move past ramp 370 and permit ramp 370 to drop into notch 550. As a result, sensor flag 388 will actuate sensor 694 to indicate that the end of the film is nearing sprocket 530. Drive assembly 584 will continue to rotate just far enough to ensure that ramp 390 drops into notch 552. Sensor flag 390 then will actuate sensor 696 to indicate that the film should be stopped while the film strip remains engaged with sprocket 530. At this time, drive assembly 584 can advance angled lead edge 706 into film guide slot 378 of each guide ramp, as shown in FIG. 34.

As seen in FIGS. 3B and 35, a drive motor 708 is mounted to support plate 12. A downwardly extended drive shaft 710 supports a driver gear 874, also shown in FIG. 48. Gear 874 meshes with driven gear 602 on camera drive assembly 584 when nest 74 has been pivoted to locate a camera in the position of FIGS. 3B and 35. Motor 708 can be energized to rotate in either direction, to drive film from the camera into film unloading track 82 or to drive film into the camera from film loading track 72.

As mentioned previously, an electromagnet assembly 81 holds the nest in the position of FIGS. 3B and 35. As seen in FIG. 3B, assembly 81 comprises a flat-faced ferromagnetic block 81a attached to tubular housing 586 of drive assembly 584 and a flat-faced electromagnet 81b supported on a bracket 712 beneath support plate 12. An eye bolt 714 is attached to block 81a and an eye bolt 716 is attached to magnet 81b, with spring 78 extended between the two eye bolts. Contraction of spring 78 thus will pivot nest 74 to the position of FIG. 3B and pull block 81a into contact with electromagnet 81b to hold the nest in that position.

Transfer Cartridge 86

The features of transfer cartridge 86 are shown in FIGS. 36 to 39. Cartridge 86 conveniently may be made from primarily injection molded plastic parts. An outer, opaque shell half 720 includes opposing end disks 724, 726 and a radially extended lip 728. A strip of conventional light lock material 730 is attached to an inwardly facing side of lip 728, as best seen in FIG. 38. At the ends of lip 728, a pair of depending actuation lips 732, 734 are provided, for a purpose to be described later in this specification. Nested partially within shell half 720 is an inner, opaque shell half 736 having opposing end disks 738, 740 which slidably engage end disks 724, 726. Shell half 736 also includes a radially extended lip 742 on an inwardly facing side of which a strip of light lock material 744 is attached for cooperation with strip 730. At the ends of lip 742, a pair of depending snap flanges 746, 748 are provided to secure the cartridge in its closed configuration. Within the shell formed by halves 720, 736, is rotatably mounted a conventional take-up spool 750. A row of radially extended teeth 752 are provided at one or both ends of spool 750 to engage corresponding perforations on a film strip. Extended around the spool and anchored at one end beneath strip 744 is a film threadup scroll or guide 754 which directs film passing between lips 728, 742 into engagement with the spool. A central bore within the spool retains a triangular friction clutch spring 758. A central drive shaft 760 extends through the spool. A cylindrical portion 762 on shaft 760 closely engages clutch spring 758. A retainer cap 764, suitably attached to a free end of shaft 760, and an externally accessible drive shaft coupling 766 secure shaft 760 for rotation in bores through end disks 724, 726. An internally splined counter bore 768 is provided within coupling 766.

In use of cartridge 86, lips 728, 742 are separated enough to permit insertion of a leading end of a film strip and spool 750 is rotated to engage the film with teeth 752. However, should excessive torque be required to draw film into the cartridge, shaft 760 will slip relative to clutch spring 758 to prevent damage to the film or the cartridge. When a film strip has been wound into the cartridge, lips 728, 742 are pressed toward each other to engage light lock strips 730, 744, thus providing a light tight enclosure for the film.

Film Cutter 84

Figure 40:
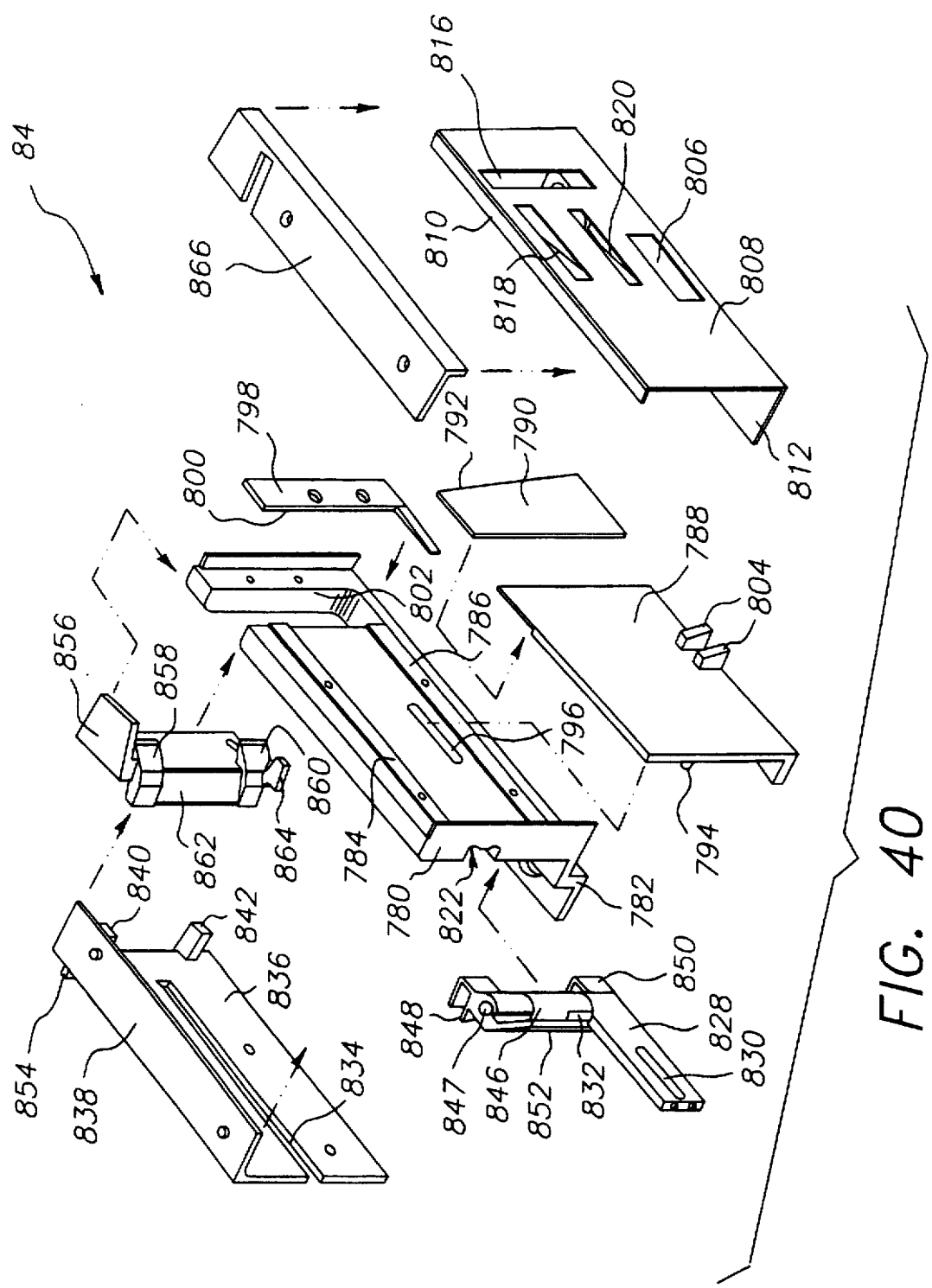
FIG. 40 shows an exploded, front perspective view of the exposed film cutter.
Figure 41:
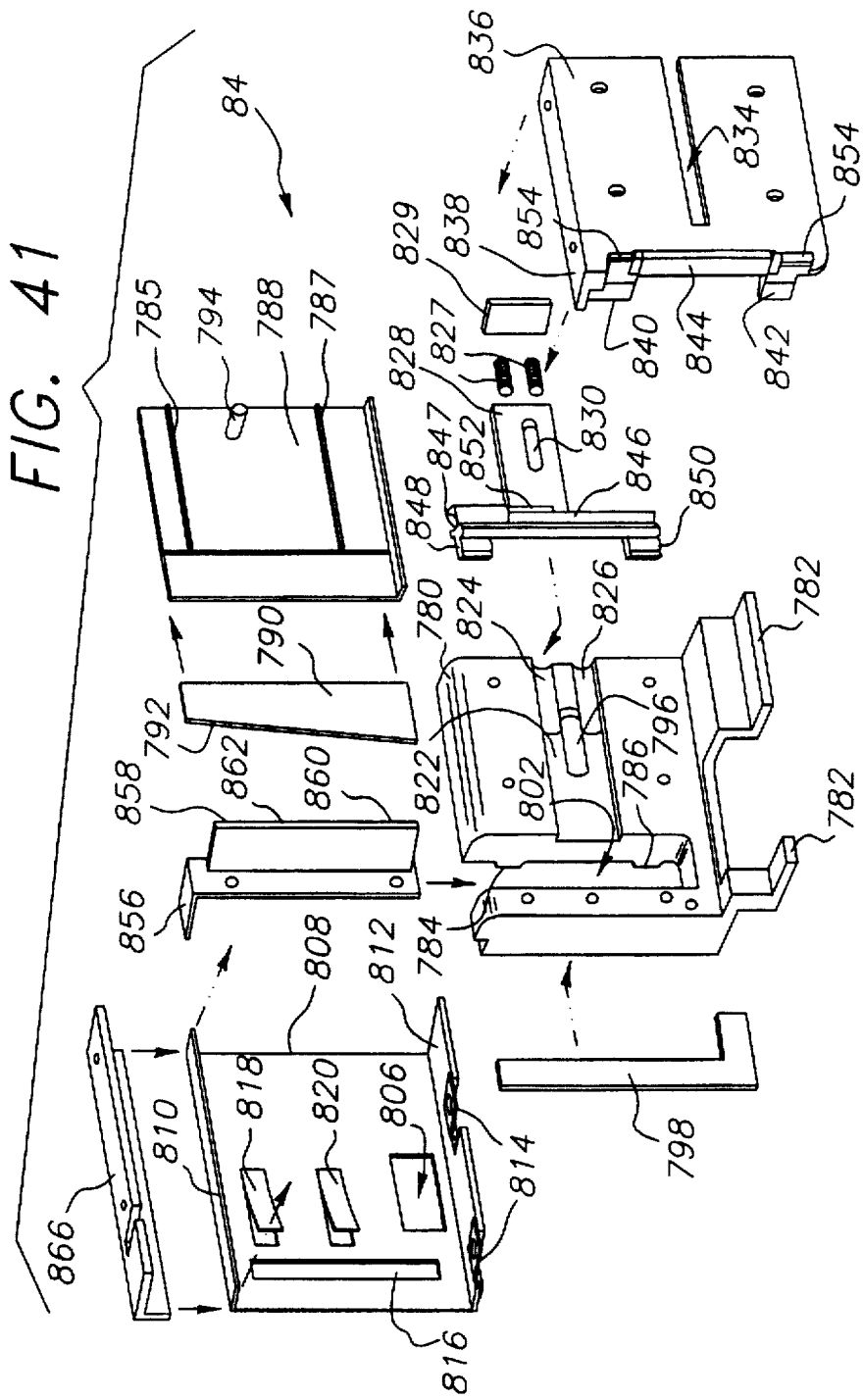
FIG. 41 shows an exploded, back perspective view of the exposed film cutter.

The features of film cutter 84 are shown in FIGS. 40, 41 and 43 to 47. Referring initially to FIGS. 40 and 41, a rigid knife frame member 780 preferably is made from metal such as black anodized aluminum and includes along its lower side a mounting bracket 782 for attachment to support plate 12. On its side facing film unloading track 82 are a pair of parallel guide rails 784, 786 which cooperate with a mating pair of rails 785, 787 (seen in FIG. 41) on a facing side of a knife holder 788. A stainless steel knife blade 790 with an angled cutting edge 792 is mounted to holder 788. An actuator finger 794 extends from the holder between rails 785, 787 and passes through a horizontal through slot 796 provided in frame member 780. Near one end of the frame member, a J-shaped knife bed 798 is mounted with an edge 800 aligned with a corresponding edge of a slot 802 through the frame member. A pair of actuator tabs 804 extend from knife holder 788 through a slot 806 provided in a knife cover plate 808. A top lip 810 of the cover plate engages a top edge of frame member 780, while a bottom flange 812 includes a pair of fastener tabs 814 used to attach the cover plate to an under side of frame member 780. An exit slit 816 extends through the cover plate opposite slot 802. A pair of leaf springs 818, 820 are formed in the cover plate to engage the knife holder and press it into contact with the frame member. For simplicity, knife 788, 790 is oriented to cut the film straight across, rather than at an angle as in the cutter of FIG. 4; however, those skilled in the art will appreciate that cutter 84 also could be oriented to provide an angled cut, without departing from the scope of the invention.

As seen in FIG. 41, a horizontal slot 822 is provided on the side of frame member 780 opposite rails 784, 786. At the end of slot 822 closer to slot 796, a pair of spring pockets 824, 826 are provided, one on each side of slot 796. A slider 828 is positioned in slot 822. As shown in FIG. 41, pair of springs 827 are positioned in pockets 824, 826 and compressed between a right end of slider 828 and a keeper plate 829 attached to frame member 780. A horizontal through slot 830 in slider 828 receives the free end of actuator finger 794. Slot 830 is slightly shorter than slot 796, for a purpose to be discussed subsequently. At its end opposite slot 830, slider 828 supports an outwardly angled, horizontal arm 832 which extends through a slot 834 formed in a back cover plate 836. Arm 832 is seen best in FIGS. 40 and 45 to 47. Back cover plate 836 includes a top flange 838 which extends over frame member 780 in the assembled cutter. At an edge opposite to slot 802, cover plate 836 supports a pair of film strip edge guides 840, 842 between which extends an image relief recess 844, best seen in FIG. 41.

Figure 45:
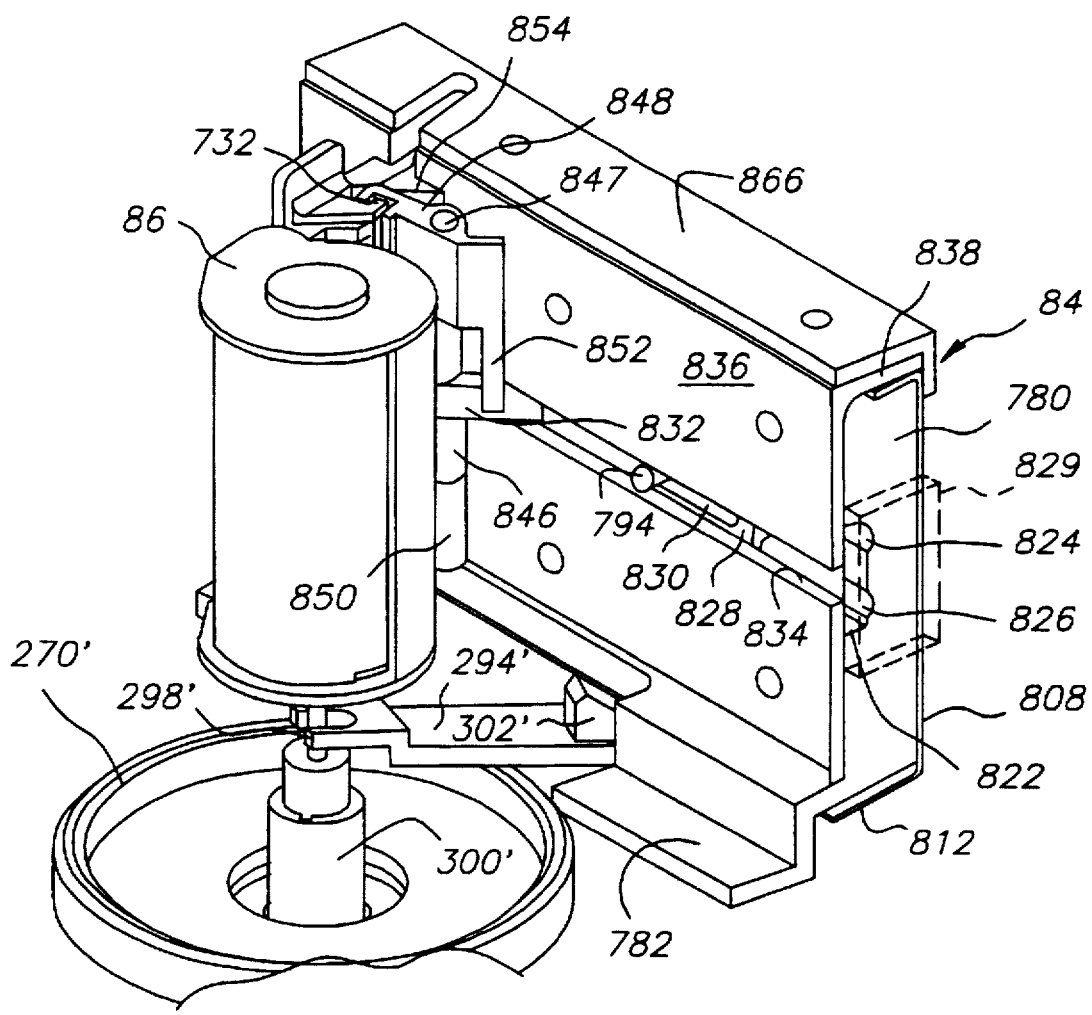
FIG. 45 shows a front perspective view of the exposed film cutter and transfer cartridge.
Figure 46:
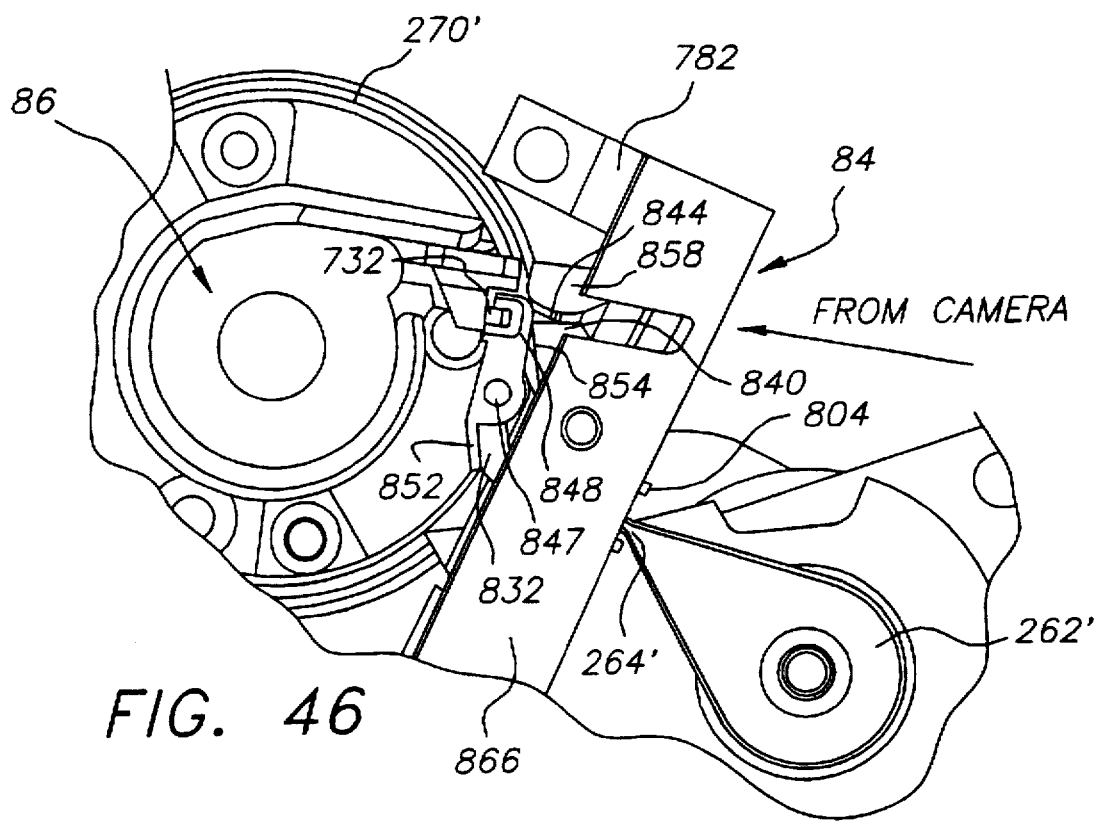
FIG. 46 shows a fragmentary top view of the exposed film cutter and transfer cartridge with the mouth into the cartridge still closed.
Figure 47:
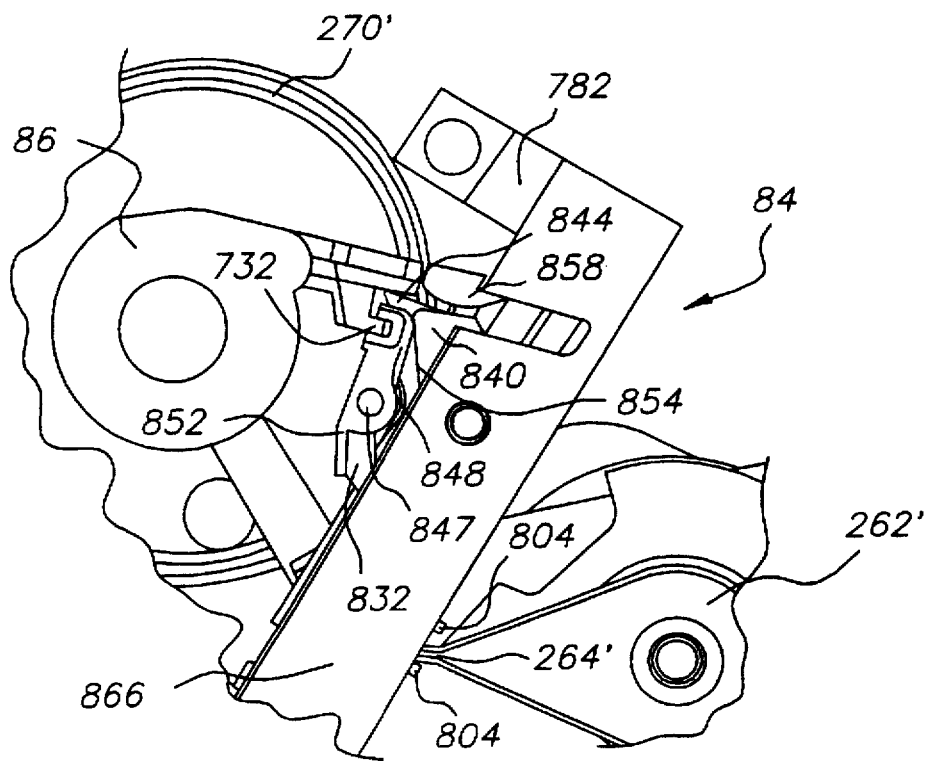
FIG. 47 shows the features of FIG. 46 with the mouth into the cartridge open.

At an outer end of arm 832 is mounted a hinge 846 having a rotatable hinge pin 847 on which are fixedly mounted a pair of hooks 848, 850 positioned to engage actuation lips 732, 734 on an adjacent transfer cartridge 86. As best seen in FIG. 45, hook 848 includes a downwardly depending rotational stop 852 which can engage arm 832 to limit the range of movement of the hooks. As seen in FIGS. 41 and 45 to 47, each of film strip guides 840, 842 includes a backwardly angled ramp 854 which contacts a respective one of hooks 848, 850. On an opposite side of slot 802 from guides 840, 842 is mounted a film strip guide member 856 which includes a pair of film strip edge guides 858, 860 positioned opposite to guides 840, 842, respectively. An image relief recess 862 extends between guides 858, 860. A horizontal tab 864 projects from guide member 856 just below edge guide 860 to guide a lower longitudinal edge of the film strip between edge guides 842, 860. Finally, a top plate 866 is mounted to the assembly above flange 838.

Figure 43:
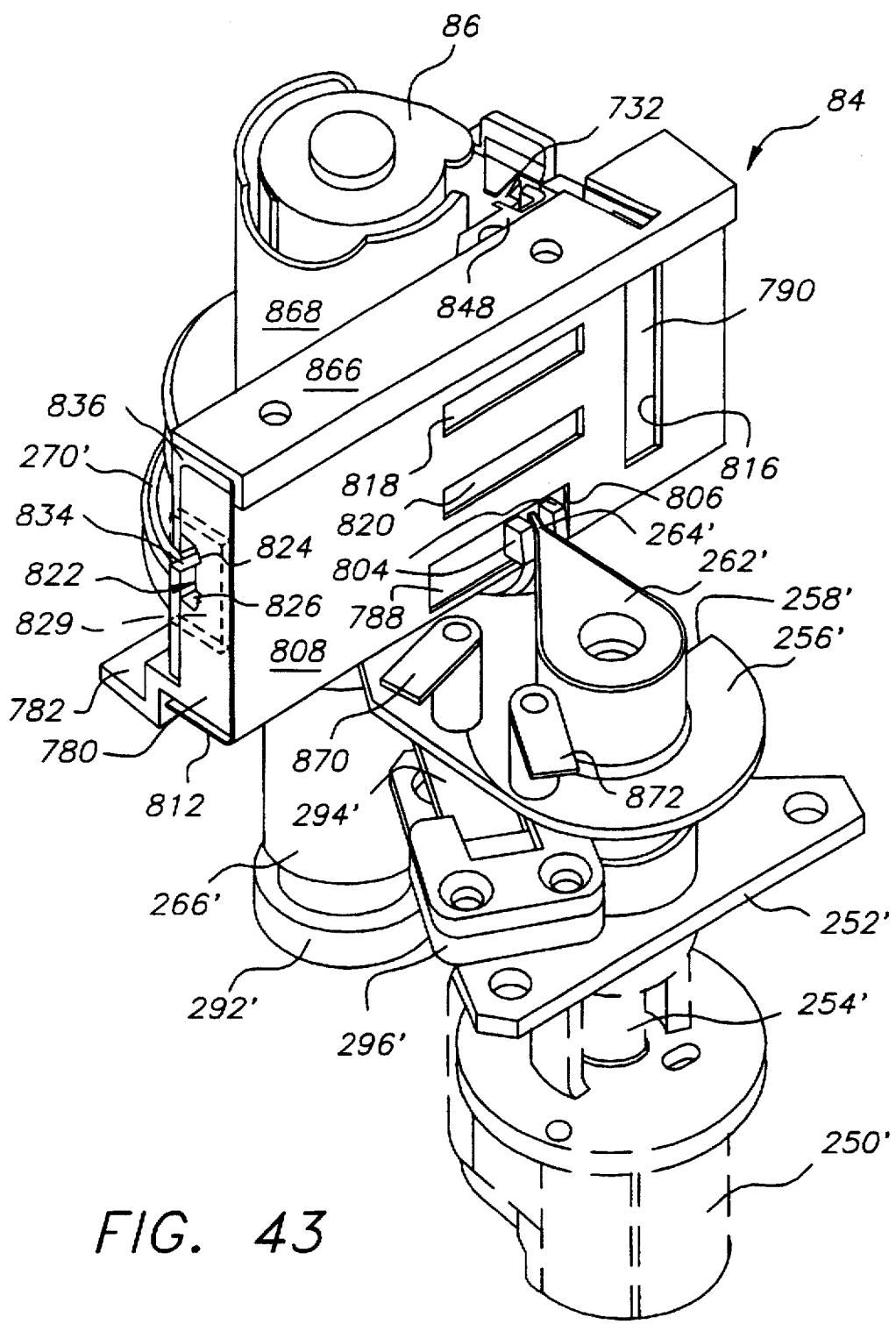
FIG. 43 shows a front perspective view of the features of FIG. 42, plus the exposed film cutter and transfer cartridge.
Figure 44:
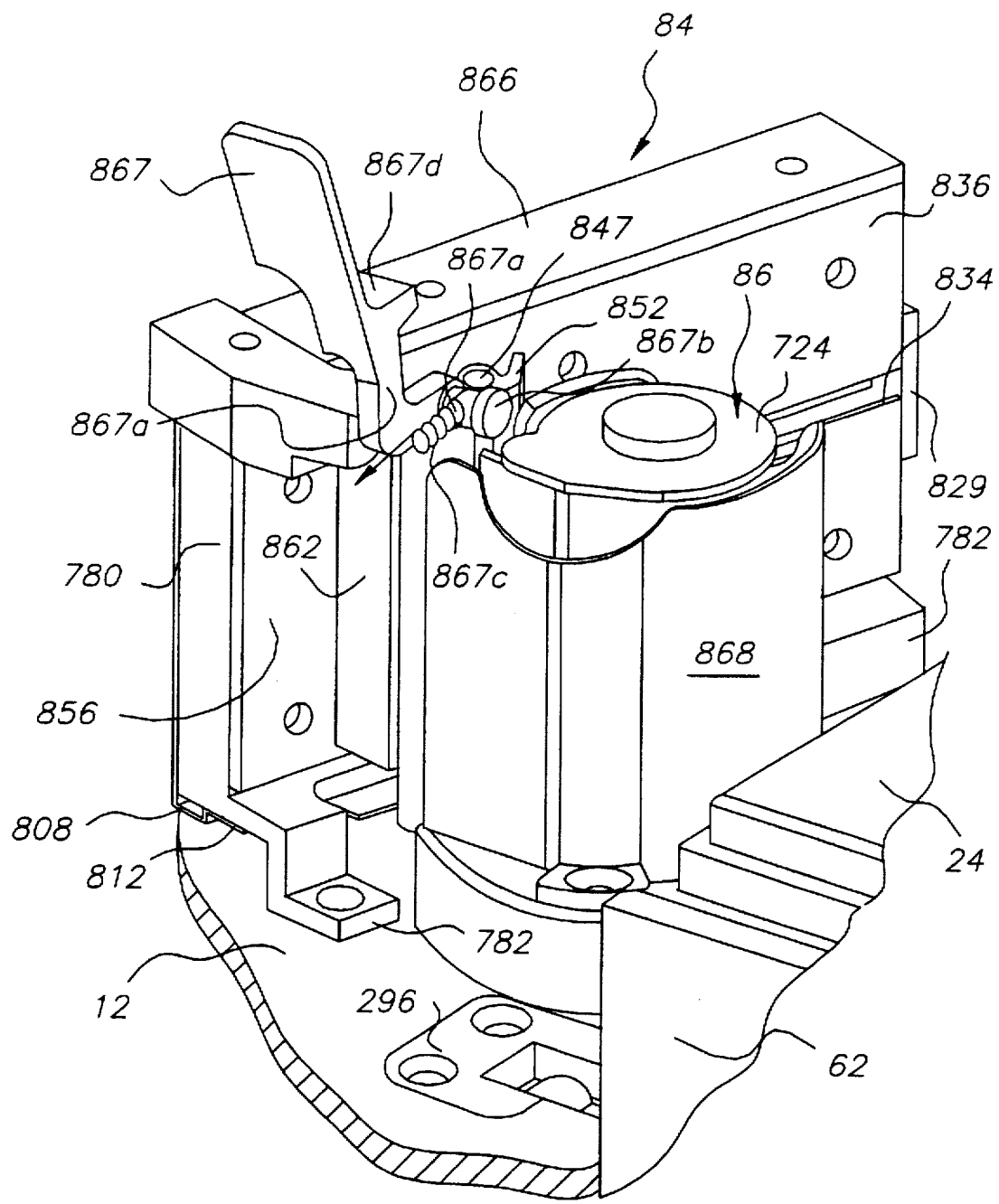
FIG. 44 shows a back perspective view of the exposed film cutter and transfer cartridge.

As seen in FIGS. 43 and 44, an essentially cylindrical nest 868 is mounted to the top surface of support plate 12 to receive transfer cartridge 86. The nest is open along one side to allow radial lips 728, 742 of the cartridge to extend toward cutter 84; so that, hooks 848, 850 can engage actuation lips 732, 734 as the cartridge is lowered into the nest. As seen in FIG. 44, a cartridge retainer lever 867 is supported at one end of top plate 866 on a pivot 867a. Lever 867 includes a spring mounting post 867b spaced radially from the pivot. A spring 867c extends from the mounting post to an attachment point, not illustrated, on support plate 12. With lever 867 in the elevated position shown in FIG. 44, spring 867c passes above the pivot; however, when the lever is rotated clockwise as viewed in FIG. 44, the spring passes over the pivot and then contracts to force the lever into engagement with cartridge 86. A retainer finger 867d extends from the lever in position to engage end disk 724 of cartridge 86 and hold the cartridge securely within nest 868. In the assembled apparatus, lever 867 extends upward through opening 34, shown in FIG. 1, so that the upper end of the lever is engaged by the underside of top door 26. Thus, as top door 26 is closed by the operator of the apparatus, lever 867 will be pivoted in the manner just described to retain the cartridge in the nest.

Figure 42:
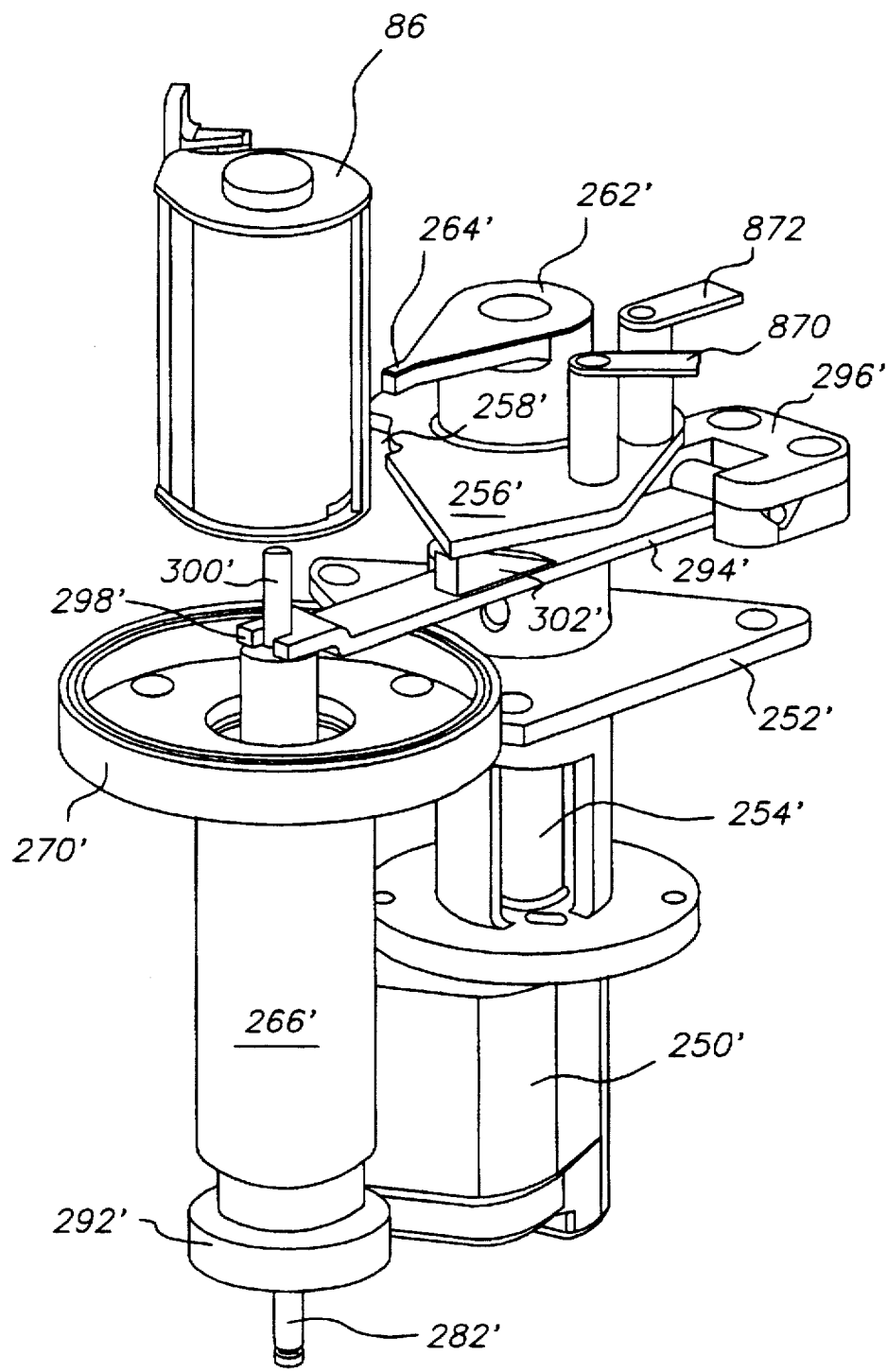
FIG. 42 shows a front perspective view of the mechanism for actuating the exposed film cutter and driving the transfer cartridge.
Figure 48:
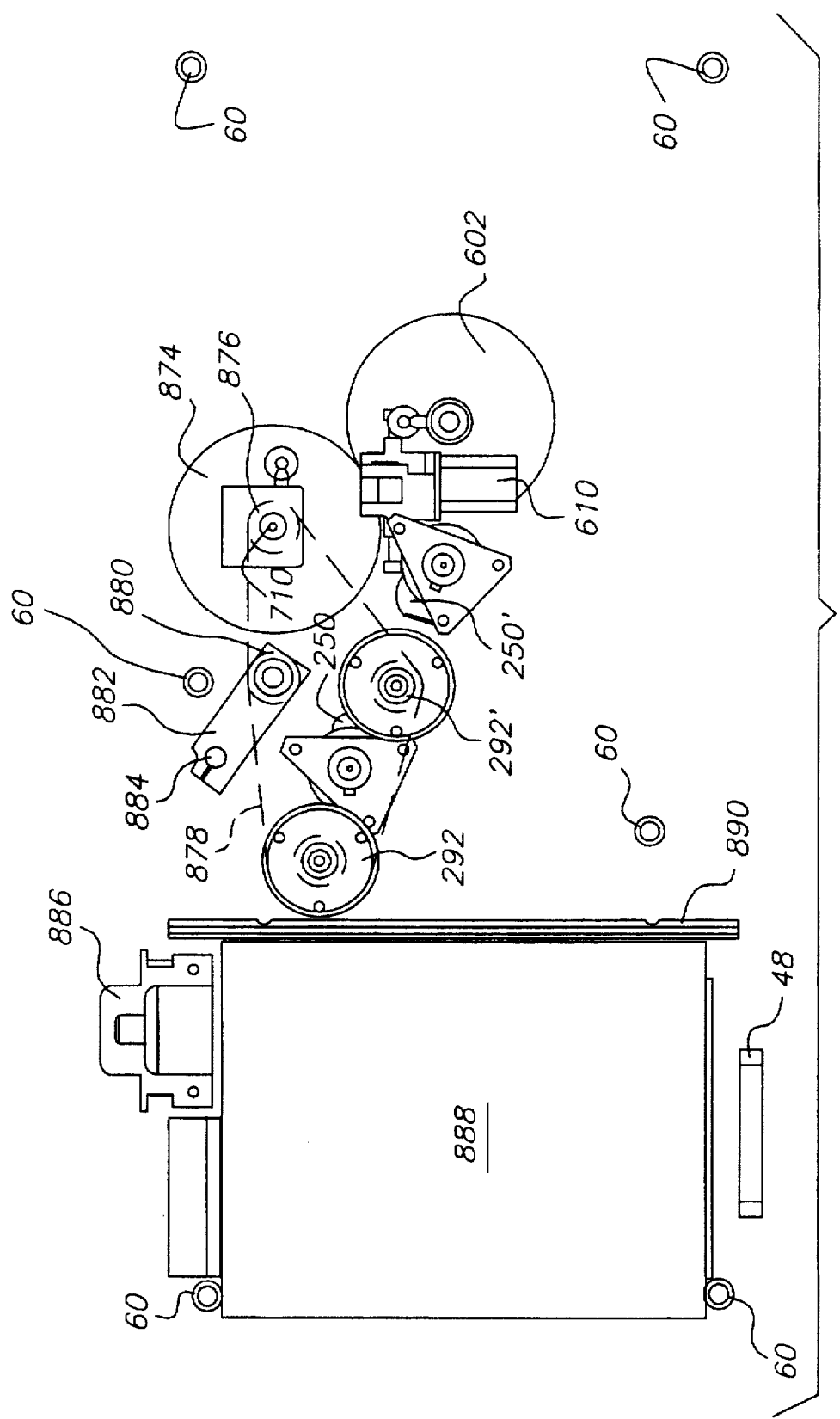
FIG. 48 shows a view along line 48—48 of FIG. 3, indicating features of the drive mechanism of the apparatus.

FIGS. 42 to 47 show features of an actuator 250' to 264' for cutter 84 and a drive assembly 266' to 302' for cartridge 86. Except for the diameters of timing pulleys 292, 292', this actuator and drive assembly are essentially identical to those illustrated in FIGS. 10 and 11 and therefore will not be described again. As shown in FIG. 48, pulley 292' may be smaller than pulley 292, causing takeup spool 750 in transfer cartridge 86 to rotate at a higher speed than sprocket roller 118 in cassette 24. As shown in FIGS. 42 and 43, a pair of sensor flags 870, 872 are mounted on cam follower plate 256' in positions to actuate a corresponding pair of sensors 871, 873 visible in FIG. 3A.

In operation of the cutter and transfer cartridge, a film strip is fed from the camera along film unloading track 82 in the manner previously described. When the leading edge of the film strip actuates sensor 392, shown in FIG. 13, a signal is sent to the controller to energize rotary actuator 250' to rotate actuator arm 262' counterclockwise, as viewed in FIG. 43. Thus, knife blade 790 slides to the left to open a passage for the film strip to pass through cutter 84 into transfer cartridge 86. Rotation of cam follower plate 256' simultaneously permits actuator lever 294' to rise, thereby allowing upper end 300' of drive shaft 282' to move upward and engage coupling 766 of the transfer cartridge to rotate spool 750 and wind the film strip into the transfer cartridge. Movement of knife blade 790 simultaneously causes actuation finger 794 to move away from slot 802 through slot 796 and slot 830. But, before finger 794 reaches the end of slot 796, the finger engages the end of slot 830 and pulls slider 828 away from slot 802. As slider 828 moves, springs 827 are compressed and hooks 848, 850 pull on actuation lips 732, 734. Movement of actuation lips 732, 734 begins in the position of FIG. 46, where the transfer cartridge is closed and ends in the position of FIG. 47, where the transfer cartridge is open and finger 794 has reached the end of slot 796. Thus, cutter 84 and cartridge 86 are opened simultaneously. During movement between the closed and open conditions, hooks 848, 850 are guided by ramps 854.

Movement of the film strip into the transfer cartridge is controlled by strip guides 840, 842 and 858, 860 and by tab 864, which direct the film into an entrance slit defined between light lock strips 730, 744 of the cartridge. Winding into the cartridge continues until a desired length of film has been wound into the cartridge, either the entire strip from the camera or a portion of that strip, as will be discussed in further detail. At that point, rotary actuator 250' is energized to slide knife blade 790 back to its starting position, thereby cutting the film strip, if only a portion has been unloaded from the camera, and closing the passage through cutter 84. Springs 827 extend to force slider 828 back toward slot 802, causing hooks 848, 850 to close the entrance slit between light lock strips 730, 744. At the same time, drive shaft 282' is disengaged from coupling 766 to stop rotation of spool 750.

Drive Train for Apparatus 10

FIG. 48 shows a view taken just below support plate 12. A driver gear 874 is connected to output shaft 710 of motor 708, in position to mesh with driven gear 602 when nest 74 is swung into position at camera actuating and testing station 80. Output shaft 710 also supports a timing pulley 876 which engages a timing belt 878 which also engage pulleys 292 and 292'; so that the drives of cassette 24, nest 74 and transfer cartridge 86 share the single motor 708. See also FIG. 3B, where the timing belt has been omitted for simplicity. To maintain tension in belt 878, a further timing pulley 880 is mounted on an adjustment lever 882 pivoted at 884 to the under side of support plate 12. Also visible in FIG. 48 are a support member 886 for control console 50 and a conventional programmable controller 888 separated from the light tight portions of the apparatus by a dividing wall 890.

Loading an Empty Camera

Figure 49:
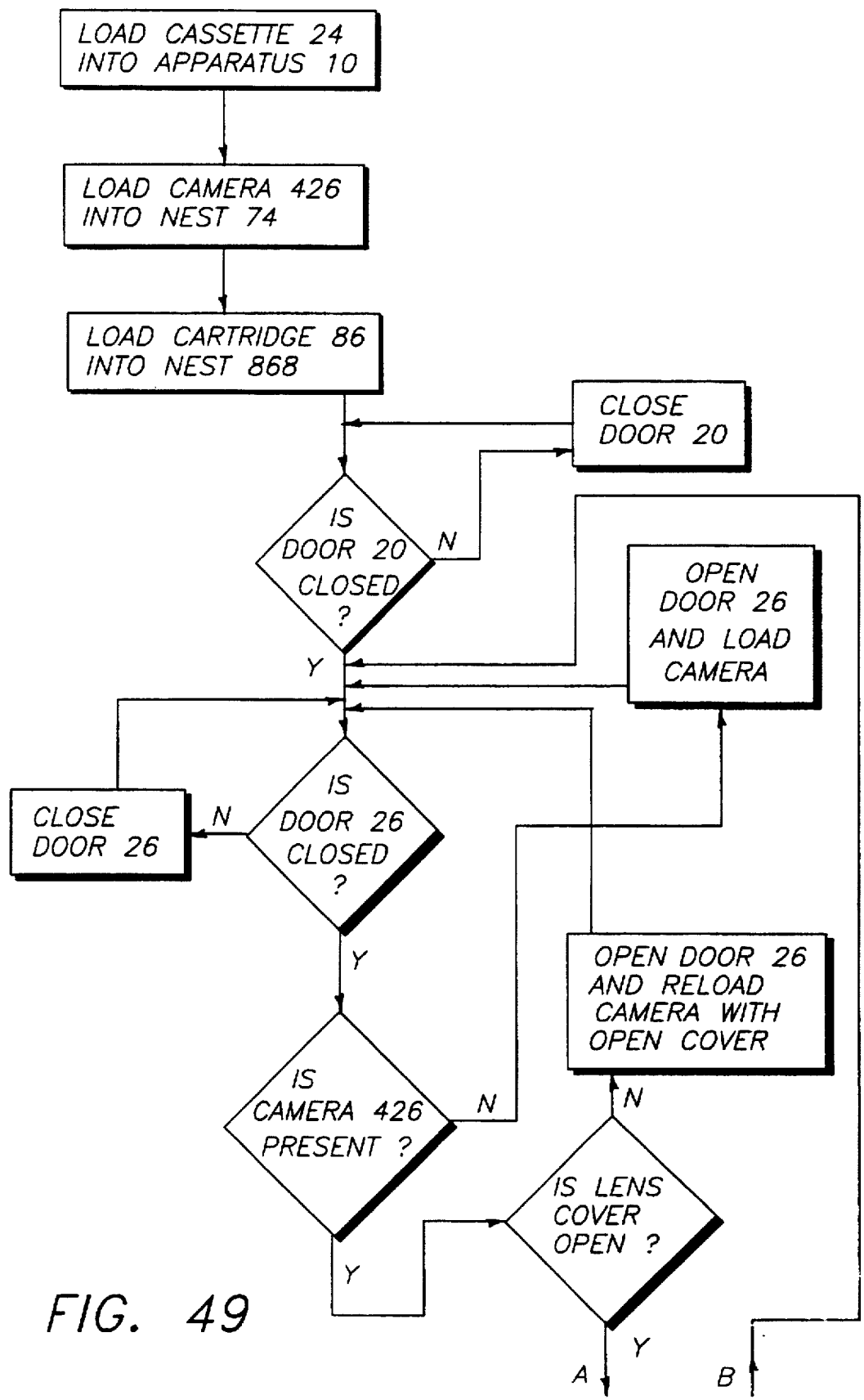
FIGS. 49 to 54 show flow charts of the control logic for the apparatus.
Figure 50:
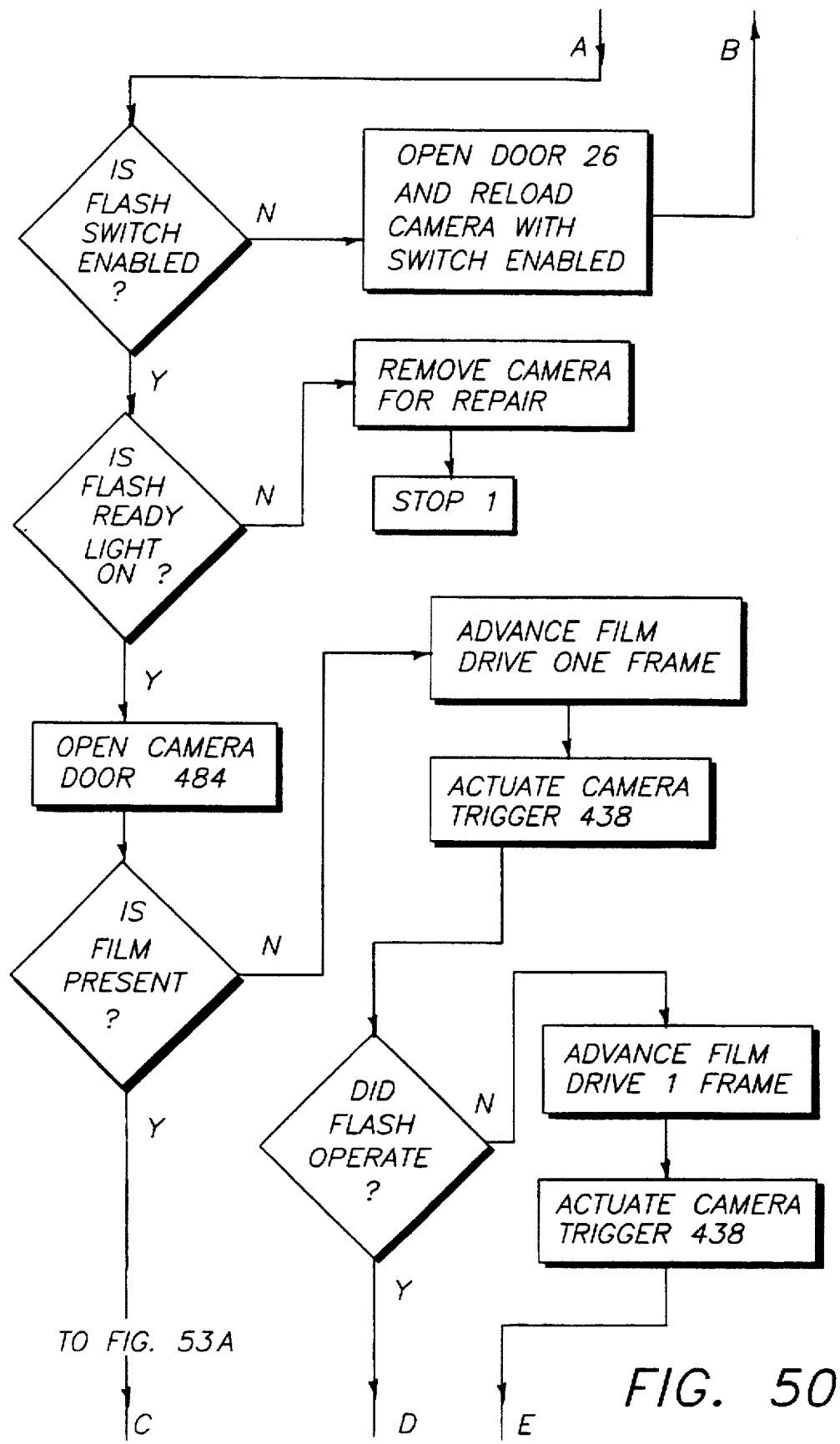

The overall operational logic of the apparatus is shown in the interconnected flow charts of FIGS. 49 to 54. Controller 888 receives inputs from the various sensors of the apparatus and controls operation of the various motors and actuators. To prepare the apparatus for use, cassette 24 is loaded past open door 20; a camera 426 is loaded past open door 26 into nest 74; and a cartridge 86 is loaded into nest 868. The doors are closed. The operator then uses console 50 to enter data concerning the camera and any operations to be performed on the camera. For example, the operator might indicate that the camera contains only exposed film and is to be completely unloaded; that the camera contains exposed and unexposed film and is to be partially unloaded of only the exposed frames; that the camera is empty and is to be loaded with a selected number of frames of unexposed film; that the camera is simply to be tested; or that the camera has no flash feature. With this information, as shown in FIGS. 49 and 50, the controller then checks the appropriate sensors to confirm that the doors are closed; a camera is present; the lens cover is open; the flash switch has been turned on; and the flash ready light is illuminated.

Camera door 484 is then opened. If ramps 370, 372 are able to swing into place against ledge 386 inside the camera, sensors 694, 696 will signal the controller that no film is present in the camera, meaning that a loading sequence may begin, following the logic of FIGS. 50 to 52. Actuator 660, shown in FIG. 25, is then energized to depress shutter trigger button 438. If sensor 698, shown in FIG. 3A, does not detect a flash, sprocket drive gear 508 is rotated to advance the film one frame and actuator 660 again is energized to depress the shutter trigger button. If no flash is detected again, the camera must be removed for repair.

Figure 54:
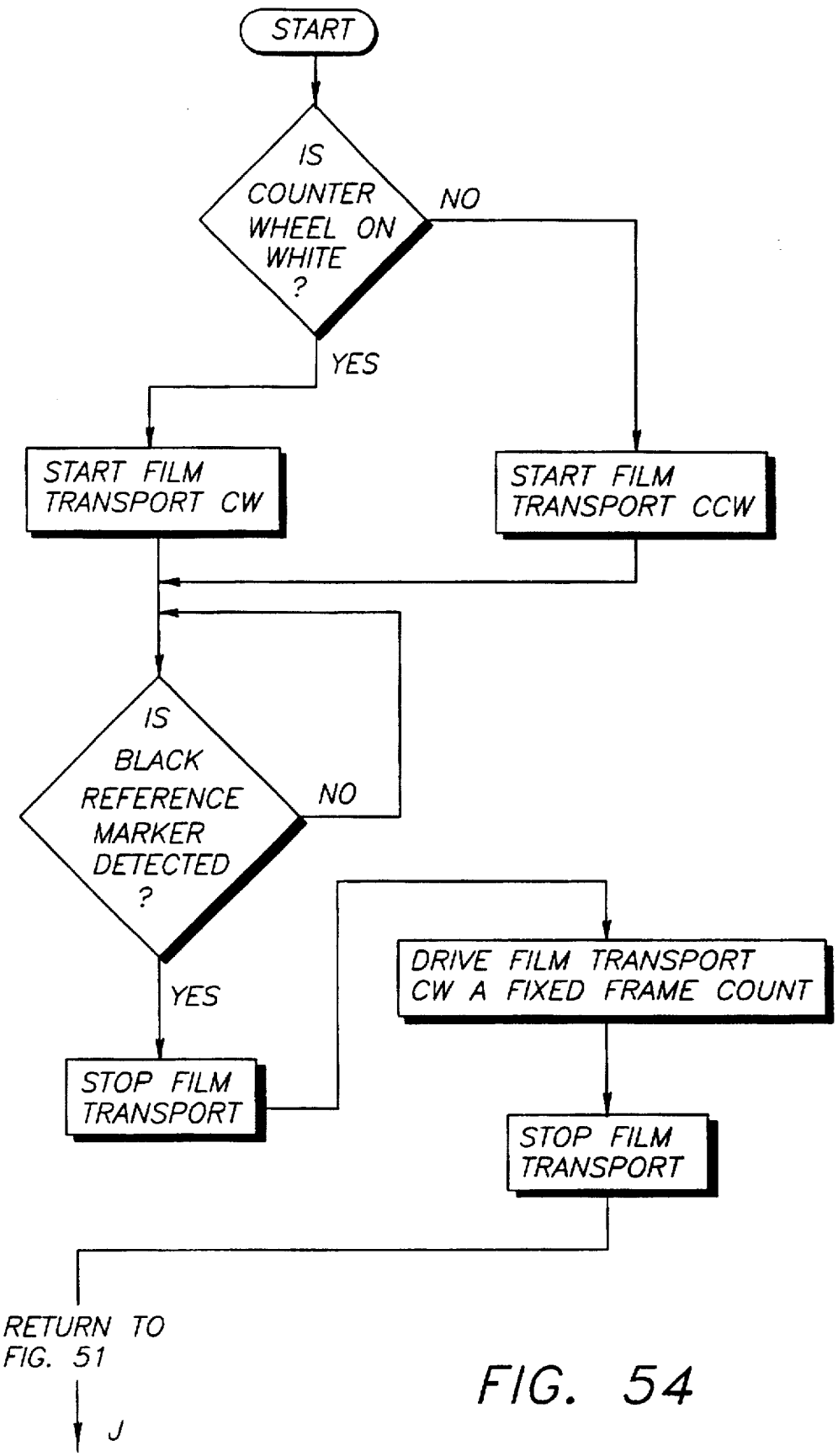

If sensor 698 detects a flash, the camera must be initialized following, for example, the logic of FIG. 54. Assume that the camera includes counterwheel 500 having a darkened sector 676 as shown in FIG. 21. If sensor 674 detects the presence of sector 676 essentially blocking window 501, motor 708 is energized to drive sprocket drive gear 508 and counterwheel 468 counter clockwise until leading edge 676a of sector 676, shown in FIG. 21, is detected at window 501, at which point motor 708 is stopped. If sensor 674 does not detect the presence of sector 676 blocking window 501, motor 708 is energized to drive the sprocket drive gear and counterwheel clockwise until leading edge 676a is detected, at which point motor 708 is stopped. Sprocket drive gear 508 is then driven clockwise a fixed number of frames corresponding to the length of film between the cassette and the camera, plus a length of any leader portion to be provided on the film strip, at which point motor 708 is stopped. The counterwheel now has been offset to account for the distance from the cassette to the camera and the leader portion.

Alternatively, assume the camera includes counterwheel 500 having a black mark 676b or an infrared absorbing mark 676c, such as shown in FIGS. 21B and 21C. Assume further that mark 676b or 676c is positioned on the counterwheel so that, when the mark is detected at window 501, the counterwheel is offset to account for the distance from the cassette to the camera and the leader portion. In these embodiments, initializing an empty camera prior to loading is accomplished simply by rotating counterwheel 500 until the mark is detected at window 501.

Figure 51:
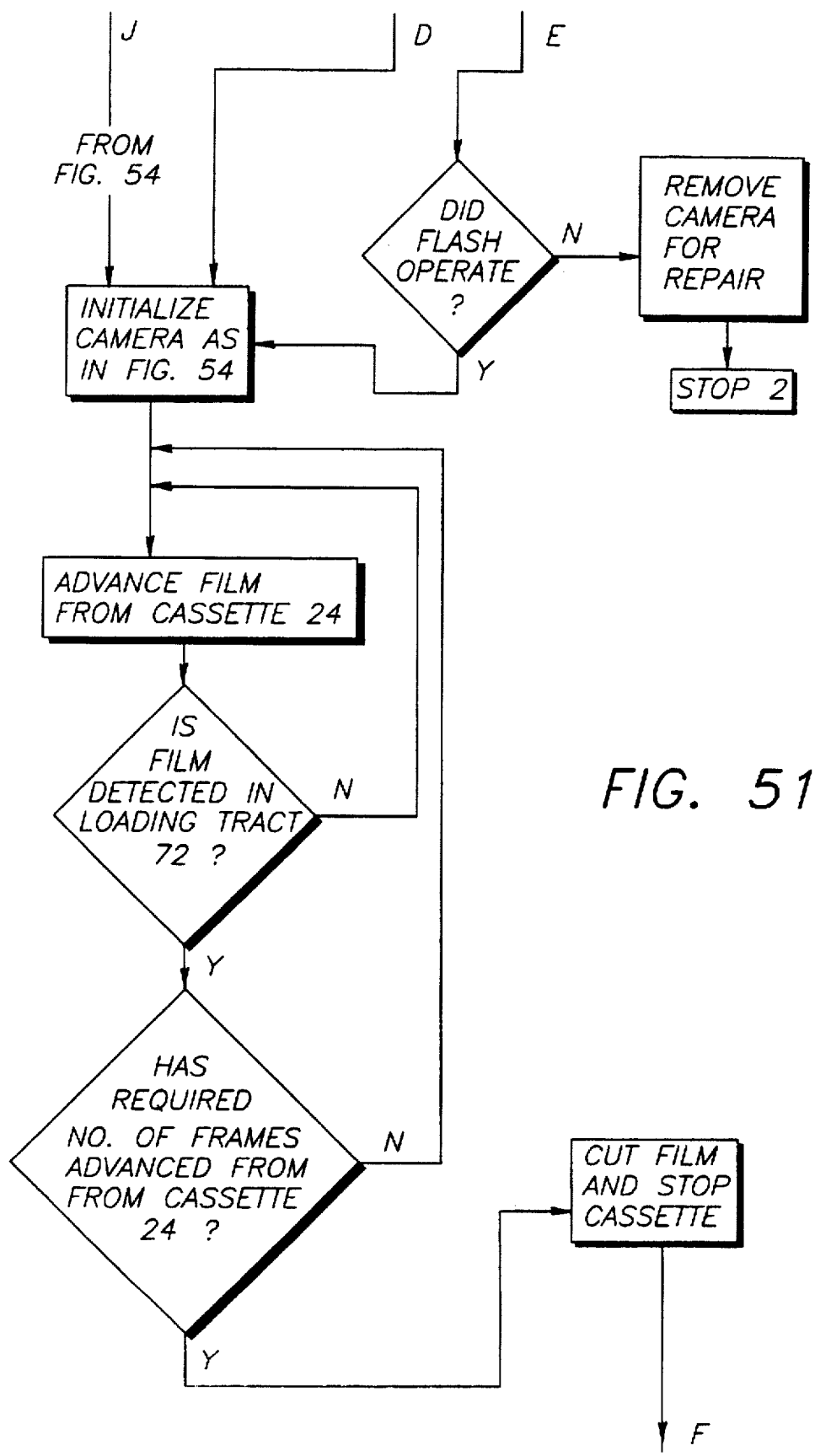
Figure 52:
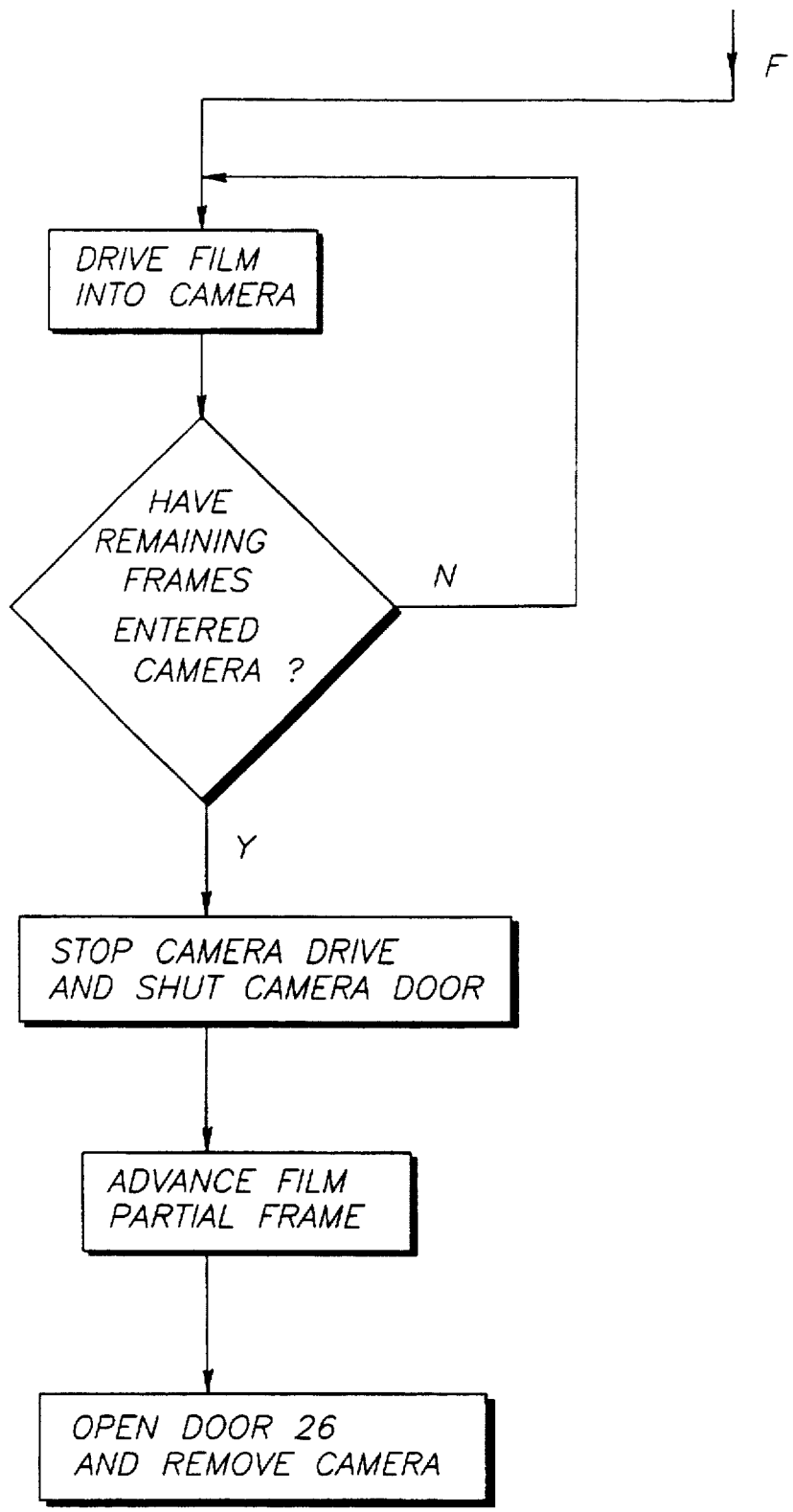

Returning from FIG. 54 to the logic of FIG. 51, actuator 250 and motor 708 are energized to drive film from cassette 24, along loading track 72 into the camera, where the film is scrolled into unexposed film chamber 562. Loading continues until chamber 562 has received a number of frames equal to the total selected by the operator, plus the leader portion and minus the distance from the cassette to the camera. Actuator 250 is then energized to move knife 142 to cut the film and stop rotation of sprocket roller 118. The film still in loading track 72 is then driven into the camera and the film transport is stopped while the film is still engaged with sprocket drive 530. As camera door 484 is shut, it engages ramps 370, 372 and pivots them out of the camera to the position of FIG. 32. The film is advanced a partial frame to be sure that at least one of ramps 370, 372 will encounter the film should camera door 484 be reopened. Door 26 is opened and the loaded camera is removed.

Fully and Partially Unloading a Camera

Refer again to the flow chart of FIG. 50. If a camera with at least some exposed frames is placed in the apparatus, the exposed frames will have been wound into exposed film chamber 564. The flash switch will be turned off before the camera is inserted in nest 74. Due to the presence of exposed frames, as shown in FIG. 33, ramps 370, 372 will not be able to swing into place against ledge 386 inside the camera; and sensors 694, 696 will signal the controller that exposed film is present in the camera, meaning that an unloading sequence is ready to begin. Referring to the flow chart of FIGS. 53A, B and C, motor 708 is energized to drive the exposed frames over to unexposed film chamber 562. The number of exposed frames is determined by counting the revolutions of encoder disk 604 in the manner previously described. As soon as the end of the film strip has moved just past ledge 386 but is still engaged with drive sprocket 530, the ramps will swing into place, causing flags 388, 390 to swing into engagement with sensors 694, 696 which signal the controller than the unloading sequence may continue, at which point the film transport is stopped. Using the just-counted number of exposed frames, the controller then determines a number of frames to be driven from the camera into unloading track 82. This number will be the number of frames rewound into chamber 562, plus two frames, plus a number of frames equal to the distance from the camera to cutter 84. Actuator 250' is then energized to move knife blade 790 away from slot 802 and to engage cartridge 86 with its drive mechanism. The film is then driven from the camera one frame at a time and the shutter is tripped between frames, until the required number of frames has been driven out of the camera.

Figure 53A:
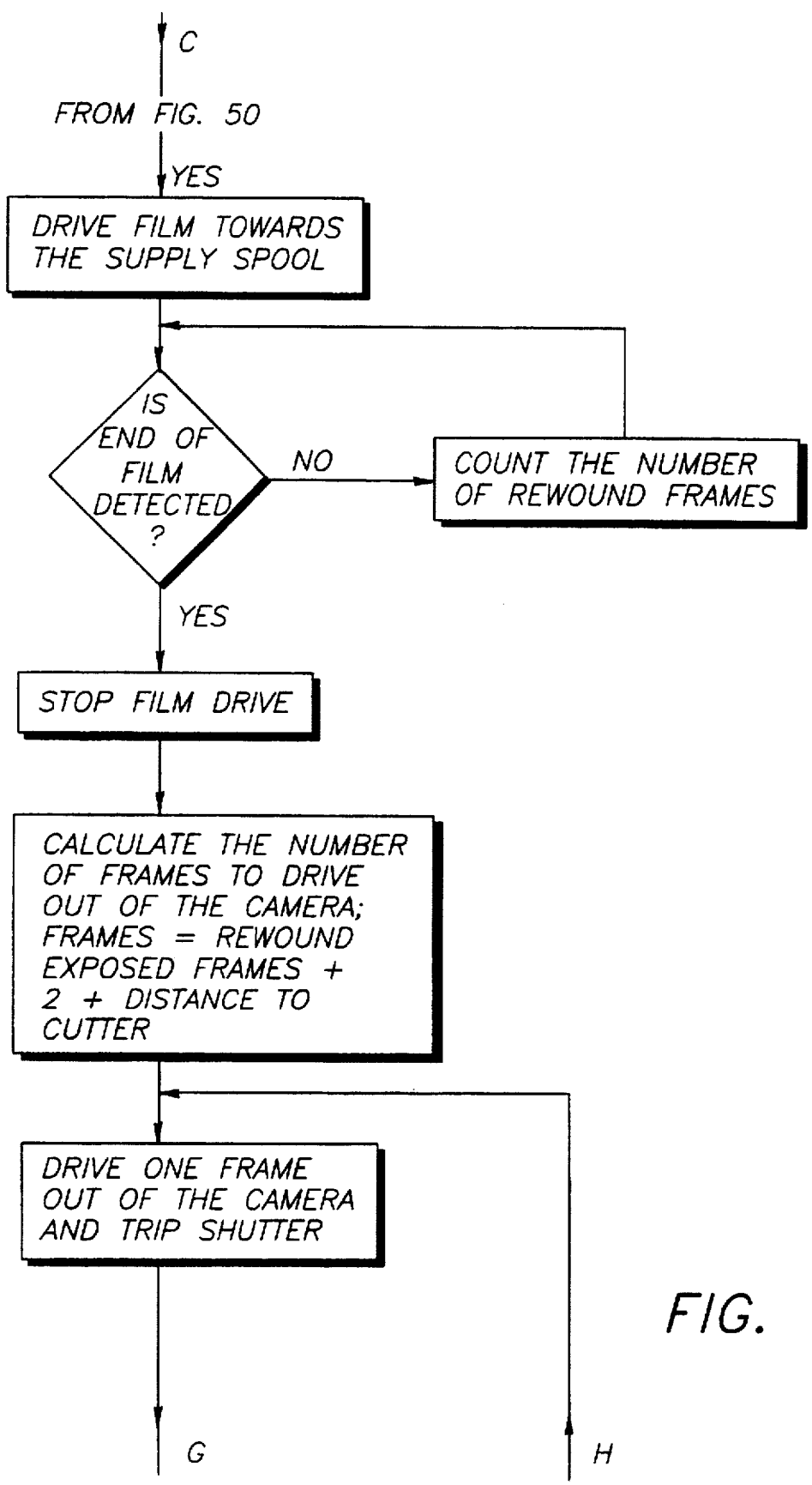
Figure 53B:
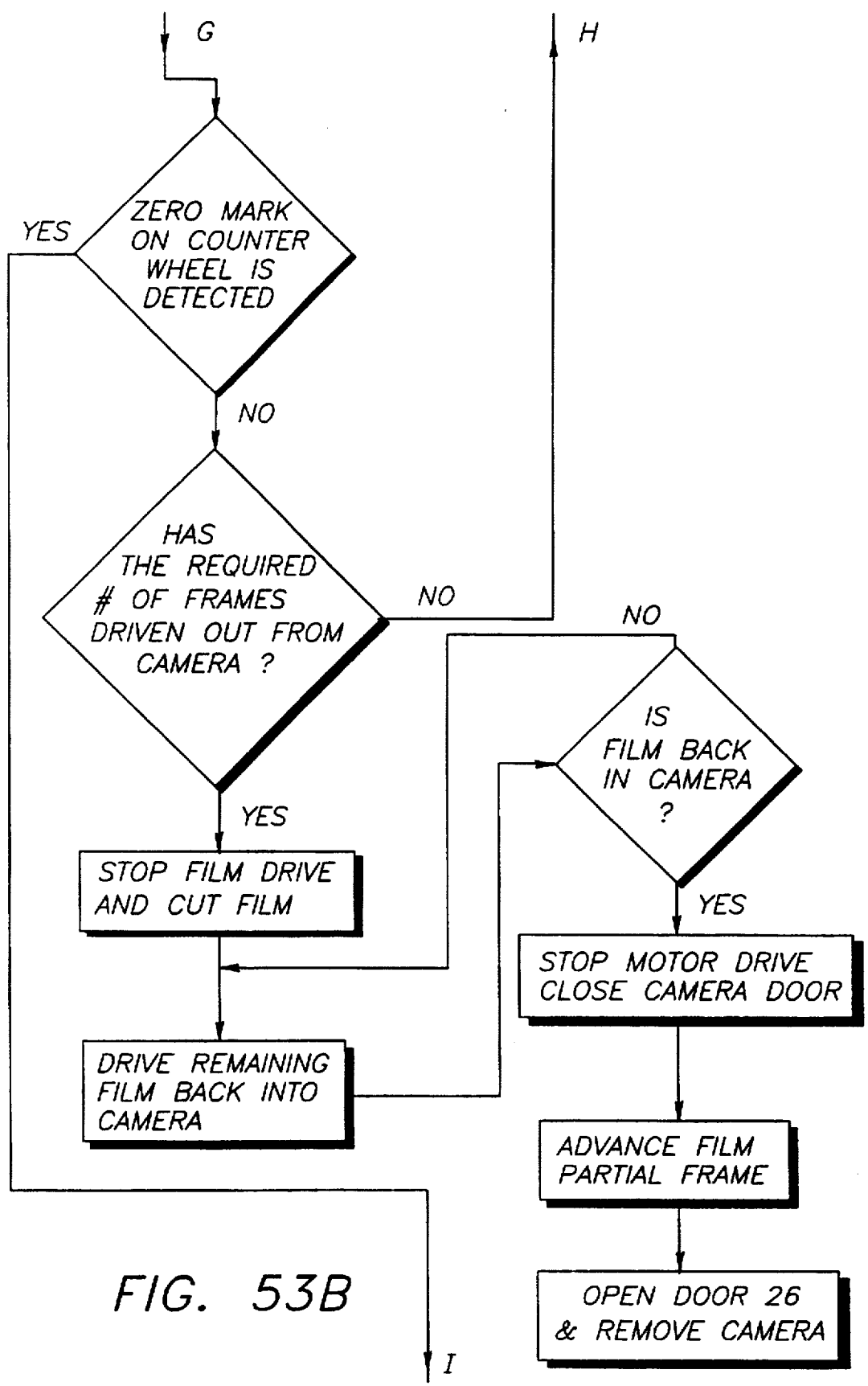
Figure 53C:
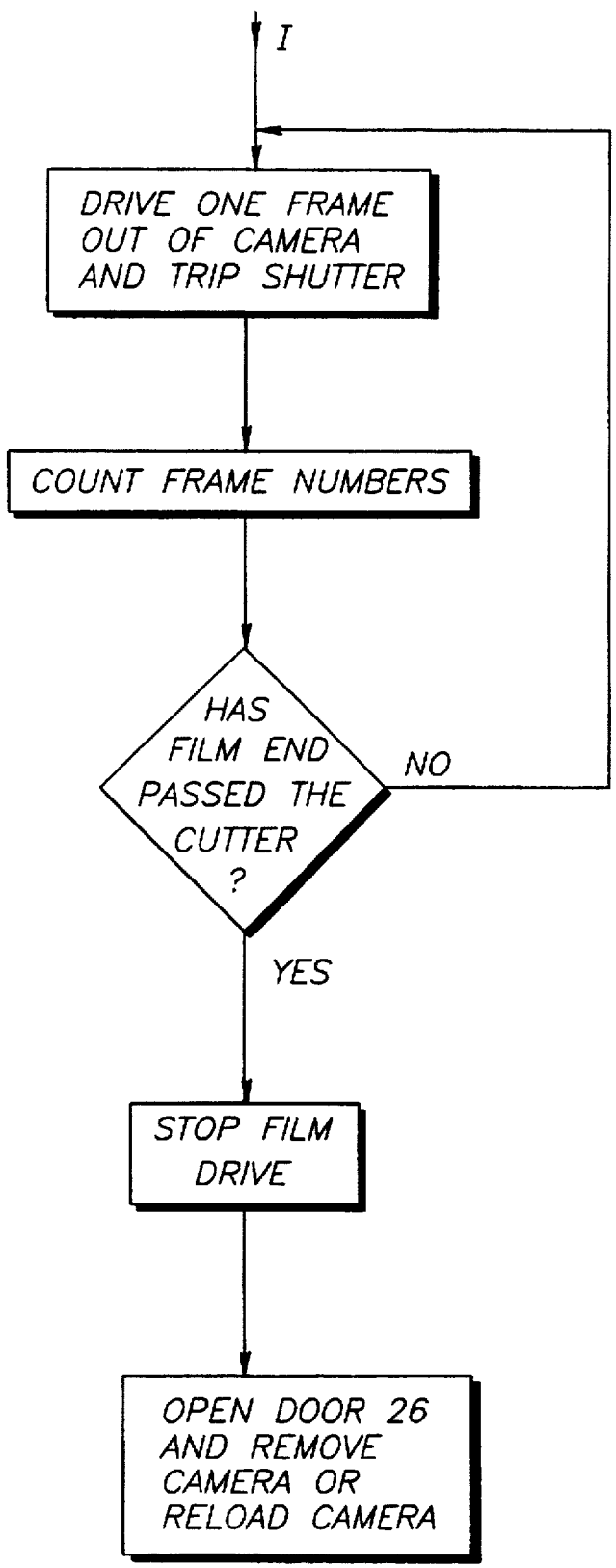

If the leading edge 676a of sector 676 is detected by sensor 674 before the required number of exposed frames has been driven out of the camera, this indicates that a complete unloading of the camera must be performed, following the left branch of the flow chart of FIG. 53. The remainder of the film is driven along unloading track 82 until sensor 392 indicates that the trailing end of the film has passed, at which point the film transport is stopped and actuator 250' is de-energized. If the counterwheel bears one of marks 676b or 676c, rather than sector 676, then detection of that mark at window 501, before the required number of frames has been driven from the camera, also would indicate that a complete unloading must be performed. Following a complete unloading, the camera may be reloaded after turning on its flash switch, or door 26 may be opened and the empty camera removed for later reuse.

If the leading edge of sector 676 is not detected (or either of marks 676b or 676c), a partial unloading may be done The required number of frames is driven from the camera and the film transport is stopped. Cutter 84 is actuated to cut the film. Because the drive to the transfer cartridge is disengaged when the cut is made, a short tab of film will be left extended from the closed transfer cartridge for use in subsequent photofinishing of the exposed film. The film transport is then actuated to drive the remaining, unexposed film back into the camera, stopping when the end of the film is still engaged with drive sprocket 530. Camera door 484 is shut. The film is advanced a partial frame, to be sure that at least one of ramps 370, 372 will encounter the film should door 484 be reopened. The customer later will advance the film into engagement with take up spool 490. Door 26 is opened and the partially unloaded camera is removed for further use.

| Parts List | |
|---|---|
| 10 . . . apparatus for loading and unloading cameras | 78 . . . spring |
| | 80 . . . camera actuating and testing station |
| 12 . . . central mechanism support plate or frame | 81 . . . electromagnet assembly |
| | 81a . . . ferromagnetic block |
| 14 . . . lower housing | 81b . . . electromagnet |
| 16 . . . hand hold | 82 . . . film unloading track assembly |
| 18 . . . upper housing | 84 . . . cutter for exposed film |
| 19 . . . peripheral groove | 86 . . . transfer cartridge |
| 20 . . . L-shaped end door | 100 . . . opaque body or housing |
| 22 . . . hinge between 18 and 20 | 102 . . . bottom wall |
| 24 . . . cassette for unexposed film | 104 . . . peripheral wall |
| 26 . . . top door | 106 . . . removable cover |
| 28 . . . hinge between 18 and 26 | 108 . . . roll of film |
| 30 . . . recess in 18 | 110 . . . central core |
| 32 . . . camera insertion and removal opening | 112 . . . lead end of film |
| | 114 . . . idler roller |
| 34 . . . transfer cartridge insertion and removal opening | 116 . . . shaft for 114 |
| | 118 . . . driven sprocket roller |
| 36 . . . actuating lever for camera nest | 120 . . . driven shaft |
| 38 . . . opening through bottom of 30 | 122 . . . teeth on 118 |
| 40 . . . retainer bracket | 124 . . . edge perforations on film |
| 42 . . . resilient pad | 126 . . . spring-biased keeper |
| 44 . . . catch on 26 | 128 . . . shaft for 126 |
| 46 . . . catch on 20 | 130 . . . contact pad of 126 |
| 48 . . . grille on air inlet | 132 . . . anti-backup pawl |
| 50 . . . pivotable control console | 134 . . . saw toothed ratchet wheel |
| 52 . . . keypad | 136 . . . exit slit |
| 54 . . . visual display | 137 . . . raised lip |
| 60 . . . support legs for 12 | 138 . . . L-shaped recess |
| 62 . . . back wall of cassette compartment | 140 . . . knife holder |
| 64 . . . front wall of cassette compartment | 142 . . . knife blade |
| 66 . . . ledge on 62 to support | 144 . . . angled cutting edge |
| 68 . . . guide flange on 24 | α . . . acute angle between plane of 104 and plane of 138 |
| 70 . . . interior stop wall | |
| 72 . . . film loading track assembly | 145 . . . angled leading edge on film |
| 74 . . . camera nest | 146 . . . J-shaped recess |
| 76 . . . pivot between 74 and 12 | 252, 252' . . . mounting flange to underside of 12 |
| 148 . . . knife bed | |

-continued

Parts List

| | |
|---|---|
| 150 . . . edge of 148 | 254, 254' . . . drive shaft |
| 152 . . . tab on 140 | 256, 256' . . . cam follower plate |
| 154 . . . tension spring | 258, 258' . . . arcuate cutout in 256 |
| 156 . . . anchor on 104 | 260 . . . V-shaped notch in 256 |
| 166 . . . actuator tabs on 140 | 262, 262' . . . radial actuator arm |
| 168 . . . slot in 170 | 264, 264' . . . actuating finger between 166 |
| 170 . . . knife cover plate | 266, 266' . . . cassette/cartridge drive assembly |
| 172 . . . stop surface | |
| 174 . . . upper lip on 170 | 268 . . . tubular housing |
| 176 . . . bottom flange on 170 | 270, 270' . . . mounting flange to underside of 12 |
| 178 . . . recess into 104 | |
| 180 . . . exit slit in 170 | 272, 274 . . . bearings |
| 182, 184 . . . leaf springs | 276 . . . hollow shaft |
| 186, 188 . . . fasteners | 278 . . . splined counter bore |
| 190 . . . actuator plunger | 280 . . . through bore |
| 192 . . . passage in 104 | 282, 282' . . . driver shaft |
| 194 . . . channel along 102 | 283 . . . splines on 282 |
| 196, 198 . . . guide walls | 284 . . . spring |
| 200 . . . coil spring | 286 . . . shoulder on 276 |
| 202 . . . retainer flange | 288 . . . shoulder on 282 |
| 204 . . . transverse stop | 290 . . . stop on 282 |
| 206 . . . cover plate | 292, 292' . . . timing pulley on 276 |
| 208 . . . anti-backup lever | 294, 294' . . . actuator lever |
| 210 . . . pivot axle | 296, 296' . . . pivot block |
| 212, 214 . . . notches in 196, 198 | 298, 298' . . . fork |
| 216 . . . tabs on 206 | 300, 300' . . . upper end of 282 |
| 218 . . . leaf spring | 302, 302' . . . wedge cam on 294 |
| 220 . . . stub shaft | 304 . . . drive coupling for 118 |
| 222 . . . latching finger | 306 . . . sensor flag |
| 224 . . . recesses in 110 | 310 . . . sensor |
| 226 . . . cam surface on 190 | 312 . . . sensor |
| 228 . . . probe | 320 . . . shallow V-shaped frame plate |
| 230 . . . knife release arm | 322 . . . mounting bracket |
| 232 . . . latching finger | 324 . . . upper side rail block |
| 234 . . . opening in 138 | 326 . . . lower side rail block |
| 236 . . . opening in 140 | 328, 330 . . . upper retainer flanges |
| 250, 250' . . . rotary actuator | 432 . . . lens cover actuator |
| 332, 334 . . . lower retainer flanges | 433 . . . slot |
| 336, 336' . . . lower film guide slot | 434 . . . flash opening |
| 338, 338' . . . upper film guide slot | 436 . . . flash activation switch |
| 340 . . . flared inlet to 336 | 438 . . . shutter trigger button |
| 342 . . . flared inlet to 338 | 440 . . . "camera present" treadle assembly |
| 344 . . . sensor pair to detect film presence | 442 . . . pivot |
| 346 . . . tapered downstream end of 324, 326 | 444 . . . transversely extended treadle arm |
| | 446 . . . sensor flag |
| 348 . . . upper side rail block | 448 . . . sensor for 446 |
| 350 . . . lower side rail block | 450 . . . "lens cover open" treadle assembly |
| 352 . . . frame plate | 452 . . . pivot |
| 353 . . . upper retainer flange | 454 . . . transversely extended treadle arm |
| 354, 356 . . . downstream ends of 330, 334 | 456 . . . downwardly extended L-shaped sensor flag |
| 355 . . . lower retainer flange | |
| 358 . . . slot in 346 | 458 . . . sensor for 456 |
| 360 . . . film diverter spring | 460 . . . "flash activated" lever assembly |
| 362 . . . pin | 462 . . . pivot |
| 364 . . . slot in 354, 356 | 464 . . . transversely extended arm |
| 366 . . . curved end of 348, 350 | 466 . . . transversely extended arm |
| 370, 372 . . . film guide ramps | 468 . . . sensor flag |
| 374, 376 . . . pivot pins | 470 . . . sensor for 468 |
| 378 . . . film guide slot in 370, 372 | 472 . . . bottom aperture for 412 |
| 380 . . . radial arm 370, 372 | 474 . . . bottom aperture for 414 |
| 382 . . . leaf spring | 476 . . . externally accessible drive shaft coupling for 418 |
| 384 . . . transverse stop | |
| 386 . . . stop ledge in camera | 478 . . . back housing |
| 388, 390 . . . sensor flags | 480 . . . opening for flash ready light |
| 392 . . . sensor | 482 . . . slot for thumbwheel |
| 410 . . . base plate | 484 . . . sliding door to permit loading/unloading of film |
| 412 . . . positioning pin | |
| 414 . . . positioning pin | 486 . . . thumbwheel |
| 416 . . . aperture | 488 . . . gear |
| 418 . . . camera drive spindle | 490 . . . conventional film take-up spool |
| 420, 422 . . . flared end walls | 492 . . . gear |
| 424 . . . central, flared back support | 494 . . . shutter reset cam |
| 426 . . . camera | 496 . . . gear |
| 428 . . . front housing | 498 . . . counterwheel advancing pawl |
| 430 . . . lens opening | 570, 572 . . . side rails on 566 |
| 500 . . . counterwheel | 574, 576 . . . side rails on 386 |
| 501 . . . window in 428 to view frame number | 578, 580 . . . guide wedges at ends of 386 |
| | 582 . . . downward boss on 74 |

-continued

Parts List

| | |
|---|---|
| 502 . . . shaft | 584 . . . camera drive assembly |
| 504 . . . axially extensible joint | 586 . . . tubular housing |
| 506 . . . shaft | 588 . . . mounting flange |
| 508 . . . sprocket drive gear | 590, 592 . . . bearings |
| 510 . . . spring | 594 . . . internally splined counter bore in 476 |
| 512 . . . stop in camera frame | |
| 514 . . . anti-backup gear | 596 . . . torque transmission pawl |
| 516 . . . anti-backup pawl | 598 . . . pivot |
| 518 . . . cam surface | 600 . . . spring |
| 520 . . . flexible cantilever arm | 602 . . . driven gear |
| 522 . . . base | 604 . . . encoder disk |
| 523 . . . frame plate | 605 . . . sensor flag |
| 524 . . . right angle stiffener wall | 606 . . . sensor |
| 525 . . . mounting pin | 608 . . . bracket |
| 526 . . . gear | 610 . . . camera door opening mechanism |
| 530 . . . film drive sprocket | 612 . . . L-shaped frame |
| 532 . . . zero locking pawl | 614 . . . mounting flange to underside of 12 |
| 534 . . . pivot axle | 616 . . . rotary actuator |
| 536 . . . stop finger on 532 | 618 . . . cylindrical spacer |
| 538 . . . cylindrical surface on 500 | 620 . . . sensor flag |
| 540 . . . radial slot in upper surface of 500 | 622 . . . arcuate portion |
| 542 . . . locking tooth | 624, 626 . . . sensors |
| 544 . . . inward facing saw toothed ratchet in 486 | 628 . . . door opening arm |
| | 630 . . . slot through 12 |
| 546 . . . release lever | 632 . . . door engaging hook |
| 548 . . . access hole in 478 | 634 . . . ramp portion |
| 550, 552 . . . notches in ledge 386 | 635 . . . thrust washer |
| 554 . . . entrance to film track within camera | β . . . ramp angle |
| | 636 . . . slot |
| 562 . . . unexposed film chamber | 637 . . . flat washer |
| 563 . . . flexible film scroller | 638 . . . angled side wall |
| 564 . . . exposed film chamber | 639 . . . bolt |
| 566 . . . film guide track between 562 and 564 | 640 . . . catch protrusion |
| | γ . . . catch angle |
| 568 . . . exposure chamber | 716 . . . eye bolt |
| 641 . . . outside edge of 638 | 720 . . . outer shell half |
| 642 . . . aperture in 478 | 724, 726 . . . end disks |
| 644, 646 . . . stops for 622 | 728 . . . radial lip |
| 654 . . . frame member | 730 . . . strip of light lock material |
| 656 . . . mounting flange to 12 | 732, 734 . . . depending actuation lips |
| 658 . . . backwardly extended support flange | 736 . . . inner shell half |
| | 738, 740 . . . end disks |
| 660 . . . linear actuator | 742 . . . radial lip |
| 662 . . . actuator shaft | 744 . . . strip of light lock material |
| 664 . . . actuation end of 666 | 746, 748 . . . depending flanges |
| 666 . . . camera trigger actuating lever | 750 . . . spool |
| 668 . . . pivot | 752 . . . teeth |
| 670 . . . engagement end | 754 . . . film thread up scroll or guide |
| 672 . . . cross bar | 756 . . . central bore |
| 674 . . . sensor to sense 676 | 758 . . . triangular spring |
| 676 . . . darkened sector on 500 | 760 . . . central shaft |
| 676a . . . leading edge of 676 | 762 . . . cylindrical portion of 760 |
| 676b . . . black mark | 764 . . . retainer cap |
| 676c . . . infrared absorbing mark | 766 . . . externally accessible drive shaft coupling |
| 678 . . . sensor flag | |
| 680 . . . sensor | 768 . . . internally splined counterbore |
| 682 . . . mounting bracket | 780 . . . knife frame member |
| 684 . . . probe | 782 . . . mounting bracket |
| 686 . . . semi-circular tip | 784, 786 . . . parallel guide rails on 780 |
| 688 . . . stop flat | 785, 787 . . . parallel guide rails on 788 |
| 690 . . . mounting bracket | 788 . . . knife holder |
| 692 . . . vertical member | 790 . . . knife blade |
| 694, 696 . . . sensors for 388, 390 | 792 . . . angled cutting edge |
| 698 . . . flash sensor | 794 . . . actuator finger |
| 700 . . . bracket | 796 . . . slot in 780 |
| 701 . . . sensor for flash ready light | 798 . . . J-shaped knife bed |
| 702 . . . bracket | 800 . . . edge of 798 |
| 704 . . . film strip in camera | 802 . . . slot |
| 706 . . . angled end edge | 804 . . . actuator tabs on 788 |
| 708 . . . drive motor | 806 . . . slot in 808 |
| 710 . . . drive shaft | 808 . . . knife cover plate |
| 712 . . . bracket | 810 . . . top lip |
| 714 . . . eye bolt | 858, 860 . . . film strip edge guides |
| 812 . . . bottom flange | 862 . . . image relief recess |
| 814 . . . fastener tab | 864 . . . tab |
| 816 . . . exit slit | 866 . . . top plate |
| 818, 820 . . . leaf springs | 867 . . . cartridge retainer lever |
| 822 . . . slot | 867a . . . pivot |

-continued

Parts List

| | |
|---|---|
| 824, 826 . . . spring pockets | 867b . . . spring mounting post |
| 827 . . . springs | 867c . . . spring |
| 828 . . . slider | 867d . . . finger |
| 829 . . . keeper plate | 868 . . . nest for 86 |
| 830 . . . slot | 870, 872 . . . sensor flags |
| 832 . . . rearwardly angled arm | 871, 873 . . . sensors |
| 834 . . . slot | 874 . . . driver gear |
| 836 . . . back cover plate | 876 . . . timing pulley |
| 838 . . . top flange | 878 . . . timing belt |
| 840, 842 . . . film strip guides | 880 . . . timing pulley |
| 844 . . . image relief recess | 882 . . . tension adjustment arm |
| 846 . . . hinge | 884 . . . pivot |
| 847 . . . hinge pin | 886 . . . hinge for 50 |
| 848, 850 . . . hooks | 888 . . . controller |
| 852 . . . rotational stop | 890 . . . light-tight dividing wall |
| 854 . . . ramp | |
| 856 . . . film guide member | |

While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. A photographic film loading and unloading apparatus for guiding film into or from a film guide track within a camera, the camera being of a type including an external housing having a movable closure giving access to the film guide track extending between an unexposed film chamber and an exposed film chamber, the film having opposing longitudinal edges, said apparatus comprising:
   a frame;
   means supported by said frame for defining a first pair of opposed guide slots for receiving said longitudinal edges as said film is driven into said camera; and
   means supported by said frame for guiding said film from said first guide slots into said film guide track to load said camera and from said film guide track to unload said camera.

2. Apparatus according to claim 1, wherein said opposed guide slots have flared inlets to receive said film.

3. Apparatus according to claim 1, wherein said means for guiding comprises a pair of ramps for said longitudinal edges.

4. Apparatus according to claim 1, further comprising means defining a second pair of opposed guide slots for receiving said longitudinal edges from said means for guiding as said film is driven from said camera.

5. Apparatus according to claim 4, wherein said means for guiding comprises a pair of ramps for guiding said longitudinal edges into or from said camera.

6. Apparatus according to claim 1, wherein said frame has a coefficient of thermal expansion in a range of 6 to $8 \times 10^{-5}$ in/in/°C.

7. A photographic film loading and unloading apparatus for guiding film into or from a film guide track within a camera, the camera being of a type including an external housing having a movable closure giving access to the film guide track extending between an unexposed film chamber and an exposed film chamber, the film having opposing longitudinal edges, said apparatus comprising:
   a frame;
   means supported by said frame for defining a first pair of opposed guide slots for receiving said longitudinal edges as said film is driven into said camera; and
   means supported by said frame for guiding said film from said first guide slots into said film guide track to load said camera and from said film guide track to unload said camera, said means for guiding including a pair of ramps for said longitudinal edges, said ramps being pivoted to move into said camera when said movable closure is open.

8. Apparatus according to claim 7, further comprising means for biasing said ramps to move into said camera when said movable closure opens.

9. Apparatus according to claim 7, wherein said ramps comprise further guide slots for receiving said longitudinal edges from said opposed guide slots.

10. A loading track according to claim 7, wherein each of said ramps comprises a sensor flag, further comprising a pair of sensors mounted adjacent said ramps to be actuated by said flags when said ramps move into a position for guiding said film into said film guide track.

11. Apparatus according to claim 7, wherein said opposed guide slots have flared inlets to receive said film.

12. Apparatus according to claim 7, further comprising means defining a second pair of opposed guide slots for receiving said longitudinal edges from said means for guiding as said film is driven from said camera.

13. Apparatus according to claim 7, wherein said frame has a coefficient of thermal expansion in a range of 6 to $8 \times 10^{-5}$ in/in/°C.

14. A photographic film loading and unloading apparatus for guiding film into or from a film guide track within a camera, the camera being of a type including an external housing having a movable closure giving access to the film guide track extending between an unexposed film chamber and an exposed film chamber, the film having opposing longitudinal edges, said apparatus comprising:
   a frame;
   means supported by said frame for defining a first pair of opposed guide slots for receiving said longitudinal edges as said film is driven into said camera;
   means supported by said frame for guiding said film from said first guide slots into said film guide track to load said camera and from said film guide track to unload said camera, said means for guiding including a pair of ramps for guiding said longitudinal edges into or from said camera;
   means defining a second pair of opposed guide slots for receiving said longitudinal edges from said pair of ramps as said film is driven from said camera; and each of said ramps including a guide slot for receiving a film edge from one of said first pair of opposed guide slots as said film is driven into said camera and thereafter for receiving said film edges as said film is driven from said camera into said second pair of opposed guide slots.

15. Apparatus according to claim 14, further comprising a resilient member for diverting said film from said guide slots of said ramps to said second pair of opposed guide slots.

16. Apparatus according to claim 15, wherein said resilient member blocks said first pair of opposed guide slots until pushed aside by said film as said film is driven into said camera.

17. Apparatus according to claim 14, wherein said first and second pairs of opposed guide slots have flared inlets to receive said film.

18. Apparatus according to claim 14, wherein said frame has a coefficient of thermal expansion in a range of 6 to $8 \times 10^{-5}$ in/in/°C.

* * * * *